US009229664B2

(12) United States Patent
Landa et al.

(10) Patent No.: US 9,229,664 B2
(45) Date of Patent: Jan. 5, 2016

(54) APPARATUS AND METHODS FOR MONITORING OPERATION OF A PRINTING SYSTEM

(71) Applicant: LANDA CORPORATION LTD., Rehovot (IL)

(72) Inventors: Benzion Landa, Nes Ziona (IL); Dragan Stiglic, Rehovot (IL); Amit Harburger, Bat Hefer (IL); Elisha Avram Tal, Harey Yehuda (IL)

(73) Assignee: LANDA CORPORATION LTD., Rehovot ( * ) Notice: Subject to any disclaimer, the term of this patent is extended or adjusted under 35 U.S.C. 154(b) by 0 days.

(21) Appl. No.: 14/340,122

(22) Filed: Jul. 24, 2014

(65) Prior Publication Data

US 2015/0054865 A1   Feb. 26, 2015

Related U.S. Application Data

(63) Continuation-in-part of application No. PCT/IB2013/050245, filed on Jan. 10, 2013, which is a continuation-in-part of application No. PCT/IB2012/056100, filed on Nov. 1, 2012.

(60) Provisional application No. 61/606,913, filed on Mar. 5, 2012, provisional application No. 61/611,556, filed on Mar. 15, 2012, provisional application No. 61/611,568, filed on Mar. 15, 2012, provisional application No. 61/640,720, filed on Apr. 30, 2012, provisional application No. 61/641,870, filed on May 2, 2012, provisional application No. 61/641,881, filed on May 2, 2012, provisional application No. 61/719,894, filed on Oct. 29, 2012.

(51) Int. Cl.
*B41J 3/00* (2006.01)
*G06F 3/12* (2006.01)
*B41J 29/393* (2006.01)
*G06K 9/00* (2006.01)

(52) U.S. Cl.
CPC ............ *G06F 3/1211* (2013.01); *G06F 3/1258* (2013.01); *G06F 3/1286* (2013.01)

(58) Field of Classification Search
CPC .............. B41J 2/01; B41J 3/46; B41J 29/393; B41J 2002/12
USPC ........................................ 347/2, 19; 382/112
See application file for complete search history.

(56) References Cited

U.S. PATENT DOCUMENTS

| 5,305,099 | A | 4/1994 | Morcos |
| 5,613,669 | A | 3/1997 | Grueninger |
| 6,009,284 | A | 12/1999 | Weinberger et al. |
| 6,024,018 | A * | 2/2000 | Darel et al. .................. 101/365 |
| 6,678,068 | B1 * | 1/2004 | Richter et al. ............... 358/1.15 |
| 6,917,437 | B1 * | 7/2005 | Myers et al. ................. 358/1.15 |
| 7,304,753 | B1 * | 12/2007 | Richter et al. ............... 358/1.15 |

(Continued)

*Primary Examiner* — Jannelle M LeBron
*Assistant Examiner* — Jeremy Bishop
(74) *Attorney, Agent, or Firm* — Marc Van Dyke; Fourth Dimension IP

(57) ABSTRACT

User-related features of a printing system are disclosed herein. Some embodiments relate to a time-line GUI for visualizing and/or manipulating queued print jobs which may be employed. Some embodiments relate to a reversed augmented reality GUI for visualization and/or control of the printing system. In some embodiments, a display screen is mounted to a printer housing and/or able to control access to moving parts of a printing system.

20 Claims, 40 Drawing Sheets

(56) References Cited

U.S. PATENT DOCUMENTS

| | | |
|---|---|---|
| 7,362,464 B2 * | 4/2008 | Kitazawa .................... 358/1.16 |
| 8,693,032 B2 * | 4/2014 | Goddard et al. ............. 358/1.15 |
| 2008/0196612 A1 * | 8/2008 | Rancourt et al. ............. 101/219 |
| 2009/0190951 A1 | 7/2009 | Torimaru et al. |
| 2010/0066796 A1 | 3/2010 | Yanagi et al. |
| 2012/0013928 A1 * | 1/2012 | Yoshida et al. .............. 358/1.13 |
| 2012/0194830 A1 * | 8/2012 | Gaertner et al. ................ 358/1.5 |

* cited by examiner

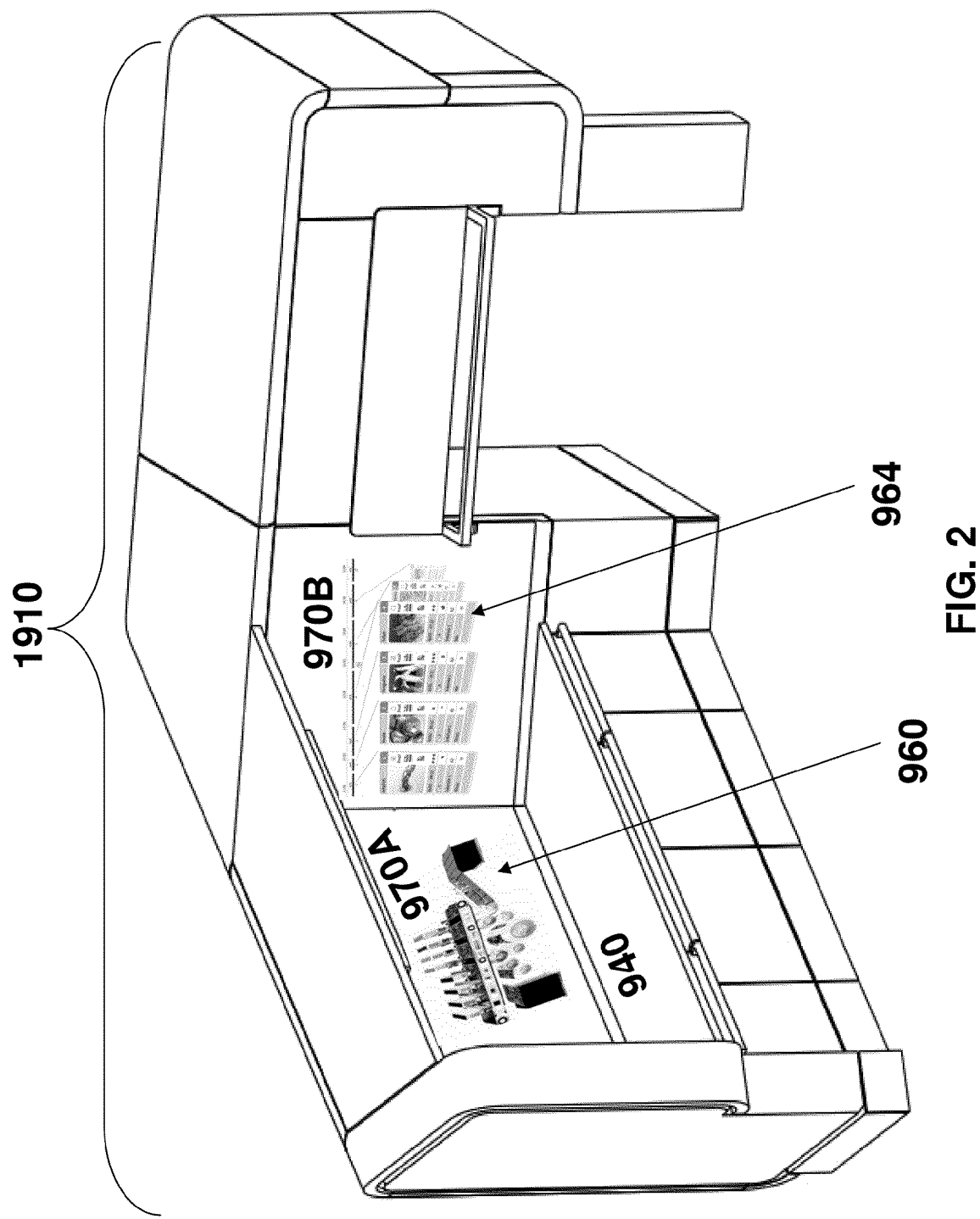

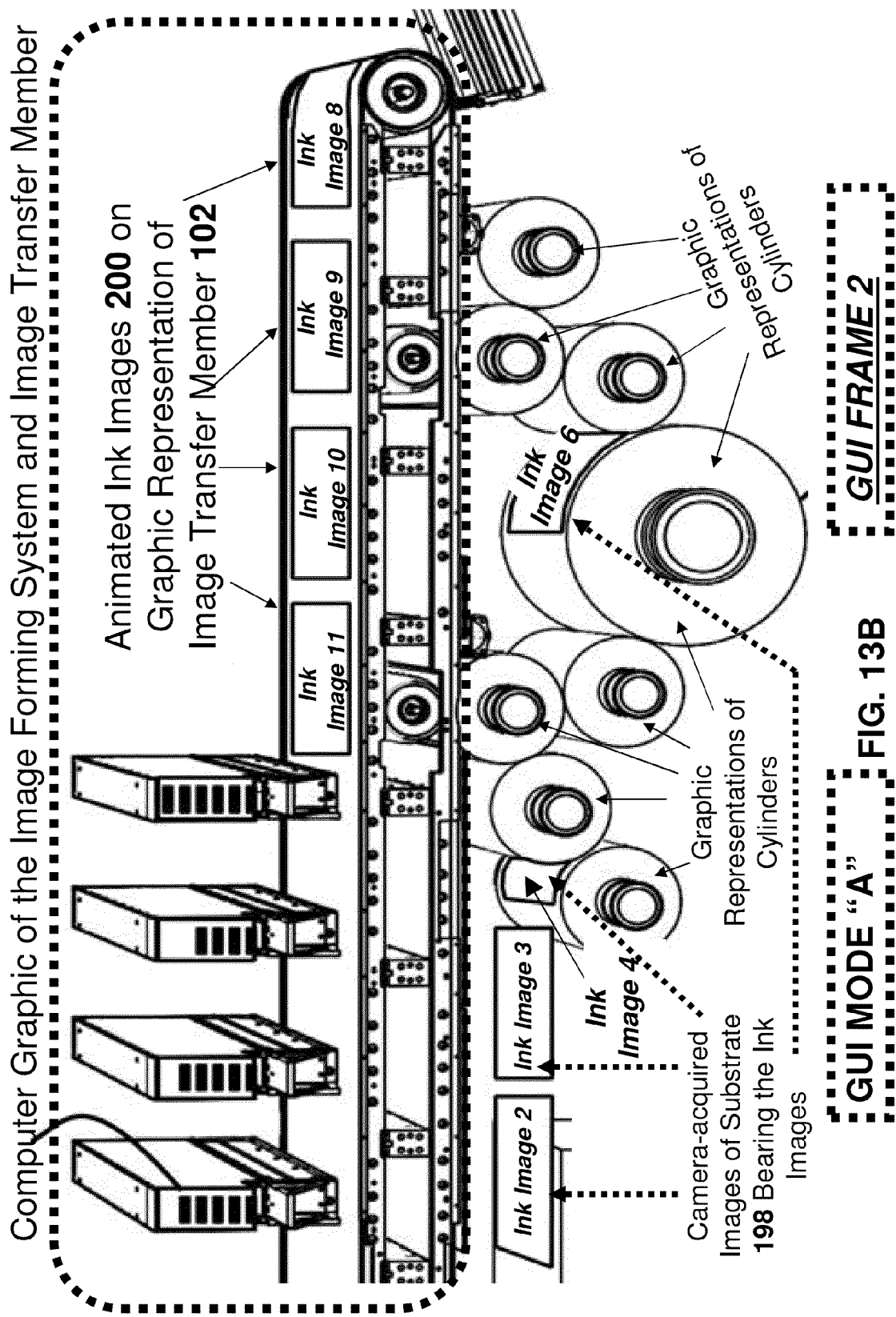

FRONT ACCESS BLOCKED

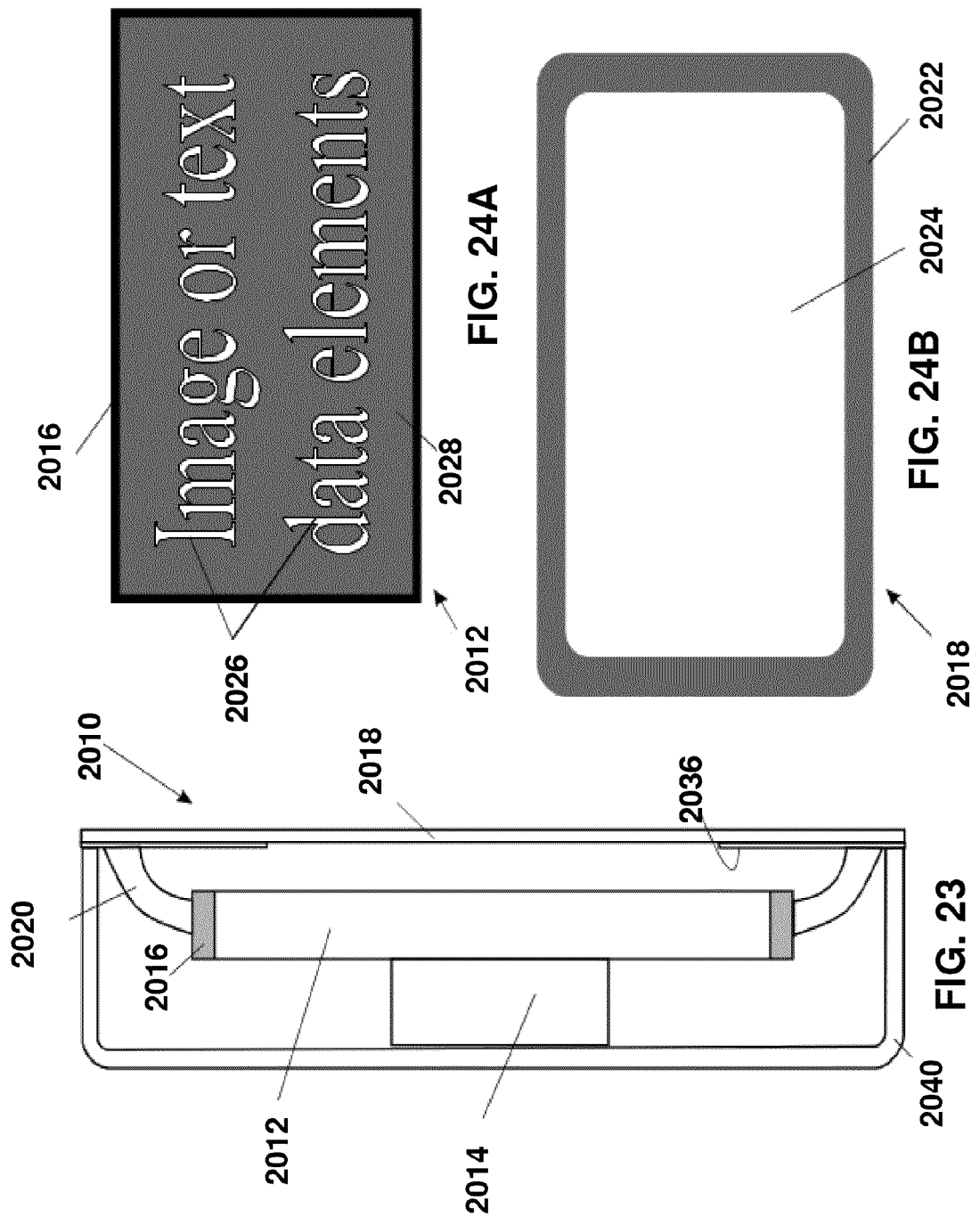

APPARATUS AND METHODS FOR MONITORING OPERATION OF A PRINTING SYSTEM

CROSS-REFERENCE TO RELATED APPLICATIONS

The present application is a continuation-in-part of PCT/IB2013/050245 filed on Jan. 10, 2013 which is incorporated herein by reference in its entirety. PCT/IB2013/050245, published as WO 2013/132356, claims priority to the following patent applications, all of which are hereby incorporated by reference herein in their entirety: U.S. Provisional Application No. 61/606,913 filed on Mar. 5, 2012; U.S. Provisional Application No. 61/611,556 filed on Mar. 15, 2012; U.S. Provisional Application No. 61/611,568 filed on Mar. 15, 2012; U.S. Provisional Application No. 61/640,720 filed on Apr. 30, 2012; U.S. Provisional Application No. 61/641,881 filed on May 2, 2012; U.S. Provisional Application No. 61/641,870 filed on May 2, 2012; U.S. 61/719,894 filed on Oct. 29, 2012; and PCT/IB2012/056100 filed on Nov. 1, 2012.

FIELD OF THE INVENTION

The present invention relates to a digital printing system, to methods of monitoring the same, to related apparatus and to display devices.

BACKGROUND

Currently, lithographic printing is the process in most common use for producing newspapers and magazines. Lithographic printing involves the preparation of plates bearing the image to be printed, which plates are mounted on a plate cylinder. An ink image produced on the plate cylinder is transferred to an offset cylinder that carries a rubber blanket. From the blanket, the image is applied onto paper or any other printing medium, termed the substrate, which is fed between the offset cylinder and an impression cylinder. For a wide variety of well-known reasons, offset litho printing is suitable, and economically viable, only for long print runs.

More recently, digital printing techniques have been developed that allow a printing device to receive instructions directly from a computer without the need to prepare printing plates. Amongst these are color laser printers that use the xerographic process. Color laser printing systems using dry toners are suitable for certain applications, but they do not produce images of a photographic quality acceptable for publications such as magazines.

A process that is better suited for short run high quality digital printing is used in the HP-Indigo digital printing press. In this process, an electrostatic image is produced on an electrically charged image bearing cylinder by exposure to laser light. The electrostatic charge attracts oil-based inks to form a color ink image on the image bearing cylinder. The ink image is then transferred by way of a blanket cylinder onto the substrate.

Inkjet and bubble jet processes are commonly used in home and office printing systems. In these processes droplets of ink are sprayed onto a final substrate in an image pattern. In general, the resolution of such processes is limited due to wicking by the inks into paper substrates, unless coated paper is used.

Various printing devices have also previously been proposed that use an indirect inkjet printing process, this being a process in which an inkjet print head is used to print an image onto the surface of an intermediate transfer member, which is then used to transfer the image onto a substrate. The intermediate transfer member may be a rigid drum or a flexible belt (e.g. guided over rollers, or mounted onto a rigid drum), also herein termed a blanket.

SUMMARY

It is now disclosed a printing system comprising: a). an intermediate transfer member; b). an image forming system for forming ink images on the intermediate transfer member, c). a sheet or web substrate transport system including at least one impression cylinder that selectively presses a substrate against a region of the intermediate transfer member spaced from the image forming system for the ink images to be impressed thereon at an image transfer location; and d). an electronic display screen operative to display information about operation of the printing system, the display screen being mounted to a housing of the printing system so as to be movable and/or rotatable relative to at least the substrate transport system, the display screen positioned and dimensioned to span at least one of: i). a majority of the horizontal range of the substrate transport system; and ii). a majority of the horizontal range of the intermediate transfer member, wherein the printing system is arranged so that: A. when the mounted display screen has a first position/orientation, the display screen obstructs front access to the substrate transport system or to the image transfer location thereof; and B. translation and/or rotational motion of the mounted display screen from the first position/orientation to a second position/orientation permits front access to the substrate transport system or to the image transfer location thereof.

In some embodiments, the system is configured so that at least one or at least two or at least three or at least four of the following conditions are true, i). a ratio between a width of the electronic display screen and a height thereof is at least about 1 or at least about 1.25 or at least about 1.5 and/or at most about 10 or at most about 5; ii). a width and/or a height of the mounted display screen is at least 1 meter or at least 1.5 meters or at least 2 meters; iii). a width of the mounted display screen is at least 25% or at least 50% of a circumference of the intermediate transfer member; and iv). the display screen is positioned and dimensioned to span at least the majority of the horizontal range of the intermediate transfer member.

In some embodiments, the intermediate transfer member is a rigid drum or a blanket mounted thereon.

In some embodiments, the intermediate transfer member is a flexible blanket guided over rollers.

In some embodiments, the information about operation of the printing system includes at least one of: i). information about one or more print jobs that are queued to the printing system; and ii). information about past, current or future operation of the substrate transport system and/or intermediate transfer member and/or image forming system and/or at the image transfer location.

In some embodiments, the system further comprises one or more additional display screen(s) operative to display information about operation of the printing system, one or more of the additional display screens being situated adjacent to the housing of the printing system or remotely therefrom.

In some embodiments, at least one of the additional screens is oriented substantially perpendicular to a substrate flow direction defined by the substrate transport system.

It is now disclosed a method of monitoring the operation state of a printing system comprising (i) a real-world image forming apparatus configured to form ink image(s) on a real-world rotating intermediate transfer member according to contents of an image database, (ii) a real-world substrate transport system defining a substrate path and interacting with the intermediate transfer member at a real-world image transfer location where the formed ink images located on and rotating with the intermediate transfer member are transferred to a substrate, the method comprising: a). retrieving digital image representations from the image database; b). displaying simultaneously on a display device: i). a graphical representation of the real-world rotating intermediate transfer member; ii). a graphical representation of the substrate transport system including a graphical representation of the real-world image transfer location; and iii. a graphical animation of the database-retrieved images in motion on the surface of the representation of the intermediate transfer member; c). operating a camera to acquire a video stream of the real-world substrate bearing ink image(s) moving along the substrate path; and d). simultaneous with the displaying of the graphical representations of the intermediate transfer member and of the substrate transport system, displaying on the display screen the camera-acquired video stream of the real-world substrate moving along the substrate path, wherein the video stream is superimposed over the graphical representation of the substrate transport system in a location that corresponds to its real-world counterpart.

In some embodiments, (i) the method further comprises monitoring operation of the printing system to assess which images are substantially-current images that are currently resident on the rotating intermediate transfer member or are queued for formation on the rotating intermediate transfer member in the near future; and (ii) the digital image representations that are retrieved from the database and animated on the surface of the representation of the intermediate transfer member are the substantially-current images.

In some embodiments, (i) the method further comprises monitoring an image print queue of the printing system and (ii) the digital image representations that are retrieved from the database and animated on the surface of the representation of the intermediate transfer member are those in the image print queue of the printing system.

In some embodiments, one or more mechanical or magnetic or optical or thermal sensors monitor one or more operating parameter(s) of the printing system and wherein the animation is carried out in accordance with the results of the monitoring of the operating parameter(s).

In some embodiments, the animation is contingent upon detected rotational motion of the intermediate transfer member.

In some embodiments, the superimposed video stream is re-oriented and/or re-scaled so as to match an orientation and/or scale of the graphical representation of the substrate transport system.

In some embodiments, a plurality of cameras acquire a respective plurality of video streams of the real-world substrate bearing ink image(s) in motion along the substrate path, each camera acquiring images of the real-world substrate when located at a different respective location along the substrate path, each video stream being displayed in a respective location and orientation that correspond to their respective real-world counterparts.

In some embodiments, the animation of the in-motion images is synchronizing with the video stream ink images residing on the real-world substrate of the video stream.

In some embodiments, at least one image displayed in the graphical animation is subjected to a curvature-modifying geometric mapping so that the curvature of the image matches a local curvature of the intermediate transfer member.

In some embodiments, a curvature of the animated image changes as it travels between locations on the intermediate transfer member having different surface curvatures.

In some embodiments, the graphical representation of the substrate transport system includes a graphical representation of one or more cylinder(s) thereof, the displayed cylinder(s) being animated to illustrate rotation thereof.

In some embodiments, the animated images that are displayed in motion match the real-world images on the real-world intermediate transfer member and are mirror-images of the real-world ink images on the real-world substrate.

In some embodiments, the monitoring of the operation state of the printing system is further displayed on one or more additional display device(s) each independently operative to display at least part of the monitored operation of the system, the one or more additional devices being situated adjacent to the housing of the printing system or remotely therefrom.

It is now disclosed a printing system operative with a display device, the printing system comprising: a). a real-world image forming apparatus configured to form ink image(s) on a real-world rotating intermediate transfer member according to contents of an image database; b). a real-world substrate transport system defining a substrate path and interacting with the intermediate transfer member at a real-world image transfer location where the formed ink images located on and rotating with the intermediate transfer member are transferred to a real-world substrate; c). a camera being aimed at a real-world field-of-view within the substrate transport system along the substrate path to acquire a video stream of the real-world substrate bearing ink image(s) moving through the field-of-view; and d). electronic circuitry operative to (i) retrieve digital image representations from the image database; and (ii) cause the display device to simultaneously display: A. a graphical representation of the real-world rotating intermediate transfer member and; B. a graphical representation of the substrate transport system including a graphic representation of the real-world image transfer location; C. a graphical animation of the database-retrieved images in motion on the surface of the representation of the intermediate transfer member; and D. the camera-acquired video stream of the real-world substrate bearing ink image(s) moving along the substrate path through the field-of-view, the video stream being superimposed over the graphical representation of the substrate transport system so that a location of the video stream corresponds to its real-world counterpart.

In some embodiments, the animated digital images are selected and retrieved from the image database in accordance with an image print queue of the printing system and/or in a manner that synchronizes with the video stream ink images residing on the real-world substrate of the video stream.

It is now disclosed a method of monitoring operation of a printing system that includes a target set of one or more printing device(s) to which a plurality of print-jobs are queued for execution, the method comprising: a). for each print job of the plurality of queued print-jobs, computing or receiving a respective estimated job-completion time, each job-completion time describing a respective predicted job duration for executing the corresponding print job by the printing system; b). displaying to a user on a display device, a sectioned timeline that is sectioned in accordance with the estimated job completion times for the print-jobs such that: i). each section of the timeline is associated with a different respective print-job of the plurality of print jobs; and ii). a section length of each timeline section corresponds to a magnitude of the job-completion time of its associated print-job; and c). for each of the timeline sections of the sectioned timeline, displaying, for the associated print-job of the timeline section, respective job summary data describing respective print substrate and/or ink combination requirements for the associated print-job, the respective job summary data being visually associated with its corresponding timeline section.

In some embodiments, the job summary data is visually presented as job cards.

In some embodiments, for first and second print jobs having different respective print substrate and/or ink combination requirements and/or being queued to different printing devices of the target set, the visually-associated job-summary data for the first print job differs from that for the second print job.

In some embodiments, the job-queue is for a single printing device of the printing system.

In some embodiments, the job-queue is a unified job-queue for multiple printing devices of the printing system.

In some embodiments, the method further comprises: a) monitoring operation of the printing system and/or changes in the job-queue of the printing system; and b) in response to the results of the monitoring, re-sectioning the sectioned timeline to change relative visual magnitudes of time section(s) to reflect the change in the job-queue.

In some embodiments, the method further comprises in response to a user GUI dragging of one or more of the job-summaries, modifying the job-queue to modify operation of at least one of the printing devices of the printing system.

In some embodiments, the job-queue modification includes at least one of: (i) changing a job-queue order to promote or demote the print job corresponding to the GUI-dragged job summary; and (ii) deleting the print job corresponding to the GUI-dragged job summary.

In some embodiments, at least one of the printing devices of the printing system is a digital press or an offset printer or a laser printer or an ink-jet printer or a dot matrix printer.

It is now disclosed an apparatus for monitoring operation of a printing system that includes one or more printing devices to which a plurality of print-jobs are queued for execution, the apparatus comprising: a). a display device; and b). an electronic circuitry operative to: i). for each print job of the plurality of queued print-jobs, computing or receiving a respective estimated job-completion time, each job completion time describing a respective predicted job duration for executing the corresponding print job by the printing device(s); ii). displaying to a user on the display device, a sectioned timeline that is sectioned in accordance with the estimated job completion times for the print-jobs such that: A. each section of the timeline is associated with a different respective print-job of the plurality of print jobs; and B. a section length of each timeline section corresponds to a magnitude of the job-completion time of its associated print-job; and iii). for each of the timeline sections of the sectioned timeline, displaying, for the associated print-job of the timeline section, a respective job summary data describing respective print substrate and/or ink combination requirements and/or printing system for the associated print-job, the respective job summary data being visually associated with its corresponding timeline section.

It is now disclosed a display system for generating a visual image corresponding to received electrical image signals, having a display screen and a control unit for sending image signals to the display screen to convey information to a viewer, all the image signals generated by the control unit comprising data elements disposed within a central region of the display screen and surrounded by a contrasting background image that extends to the borders of the display screen, wherein a front panel of greater area than the display screen and having a front face and a rear face is mounted to overlie and surround the borders of the display screen and is supported on the display screen by a mounting bracket bonded to the rear face of the front panel, and wherein the front panel has an opaque border obscuring from view the mounting bracket and the borders of the display screen and a transparent region through which the display screen may be viewed, the appearance of the opaque border being selected to merge into the background image displayed on the display screen.

In some embodiments, a transition region from the opaque border to the transparent region of the front panel is gradual.

In some embodiments, the opaque region is formed by means of a mask adhered or painted onto the rear surface of the front panel between the rear surface and the support bracket.

In some embodiments, the mask is dithered in the transition region, to allow a gradually increasing proportion of the background image to be viewed through the front panel.

In some embodiments, the opaque border is formed by tinting the glass, the tinting shade being sufficient for support bracket not to be discernable when the front face of the front panel is viewed.

In some embodiments, the tinting is arranged to fade gradually into the clear transparent region of the front panel.

In some embodiments, the front panel is provided with at least one transparent electrode to enable the front panel to function as a touch panel.

It is now disclosed a printing system comprising: a). an image transfer member; b). an image forming system for forming ink images on the image transfer member, c). a sheet or web substrate transport system including at least one impression cylinder for enabling substrate to be pressed against a region of the blanket spaced from the image forming system for ink images to be impressed thereon, and d). an electronic display screen operative to display information about operation of the printing system, the display screen being mounted to a housing of the printing system so as to be vertically slidable relative to at least the substrate transport system, the display screen positioned and dimensioned to span at least one of: (i) a majority of the horizontal range of a cylinder assembly of the substrate transport system; and (ii) a majority of the horizontal range of the image transfer member, a ratio between a width of the electronic display screen and a height thereof being between about 1.5 and about 5, wherein the printer is arranged so that: i). when the mounted display screen is situated at a lower position, the display screen blocks front access to the substrate transport system; and ii). upward motion of the mounted display screen from the lower position to an upper position opens front access to the substrate transport system.

It is now disclosed a printing system comprising: a). an image transfer member; b). an image forming system for forming ink images on the image transfer member, c). a sheet or web substrate transport system including at least one impression cylinder for enabling substrate to be pressed against a region of the blanket spaced from the image forming system for ink images to be impressed thereon, and d). an electronic display screen operative to display information about operation of the printing system, the display screen being mounted to a housing of the printing system so as to be horizontally slidable relative to at least the substrate transport system, the display screen positioned and dimensioned to span at least one of: (i) a majority of the horizontal range of a cylinder assembly of the substrate transport system; and (ii) a majority of the horizontal range of the image transfer member, a ratio between a width of the electronic display screen and a height thereof being between 1.5 and 5, wherein the printer is arranged so that: i). when the mounted display screen is situated at a first position, the display screen blocks front access to the substrate transport system; and ii). horizontal motion of the mounted display screen from the first position to a second position opens front access to the substrate transport system.

It is now disclosed a method of monitoring the operation state of a printing system comprising (i) a real-world image forming apparatus configured to form ink image(s) on a real-world rotating intermediate transfer member according to contents of an image database, (ii) a real-world substrate transport system defining a substrate path and interacting with the intermediate transfer member at a real-world image transfer location where the formed ink images located on and rotating with the intermediate transfer member are transferred to substrate, the method comprising: a). displaying simultaneously on a display device: i). a graphical representation of the real-world rotating intermediate transfer member and; and ii). a graphical representation of the substrate transport system including a graphic representation of the real-world image transfer location; b). operating a camera to acquire a video stream of real-world substrate bearing ink image(s) moving along the substrate path; c). simultaneous with the displaying of the graphical representations of the intermediate transfer member and the substrate transport system, displaying on the display screen the camera-acquired video stream of the real-world substrate moving along the substrate path, wherein the video stream is superimposed over the graphical representation of the substrate transport system in a location that corresponds to its real-world counterpart.

It is now disclosed a method of visualizing operation of a printing system comprising (i) a real-world image forming apparatus configured to form ink image(s) on a real-world rotating intermediate transfer member according to contents of an image database, (ii) a real-world substrate transport system defining a substrate path and interacting with the intermediate transfer member at a real-world image transfer location where the formed ink images located on and rotating with the intermediate transfer member are transferred to substrate, and (iii) a first camera being aimed at a real-world field-of-view within the substrate transport system along the substrate path to acquire a video stream of real-world substrate bearing ink image(s) moving through the field-of-view and (iv) a second camera aimed at a surface of the real-world rotating intermediate transfer member to acquire an image of ink images thereon, the method comprising: a). displaying simultaneously on a display device: i). a graphical representation of the real-world rotating intermediate transfer member and; ii). a graphical representation of the substrate transport system including the real-world image transfer location; b). simultaneous with the displaying of step (a), displaying, on the display device, a graphical animation of the ink-image acquired by the second camera moving on the surface of the representation of the intermediate transfer member; and c). simultaneous with the displaying of the graphical animation, displaying the camera-acquired video stream of the real-world substrate bearing ink image(s) moving through the field-of-view, the video stream being displayed at a location on the display device relative to the graphical representation of the substrate transport system that corresponds to its real-world counterpart.

It is now disclosed a method of monitoring operation of a set of print device(s) to which a plurality of print-jobs are queued for execution, the method comprising: a). for each print job of the plurality of queued print-jobs, computing or receiving a respective estimated job-completion time, each job-completion time describing a respective predicted job duration for executing the corresponding print job by the printer device(s); b). displaying to a user on a display device, a sectioned timeline that is sectioned in accordance with the estimated job completion times such that: i). each section of the timeline is associated with a different respective print-job of the plurality of print jobs; and ii). a section length of each timeline section corresponds to a magnitude of the job-completion time of its associated print-job; c). for each of the queued print-jobs, displaying respective job summary data describing respective print substrate and/or ink combination requirements and/or printing device for the job, wherein the job summary data for each job is visually associated with its corresponding timeline section.

It is now disclosed a printing system operative with a display device, the printing system comprising: a). a real-world image forming apparatus configured to form ink image(s) on a real-world rotating intermediate transfer member according to contents of an image database, b). a real-world substrate transport system defining a substrate path and interacting with the intermediate transfer member at a real-world image transfer location where the formed ink images located on and rotating with the intermediate transfer member are transferred to substrate, c). a first camera being aimed at a real-world field-of-view within the substrate transport system along the substrate path to acquire a video stream of real-world substrate bearing ink image(s) moving through the field-of-view; d). a second camera aimed at a surface of the real-world rotating intermediate transfer member to acquire an image of ink images thereon; e). an electronic circuitry operative to cause a display device to simultaneously displaying: A. a graphical representation of the real-world rotating intermediate transfer member and; B. a graphical representation of the substrate transport system including the real-world image transfer location; C. a graphical animation of the ink-image acquired by the second camera moving on the surface of the representation of the intermediate transfer member; and D. the camera-acquired video stream of the real-world substrate bearing ink image(s) moving through the field-of-view, the video stream being displayed at a location on the display device relative to the graphical representation of the substrate transport system that corresponds to its real world counterpart.

BRIEF DESCRIPTION OF THE DRAWINGS

To assist in the understanding of the invention and for purposes of illustrative discussion, some embodiments are herein described, by way of example only, with reference to the accompanying drawings and images. In this regard, the description taken with the drawings makes apparent to those skilled in the art how embodiments of the invention may be practiced. Dimensions of components and features shown in the figures are chosen for convenience and clarity of presentation and are not necessarily shown to scale. The drawings are not to be considered as blueprint specifications.

FIGS. 1B-1C and 2 illustrate the monitoring station.

FIGS. 13A, 13B, 13C, 13D and 14 illustrate a GUI for monitoring operation of an indirect printing system.

FIGS. 23, 24A, 24B and 25 illustrate features related to a screen providing the illusion of a display system having a front panel with no obvious means of support.

DETAILED DESCRIPTION OF EMBODIMENTS

Brief Overview

Embodiments of the present invention relate to apparatus and methods for monitoring operation of a printing system such as a digital printing system having an intermediate transfer member (e.g. a drum or a blanket guided over rollers, or mounted onto a rigid drum). In some embodiments, 'user-facing' features are disclosed herein—for example, printing system-related GUIs, alerting or alarm functionality related to printing system operation, a printing system having a multi-function movable display screen, and novel display screen features.

Figure 1A:
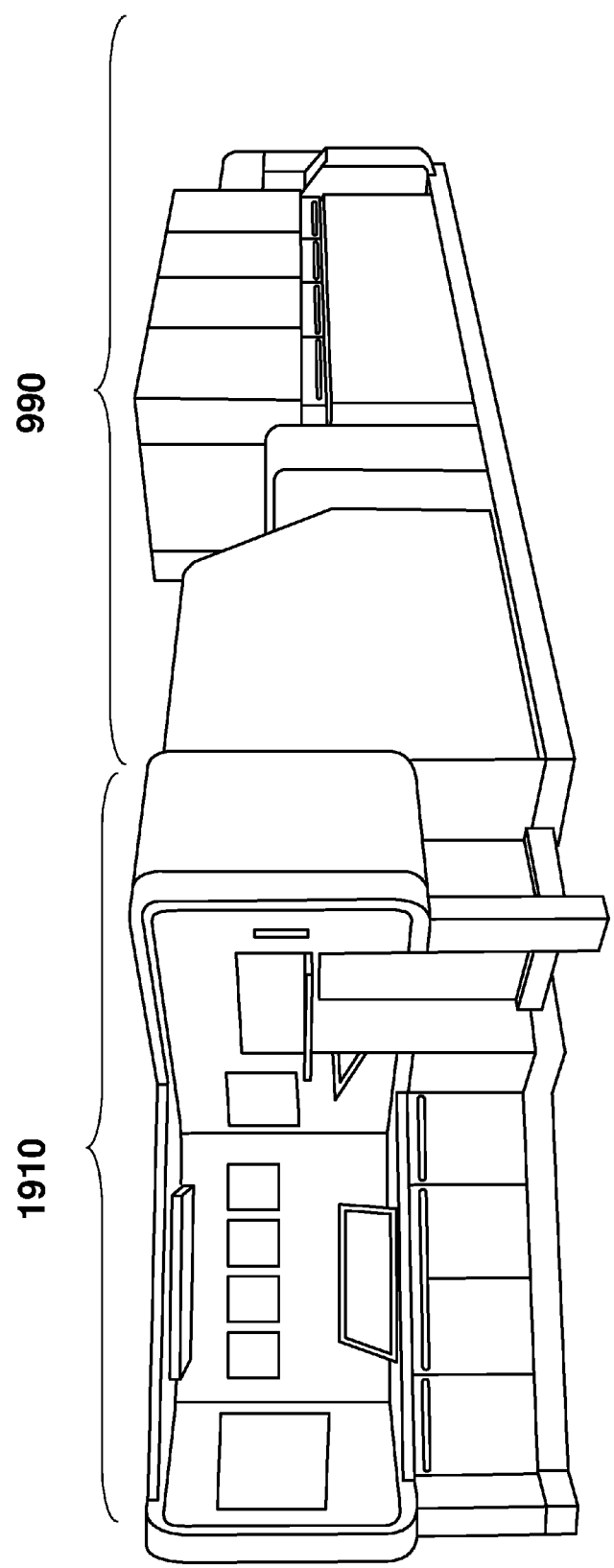
FIG. 1A illustrates a digital printing system including a monitoring station for presenting information about a printing system.
Figure 1B:
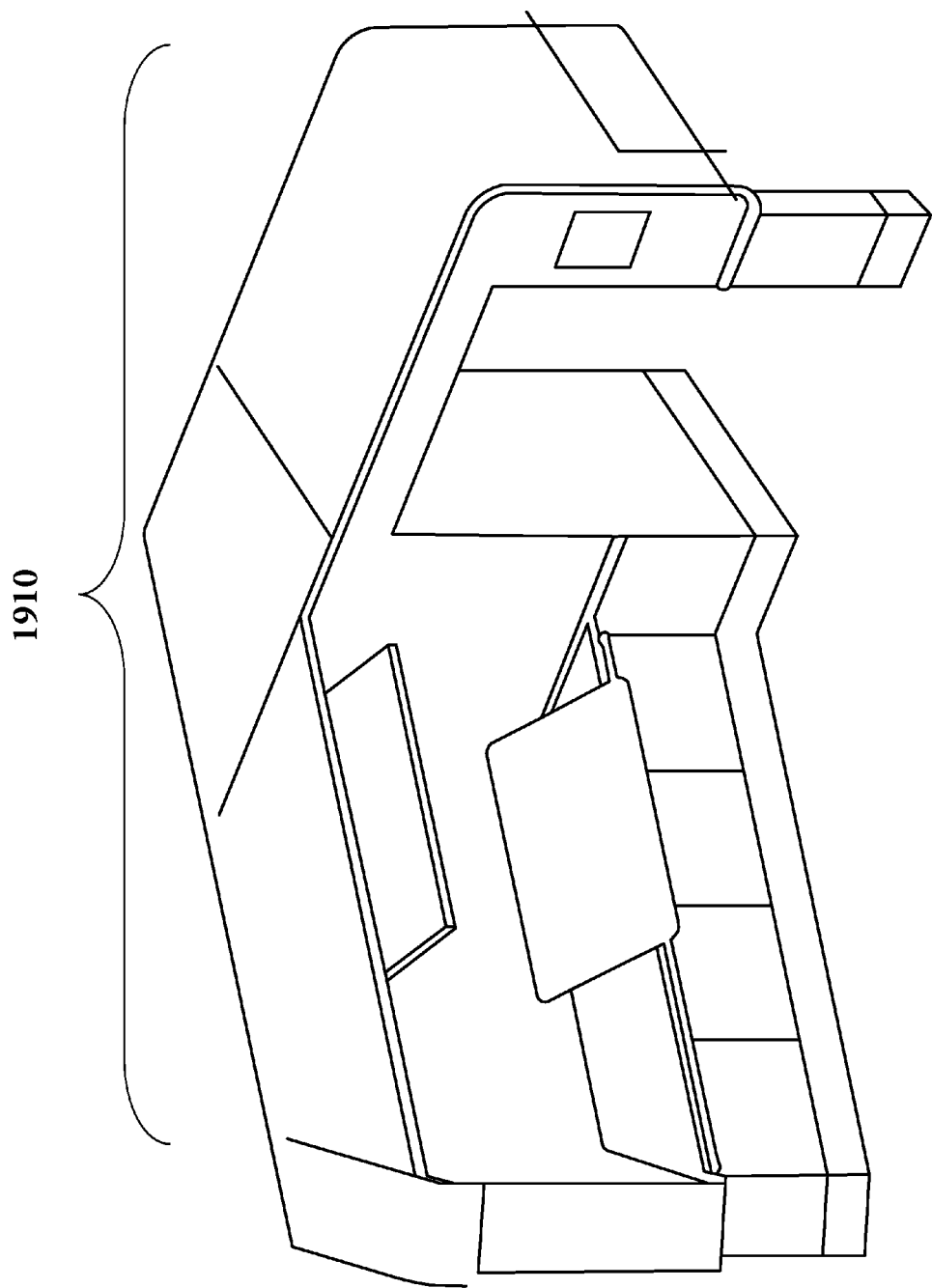
Figure 1C:
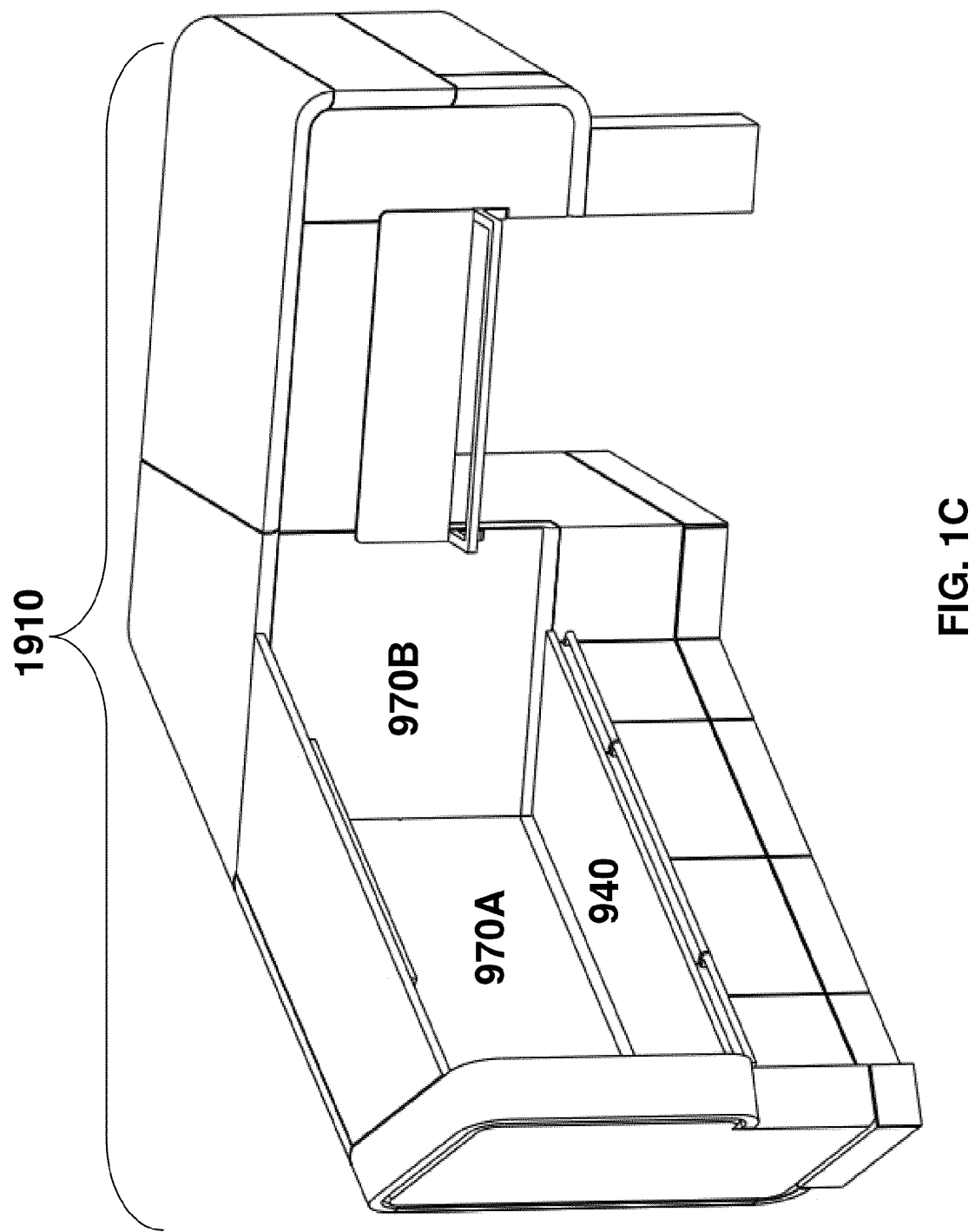

FIG. 1A illustrates a digital printing system 990 including a monitoring station 1910 for presenting information about printing system 990. As shown in FIGS. 1B-1C, monitoring station 1910 includes inspection table 940 and a plurality of display screens 970A-970B.

Figure 3:
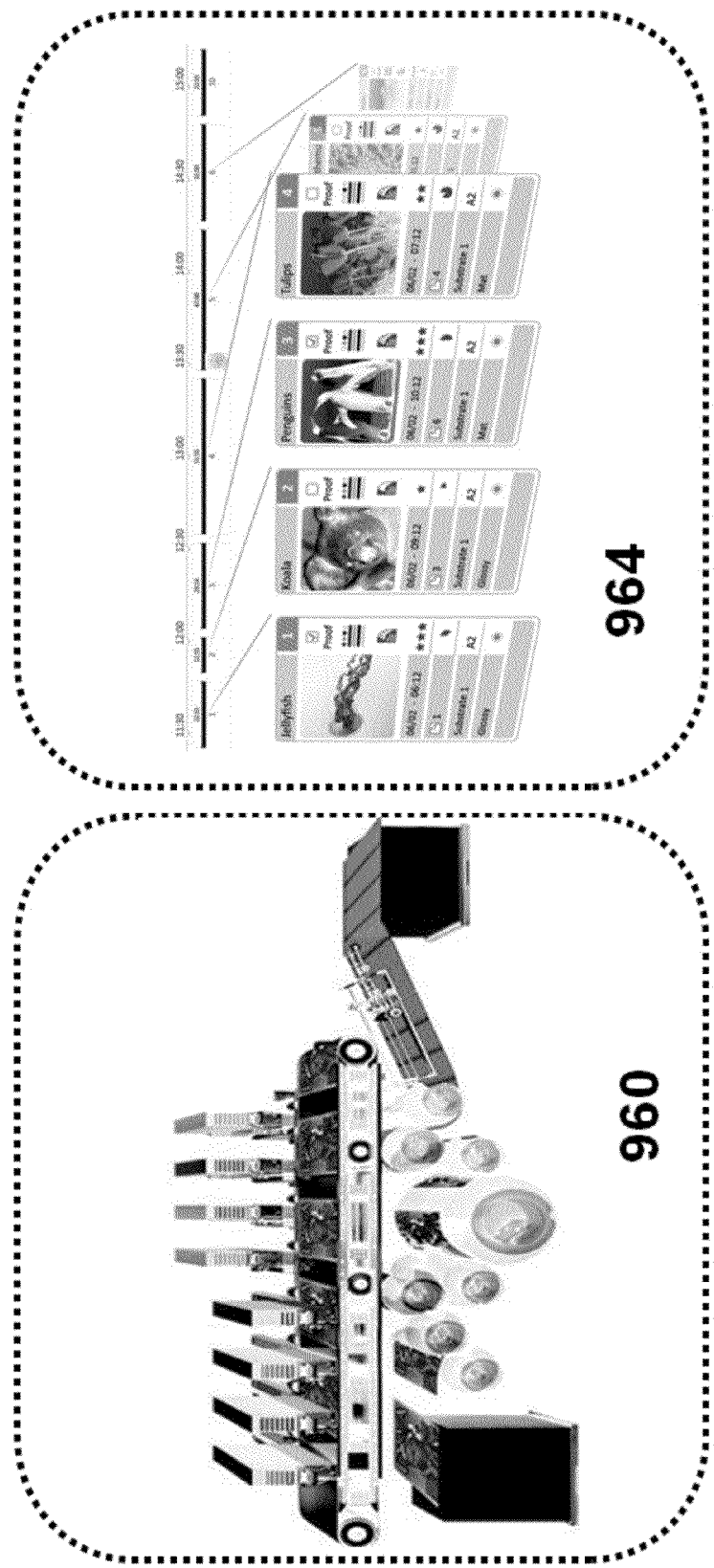
FIG. 3 illustrates various GUIs (graphic user interfaces) describing operation of a printing system.

In the example of FIGS. 2-3, a plurality of GUIs describing past, present and/or future operation of printing system 990 are displayed on display screens 970A-970B. On display screen 970A is a machine-oriented GUI 960 described below with reference to FIGS. 9-14, while on display screen 970B is a timeline GUI 964 described below with reference to FIGS. 16-17.

Although not a requirement, some embodiments are discussed in the context of a digital printing system where the intermediate transfer member is a flexible blanket. FIGS. 4-8 describe sheet fed and web fed examples of such a printing system.

FIGS. 2-3 and 9-15 relate to a machine-oriented GUI 960 for visualizing operation of the printing system. As discussed below, various 'reversed augmented reality' features may be provided for visualization and control of the digital printing system. Alternatively or additionally, as illustrated in FIGS. 2-3, 16A-16B and 17B, a time-line-based GUI 964 describing queued print jobs may be provided.

FIG. 17 and FIGS. 20-22 relate to a large display screen 970 configured to display information about the printing system 990 (e.g. having or lacking an intermediate transfer member). The example of FIGS. 17A-17B and FIGS. 20-22 illustrate an alternate configuration that differs from the configuration illustrated in FIGS. 1-2.

Figure 20:
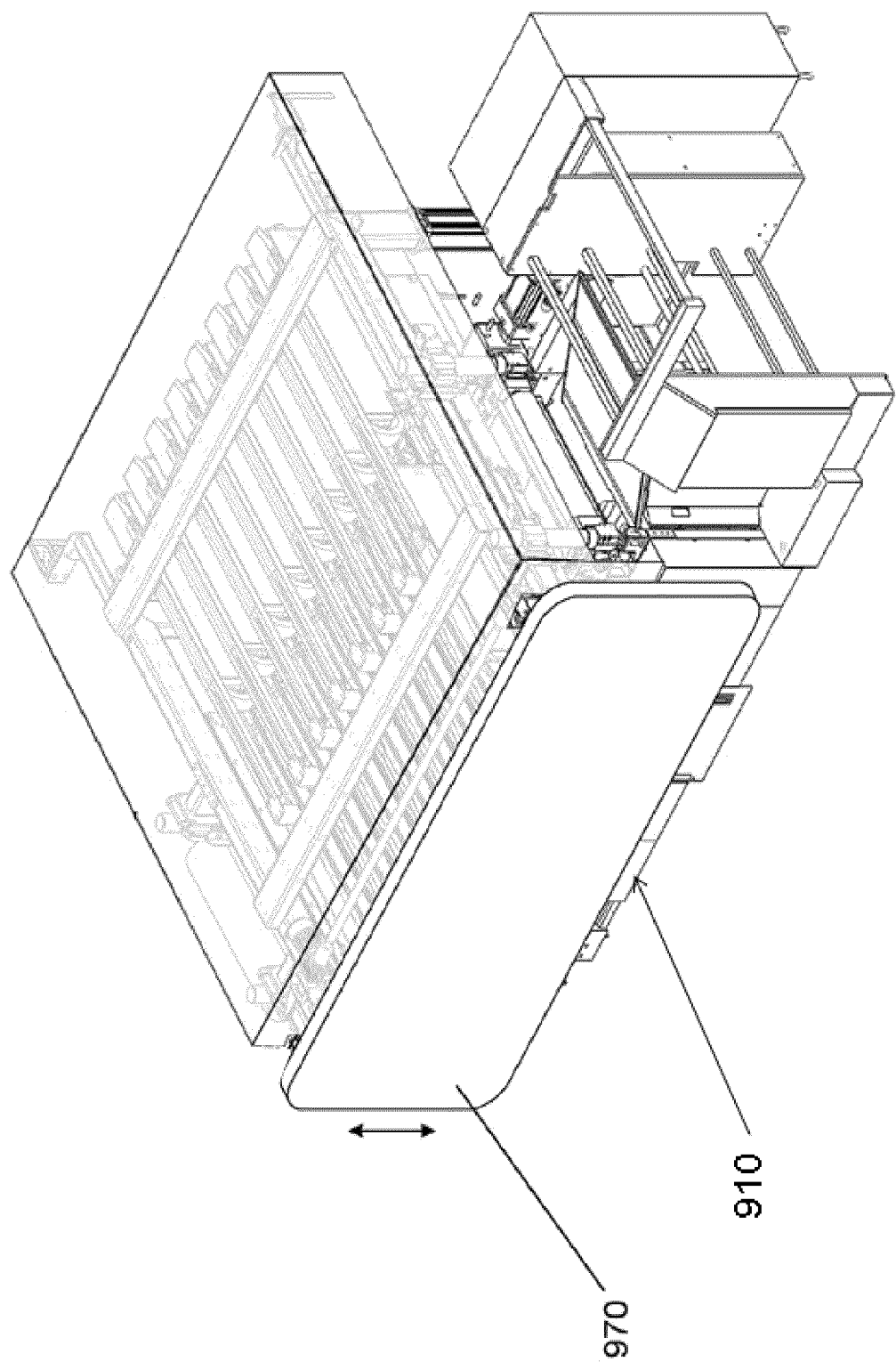
FIGS. 20 and 22 illustrate a printing system in a configuration where a large screen thereof is disposed so as to block access to the substrate transport system and/or to the intermediate transfer member.
Figure 21A:
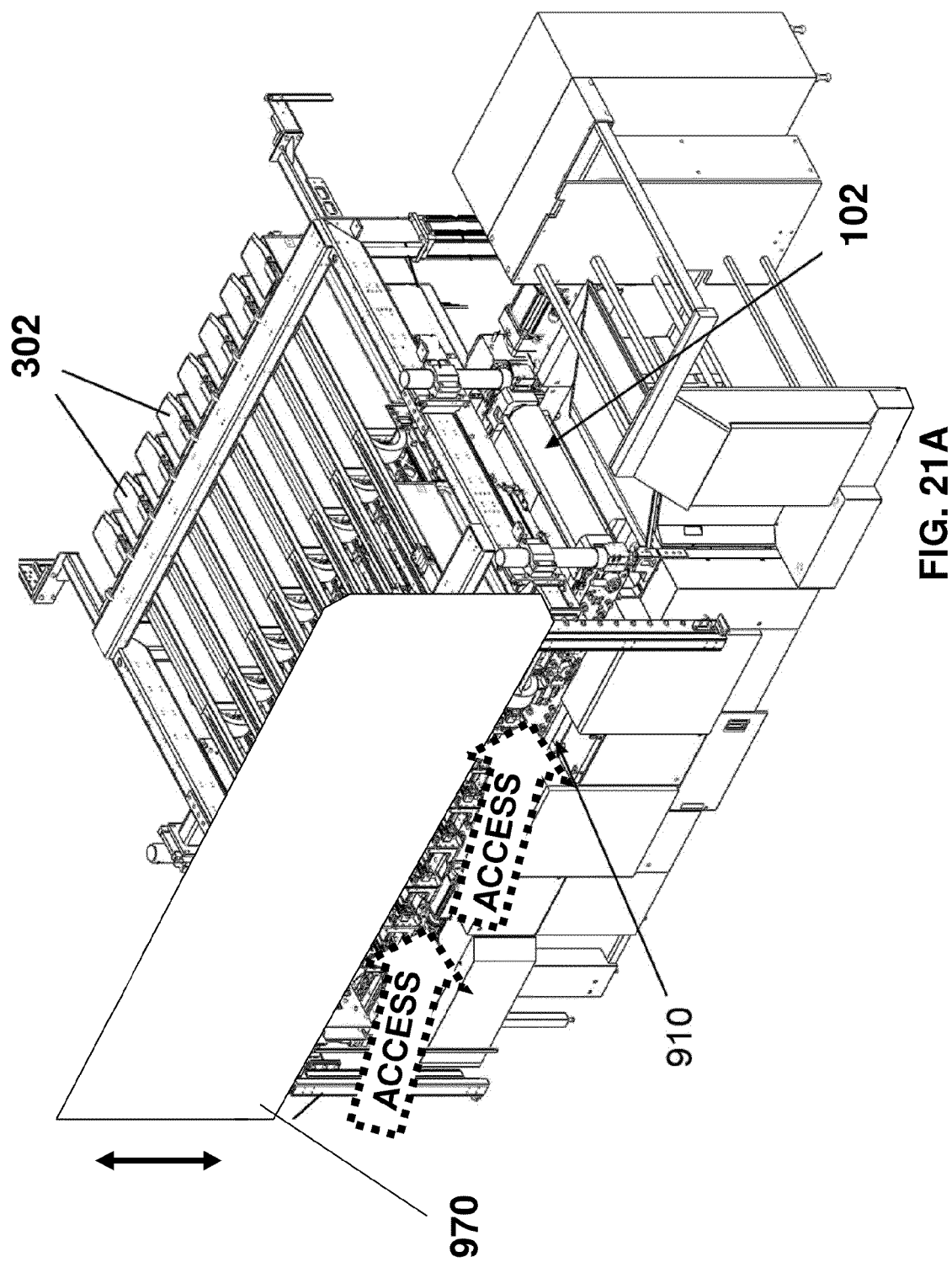
FIGS. 21A and 21B illustrate a printing system in a configuration where a large screen thereof is disposed so as to allow access to the substrate transport system and/or to the intermediate transfer member.
Figure 21B:
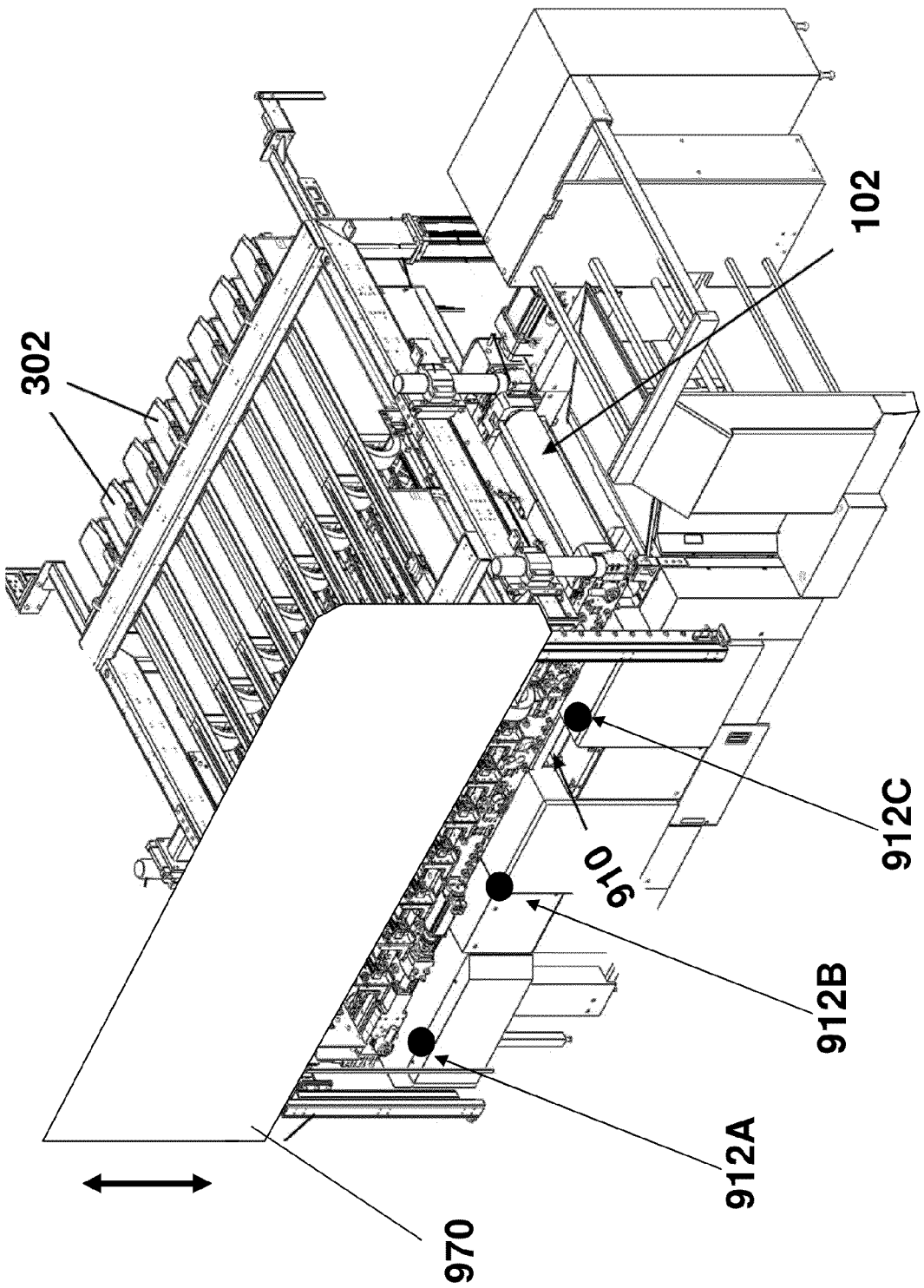
Figure 22:
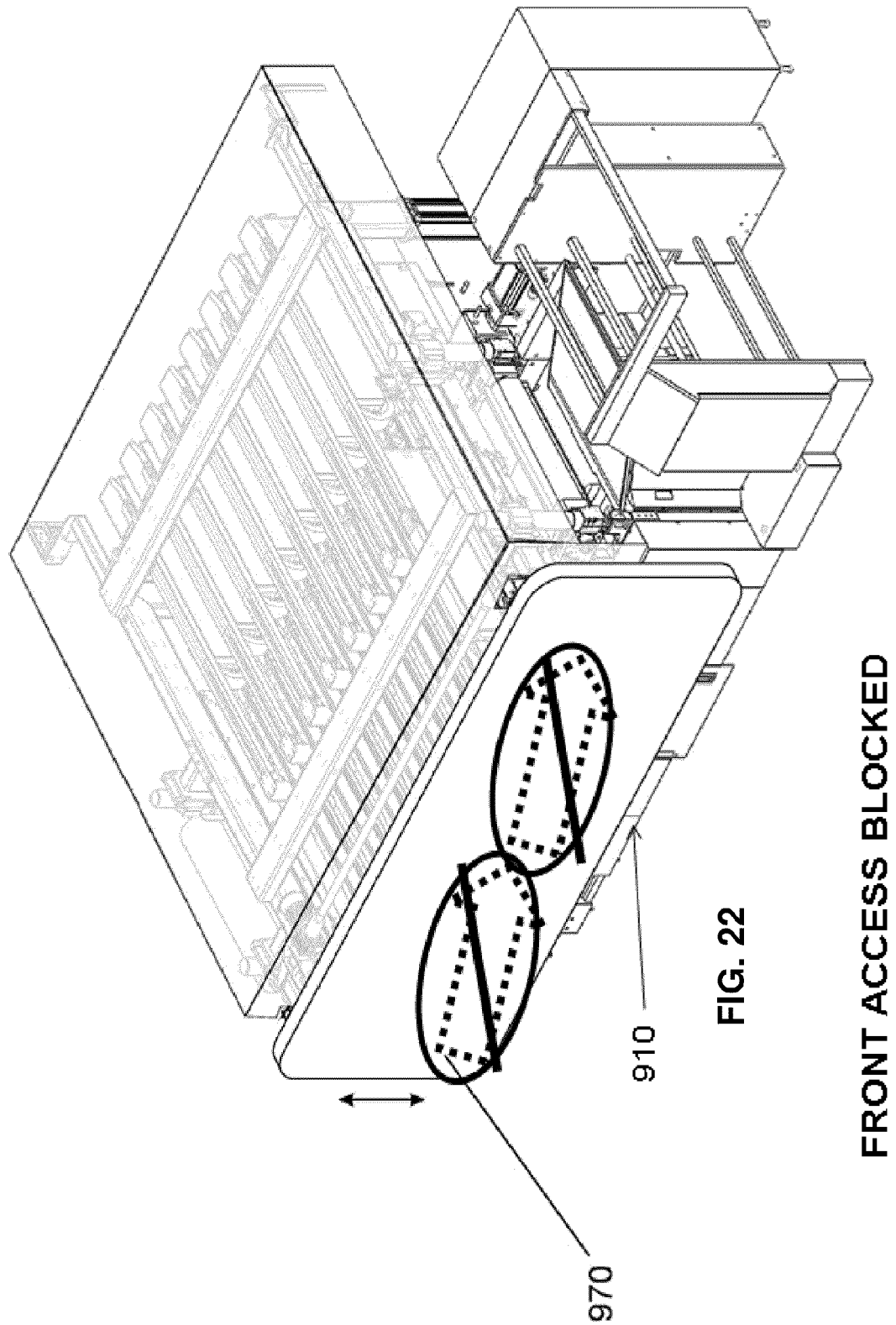

In some embodiments, as illustrated in FIGS. 20-22, the display screen 970 may be movable so that: (i) when the display screen 970 is in a first position/orientation (see FIG. 20), the screen blocks front access to a substrate transport system or an image transfer location thereof; (ii) translational and/or rotational movement of the display screen 970 from the first position/orientation to a second position/orientation (see FIG. 21) opens front access to the substrate transport system or to the image transfer location thereof.

In some embodiments, as discussed below with reference to FIGS. 23-25, the display screen may include one or more features for achieving the illusion of a display system having a front panel with no obvious means of support. Although the display screen providing this illusion is discussed in the context of printing system-mounted display screens, the skilled artisan would appreciate that this is not a limitation.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage. For the present disclosure 'electronic circuitry' is intended broadly to describe any combination of hardware, software and/or firmware.

Electronic circuitry may include any executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. Electronic circuitry may be located in a single location or distributed among a plurality of locations where various circuitry elements may be in wired or wireless electronic communication with each other.

In various embodiments, an ink image is first deposited on a surface of an intermediate transfer member, and transferred from the surface of the intermediate transfer member to a substrate (i.e. sheet substrate or web substrate). For the present disclosure, the terms 'intermediate transfer member' and 'image transfer member' are synonymous, and may be used interchangeably.

For the present disclosure, the terms 'substrate transport system' and 'substrate handling system' are used synonymous, and refer to the mechanical systems for moving substrate.

'Indirect' printing systems or indirect printers include an intermediate transfer member. One example of an indirect printer is a digital press. Another example is an offset printer.

The location at which the ink image is transferred to substrate is defined as the 'image transfer location.' It is appreciated that for some printing devices, there may be a plurality of 'image transfer locations.'

A Discussion of FIGS. 4-8: Description of One Example of an Indirect Printing System The printing system shown in FIGS. 4-5 essentially comprises three main components or subsystems, namely a blanket conveyer system 100, an image forming station 300 above the blanket conveyer system 100 and a substrate transport system 500 below the blanket conveyer system 100. Some portions of the image forming station and substrate transport system are shown in more detail in FIG. 8. It is appreciated that the indirect printing system of FIGS. 4-8 is just an example, and in other examples the intermediate transfer member may be a rigid drum or a blanket mounted thereon.

In the non-limiting examples of FIGS. 4-8, blanket conveyer system 100 comprises an endless belt or blanket 102 that acts as an intermediate transfer member and is guided over two rollers 104, 106. An image made up of dots of an ink is applied by image forming station 300 to an upper run of blanket 102. A lower run selectively interacts at two impression stations with two impression cylinders 502 and 504 of the substrate transport system 500 to impress an image onto a substrate compressed between the blanket 102 and the respective impression cylinder 502, 504. As will be explained below, the purpose of there being two impression cylinders 502, 504 is to permit duplex printing. The printing system in FIGS. 4-5 can produce double sided prints, images being impressed on opposite sides of the substrate at the two impression cylinders, and it can also produce single sided prints at twice the speed of duplex printing. In the non-limiting example of FIGS. 4-5, duplex printing is carried out by multiple impression cylinders. Alternatively, duplex printing may be performed by a single impression cylinder. In operation, ink images, each of which is a mirror image of an image to be impressed on a final substrate, are printed by an image forming station 300 onto the upper run of blanket 102. In this context, the term 'run' is used to mean a length or segment of the blanket between any two given rollers over which is the blanket is guided. While being transported by the blanket 102, the ink is heated to dry it by evaporation of most, if not all, of the liquid carrier. The ink image is furthermore heated to render tacky the film of ink solids remaining after evaporation of the liquid carrier, this film being referred to as a residue film, to distinguish it from the liquid film formed by flattening of each ink droplet. At the impression cylinders 502, 504 the image is impressed onto individual sheets of a substrate which are conveyed by substrate transport system 500 from an input stack 506 to an output stack 508 via the impression cylinders 502, 504. In the alternative embodiment of FIG. 8, the substrate is a continuous web.

Image Forming Station

In an embodiment of the invention, the image forming station 300 comprises print bars 302 each slidably mounted on a frame 304 positioned at a fixed height above the surface of the blanket 102. Each print bar 302 may comprise a strip of print heads as wide as the printing area on the blanket 102 and comprises individually controllable print nozzles. The image forming station can have any number of bars 302, each of which may contain an ink of a different color.

Blanket and Blanket Support System

The blanket 102, in one embodiment of the invention, is seamed. In particular, the blanket is formed of an initially flat strip of which the ends are fastened to one another to form a continuous loop, optionally in a releasable manner. In some embodiments, the releasable fastening may be a zip fastener or a hook and loop fastener that lies substantially parallel to the axes of rollers 104 and 106 over which the blanket is guided. In order to avoid a sudden change in the tension of the blanket as the seam passes over these rollers, it may be possible to incline the fastener relative to the axis of the roller but this would be at the expense of enlarging the non-printable image area.

The primary purpose of the blanket is to receive an ink image from the image forming station and to transfer that image dried but undisturbed to the impression stations. To allow easy transfer of the ink image at each impression station, the blanket may have a release layer upon which the ink is to be deposited. The selection of a suitable release layer depends on the inks to be used and on certain operating parameters of the printing system. The release layer may be optionally further treated, for example to increase its ability to receive an ink image and/or to facilitate the transfer of the dried image therefrom.

The strength of the blanket can be derived from a reinforcement layer. In one embodiment, the reinforcement layer is formed of a fabric. If the fabric is woven, the warp and weft threads of the fabric may have a different composition or physical structure so that the blanket should have, for reasons to be discussed below, greater elasticity in its widthways direction (parallel to the axes of the rollers 104 and 106) than in its lengthways direction.

The blanket may comprise additional layers between the reinforcement layer and the release layer, for example to provide conformability of the release layer to the surface of the substrate, to act as a thermal reservoir or a thermal partial barrier and/or to allow an electrostatic charge to the applied to the release layer. An inner layer may further be provided to control the frictional drag on the blanket as it is rotated over its support structure. Additional layers may be used to connect or adhere between the release and reinforcement layers and any other layer the blanket may comprise.

Figure 6:
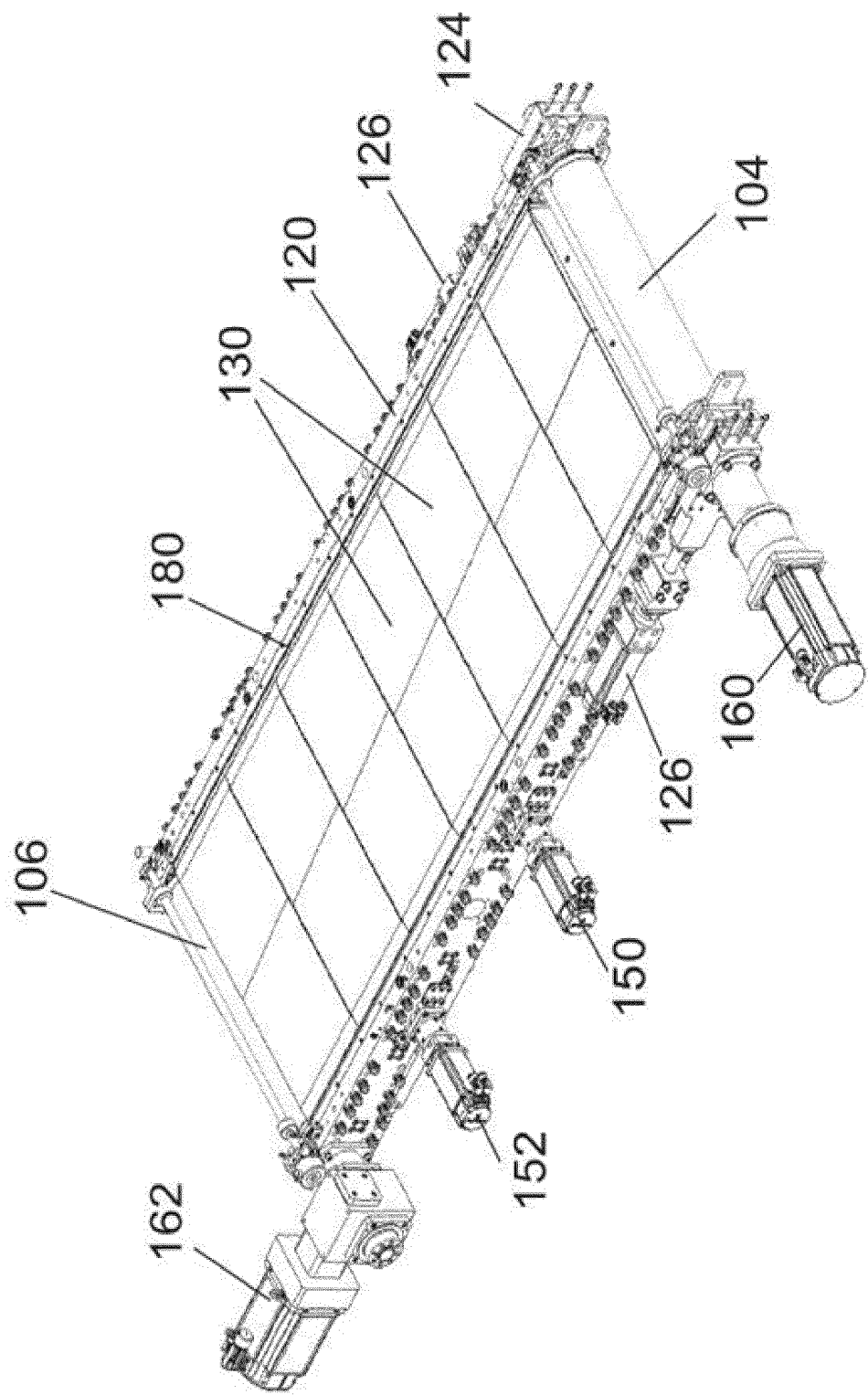
FIGS. 6-7 illustrate an exemplary support system for a blanket conveyer.
Figure 7:
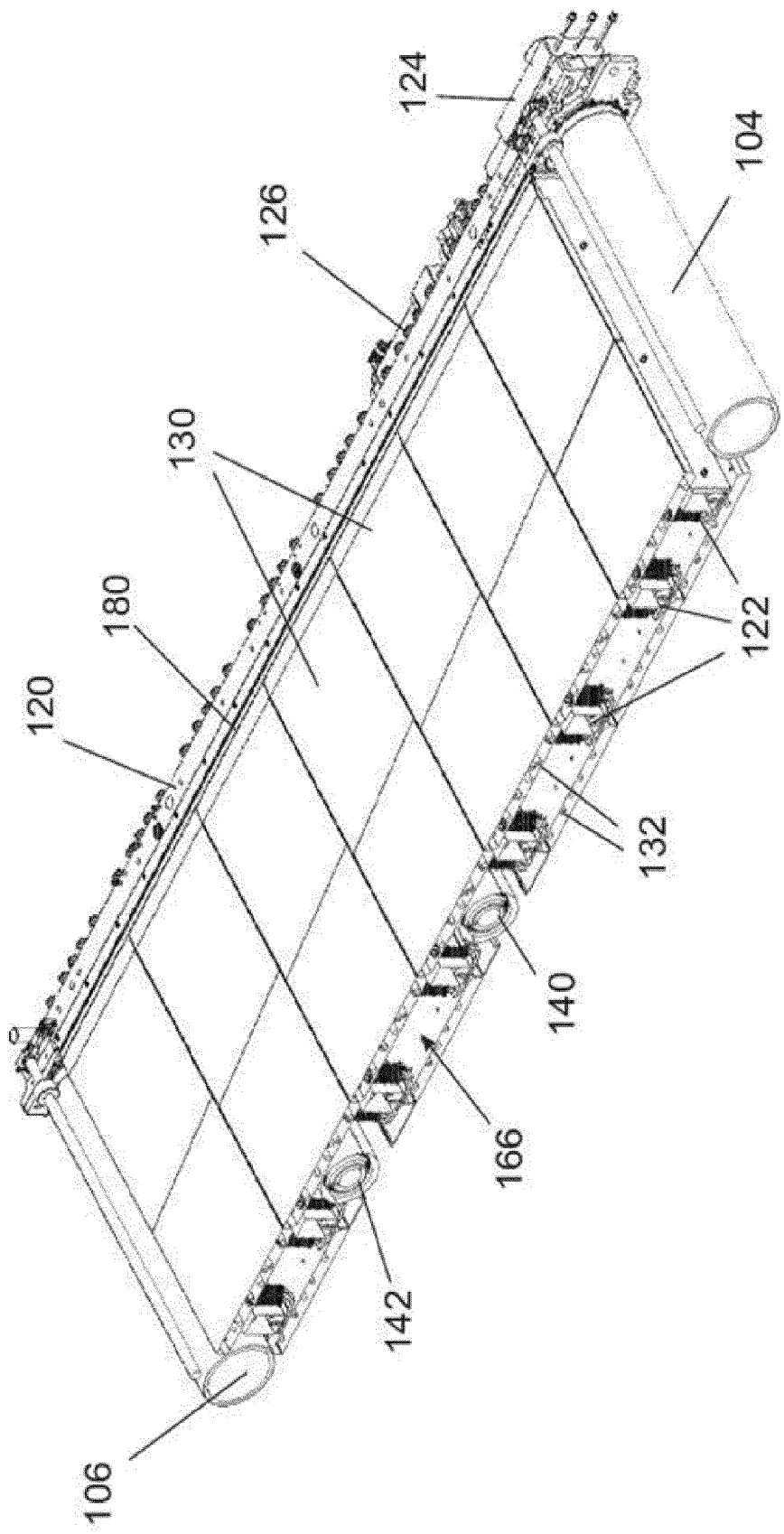

The structure supporting the blanket is shown in FIGS. 6-7. Two elongate outriggers 120 are interconnected by a plurality of cross beams 122 to form a horizontal ladder-like frame on which the remaining components are mounted.

The roller 106 is journalled in bearings that are directly mounted on outriggers 120. At the opposite end, however, roller 104 is journalled in pillow blocks 124 that are guided for sliding movement relative to outriggers 120. Motors 126, for example electric motors, which may be stepper motors, act through suitable gearboxes to move pillow blocks 124, so as to alter the distance between the axii of rollers 104 and 106, while maintaining them parallel to one another.

Thermally conductive support plates 130 are mounted on cross beams 122 to form a continuous flat support surface both on the top and bottom sides of the support frame. The junctions between the individual support plates 130 are intentionally offset from each other (e.g. zigzagged) in order not to create a line running parallel to the length of the blanket 102. Electrical heating elements 132 are inserted into transverse holes in plates 130 to apply heat to the plates 130 and through plates 130 to the upper run of blanket 102. Other means for heating the upper run will occur to the person of skill in the art and may include heating from below, above of within the blanket itself.

Also mounted on the blanket support frame are two pressure or nip rollers 140, 142. The pressure rollers are located on the underside of the support frame in gaps between the support plates 130 covering the underside of the frame. Pressure rollers 140, 142 are aligned respectively with impression cylinders 502, 504 of the substrate transport system, as shown most clearly in FIG. 5.

Each of the pressure rollers 140, 142 is preferably mounted so that it can be raised and lowered from the lower run of the blanket. In one embodiment each pressure roller is mounted on an eccentric that is rotatable by a respective actuator 150, 152. When it is raised by its actuator to an upper position within the support frame, each pressure roller is spaced from the opposing impression cylinder, allowing the blanket to pass by the impression cylinder without making contact with neither the impression cylinder itself nor with a substrate carried by the impression cylinder. On the other hand, when moved downwards by its actuator, each pressure roller 140, 142 projects downwards beyond the plane of the adjacent support plates 130 and deflects the blanket 102, forcing it against the opposing impression cylinder 502, 504. In this lower position, it presses the lower run of the blanket against a substrate being carried on the impression roller (or the web of substrate in the embodiment of FIG. 8). An alternative configuration is described in PCT Publication No. WO 2013/132420 of the same Applicant, incorporated herein by reference in its entirety.

Figure 5:
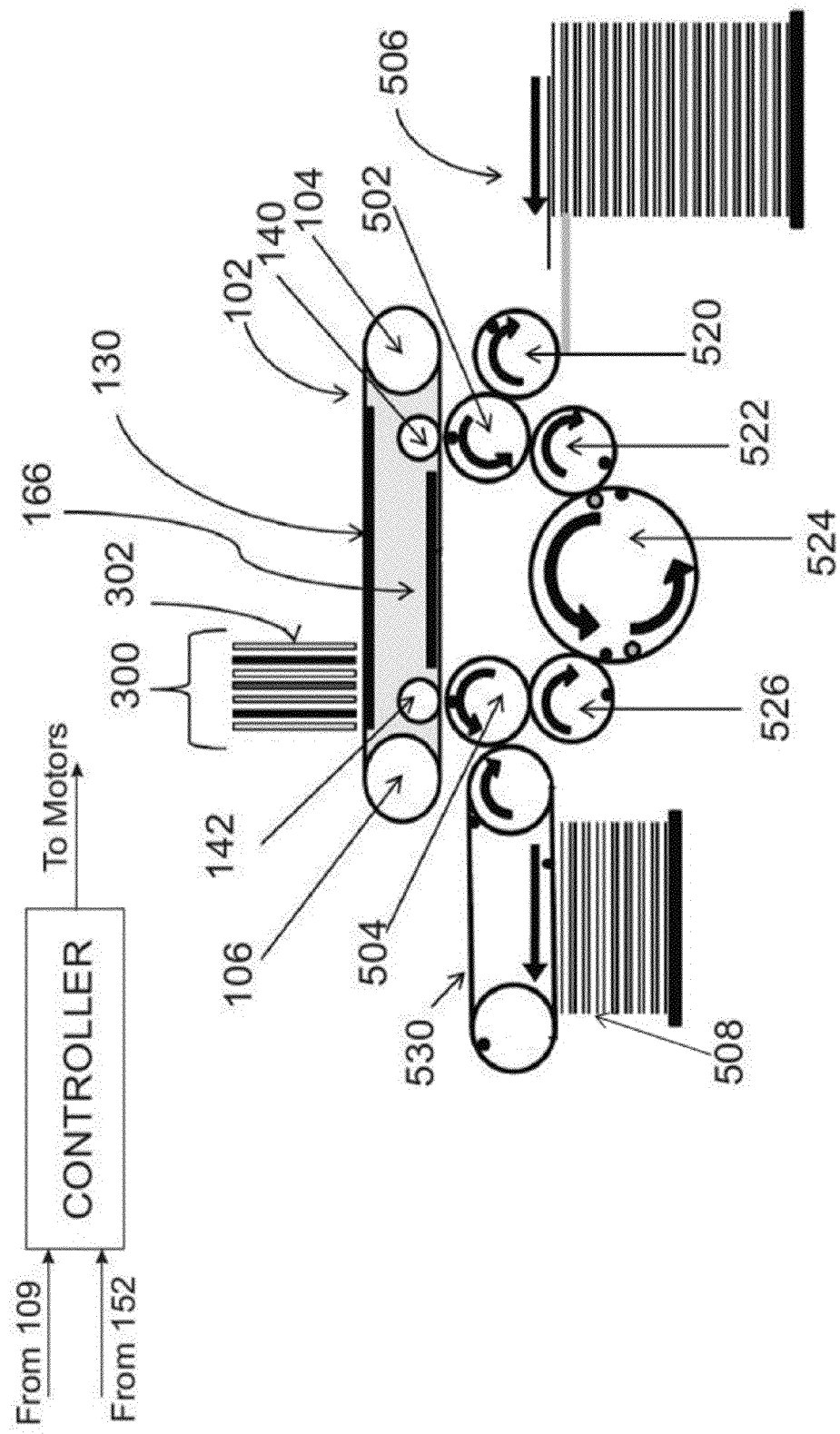
FIG. 5 is a schematic vertical section through the printing system of FIG. 4.

Rollers 104 and/or 106 may be connected to respective electric motors 160, 162 as viewed in FIG. 6, to drive the blanket clockwise as illustrated in FIG. 5.

It should be understood that in an embodiment of the invention, pressure rollers 104 and 106 can be independently lowered and raised such that either both or only one of the rollers is in the lower position.

In an embodiment of the invention, a fan or air blower (not shown) is mounted on the frame to maintain a sub-atmospheric pressure in the volume 166 bounded by the blanket and its support frame. The negative pressure serves to maintain the blanket flat against the support plates 130 on both the upper and the lower side of the frame, in order to achieve good thermal contact. If the lower run of the blanket is set to be relatively slack, the negative pressure would also assist in and maintaining the blanket out of contact with the impression cylinders when the pressure rollers 140, 142 are not actuated.

In an embodiment of the invention, each of the outriggers 120 also supports a continuous track 180, which engages formations on the side edges of the blanket to maintain the blanket taut in its widthways direction. The formations may be the teeth of one half of a zip fastener attached to the side edge of the blanket and the track may be of a cross-section suitable to receive the teeth.

In order for the image to be properly formed on the blanket and transferred to the final substrate and for the alignment of the front and back images in duplex printing to be achieved, a number of different elements of the system must be properly synchronized. In order to properly position the images on the blanket, the position and speed of the blanket must be both known and controlled. In an embodiment of the invention, the blanket is marked at or near its edge with one or more marking(s) spaced in the direction of motion of the blanket. One or more sensors 107, shown schematically on FIG. 5, senses the timing of these markings as they pass the sensor. The speed of the blanket and the speed of the surface of the impression rollers should be the same, for proper transfer of the images to the substrate from the transfer blanket. Signals from sensor 107 are sent to a controller 109 which also receives an indication of the speed of rotation and angular position of the impression rollers, for example from encoders on the axis of one or both of the impression rollers (not shown). Sensor 107, or another sensor (not shown), also determines the time at which the seam of the blanket passes the sensor. For maximum utility of the usable length of the blanket, it is desirable that the images on the blanket start as close to the seam as feasible.

The controller controls the electric motors 160 and 162 to ensure that linear speed of the blanket is the same as the speed of the surface of the impression rollers.

Because the blanket contains an unusable area at the seam, it is important to ensure that this area always remain in the same position relative to the printed images in consecutive cycles of the blanket. Also, it is preferable to ensure that whenever the seam passes the impression cylinder, it should always coincide with a time when an interruption in the surface of the impression cylinder (accommodating the substrate grippers to be described below) faces a pressure cylinder.

In order to achieve this, the length of the blanket should be set to a whole number multiple of the circumference of the impression cylinders 502, 504. Since the length of the blanket changes with time, the position of the seam relative to the impression rollers may be changed by momentarily changing the speed of the blanket. When synchronism is again achieved, the speed of the blanket is again adjusted to match that of the impression rollers, when it is not engaged with the impression cylinders 502, 504. The length of the blanket can be determined from a shaft encoder measuring the rotation of one of rollers 104, 106 during one sensed complete revolution of the blanket.

The controller also controls the timing of the flow of data to the print bars.

This control of speed, position and data flow ensures synchronization between image forming station 300, substrate transport system 500 and blanket conveyer system 100 ensures that the images are formed at the correct position on the blanket for proper positioning on the final substrate. The position of the blanket is monitored by means of one or more markings on the surface of the blanket that are detected by one or more sensors mounted at different positions along the length of the blanket. The output signals of these sensors are used to indicate the position of the image transfer surface to the print bars. Analysis of the output signals of the sensors is further used to control the speed of the motors 160 and 162 to match that to the impression cylinders 502, 504.

As its length is a factor in synchronization, the blanket may be constructed so as to resist stretching and creep. In the transverse direction, on the other hand, the blanket may be constructed so as to maintain the blanket flat taut without creating excessive drag due to friction with the support plates 130.

Ink Image Heating

The heaters 132 inserted into the support plates 130 are used to heat the blanket to a temperature that may vary depending on various factors such as the composition of the inks and of the release layer. In one non-limiting example, this temperature may be between 50° C. and 180° C. The temperature of the body of blankets 102 having relatively high thermal capacity and low thermal conductivity, will not change significantly as it moves between the image forming station and the impression station(s). To apply heat at different rates to the ink image carried by the transfer surface, external heaters or energy sources (not shown) may be used to apply additional energy locally, for example prior to reaching the impression stations to render the ink residue tacky, prior to the image forming station to dry the wetting agent and at the image forming station to start evaporating the carrier from the ink droplets as soon as possible after they impact the surface of the blanket.

Substrate Transport Systems

Figure 4:
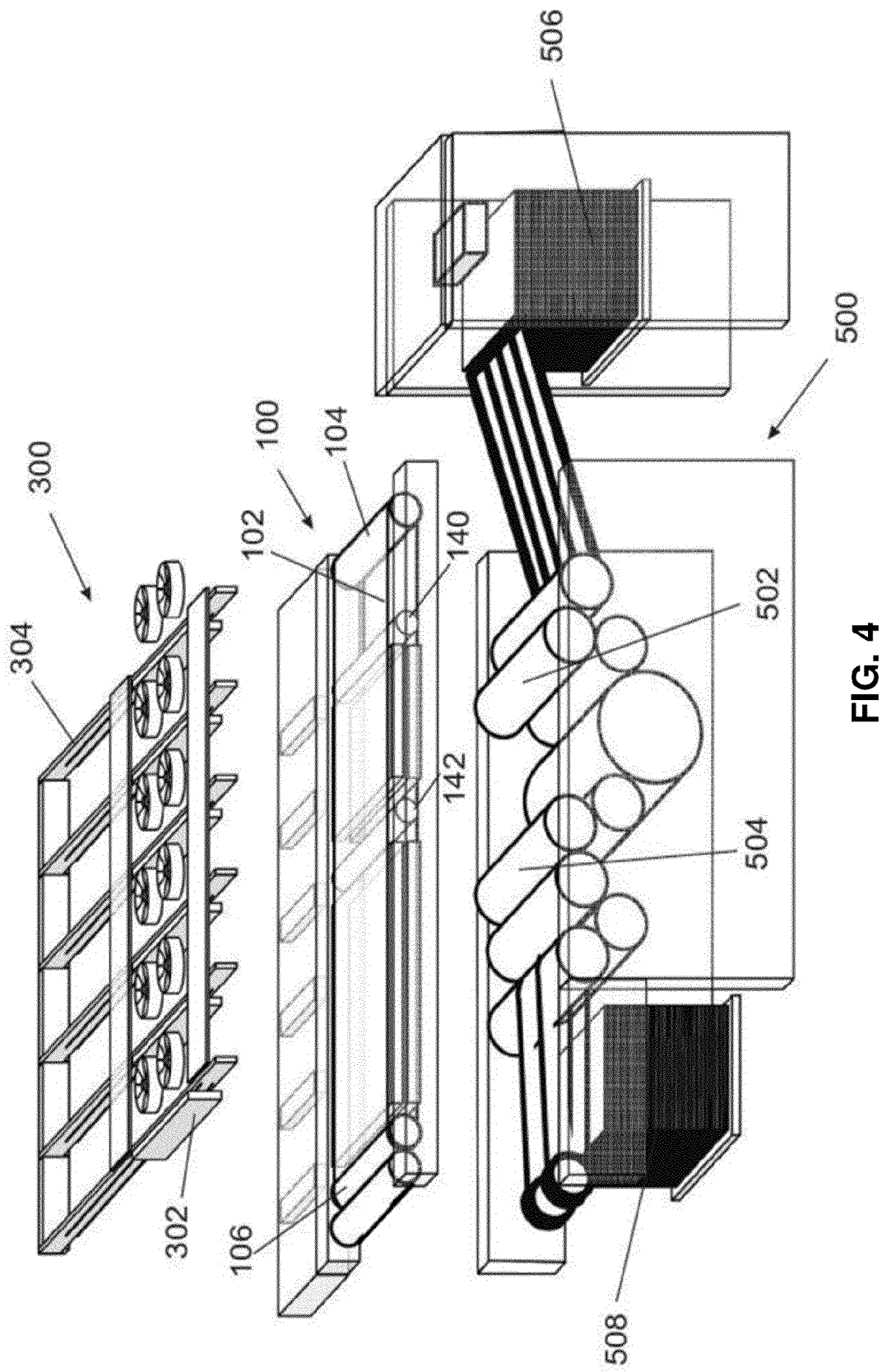
FIG. 4 is an exploded schematic perspective view of a printing system.
Figure 8:
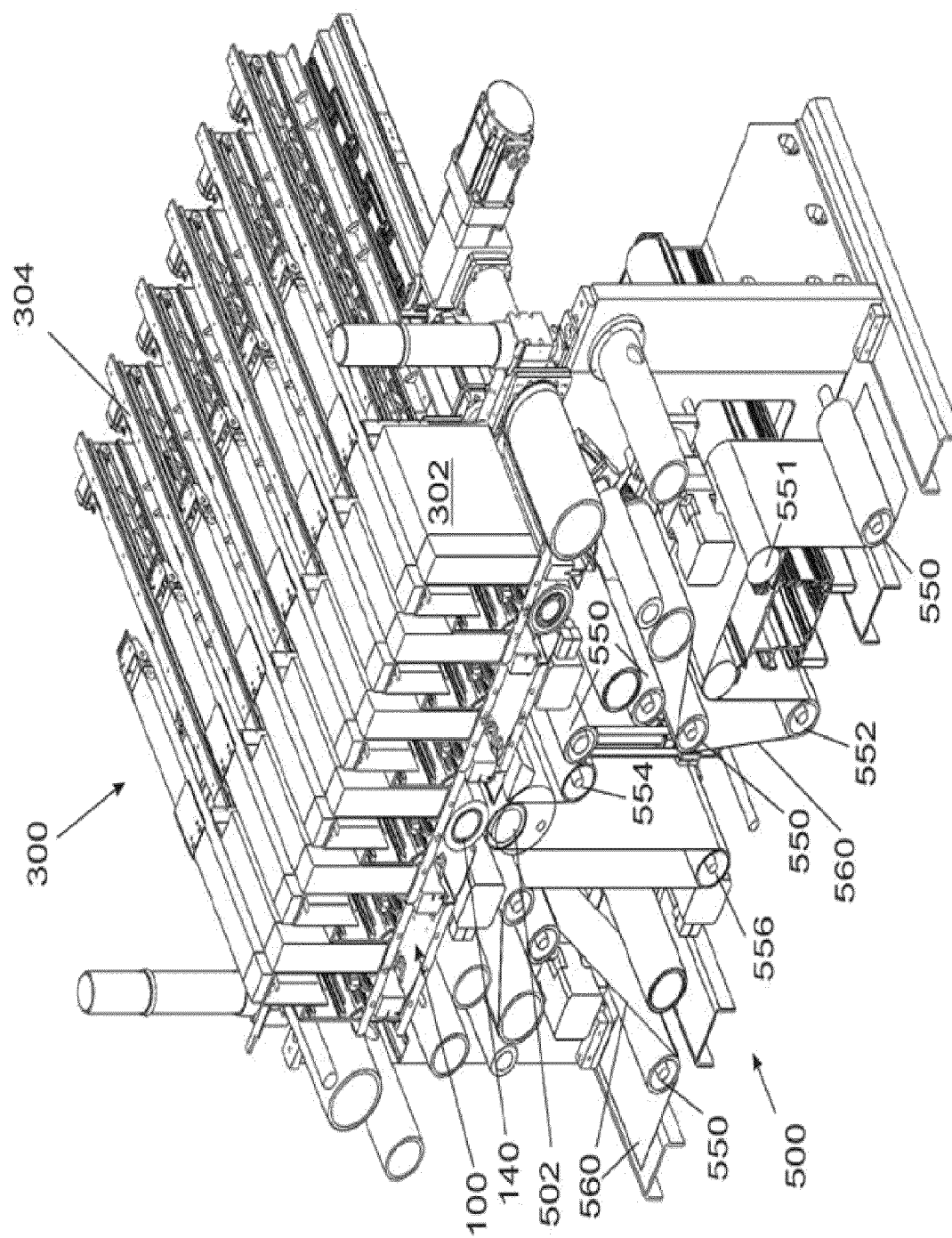
FIG. 8 illustrates an exemplary web-based printing system.

The substrate transport may be designed as in the case of the embodiment shown in FIGS. 4-5 to transport individual sheets of substrate to the impression stations or, as is shown in FIG. 8, to transport a continuous web of the substrate.

In the case of FIGS. 4-5, individual sheets are advanced, for example by a reciprocating arm, from the top of an input stack 506 to a first transport roller 520 that feeds the sheet to the first impression cylinder 502.

Though not shown in the drawings, but known per se, the various transport rollers and impression cylinders may incorporate grippers that are cam operated to open and close at appropriate times in synchronism with their rotation so as to clamp the leading edge of each sheet of substrate. In an embodiment of the invention, the tips of the grippers at least of impression cylinders 502 and 504 are designed not to project beyond the outer surface of the cylinders to avoid damaging blanket 102.

After an image has been impressed onto one side of a substrate sheet during passage between impression cylinder 502 and blanket 102, the sheet is fed by a transport roller 522 to a perfecting cylinder 524 that has a circumference that is twice as large as the impression cylinders 502, 504. The leading edge of the sheet is transported by the perfecting cylinder past a transport roller 526, of which the grippers are timed to catch the trailing edge of the sheet carried by the perfecting cylinder and to feed the sheet to second impression cylinder 504 to have a second image impressed onto its reverse side. The sheet, which has now had images printed onto both its sides, is advanced by a belt conveyor 530 from second impression cylinder 504 to output stack 508.

As the images printed on the blanket are always spaced from one another by a distance corresponding to the circumference of the impression cylinders, in embodiments of the present invention the distance between the two impression cylinders 502 and 504 is also set to be equal to the circumference of the impression cylinders 502, 504 or a multiple of this distance. The length of the individual images on the blanket is of course dependent on the size of the substrate not on the size of the impression cylinder.

In the embodiment shown in FIG. 8, a web 560 of the substrate is drawn from a supply roll (not shown) and passes over a number of guide rollers 550 with fixed axes and stationary cylinders 551 that guide the web past the single impression cylinder 502.

Some of the rollers over which the web 560 passes do not have fixed axes. In particular, on the in-feed side of the web 560, a roller 552 is provided that can move vertically. By virtue of its weight alone, or if desired with the assistance of a spring acting on its axle, roller 552 serves to maintain a constant tension in web 560. If, for any reason, the supply roller offers temporary resistance, roller 552 will rise and conversely roller 552 will move down automatically to take up slack in the web drawn from the supply roll.

At the impression cylinders, web 560 is required to move at the same speed as the surface of the blanket. Unlike the embodiment described above, in which the position of the substrate sheets is fixed by the impression rollers, which assures that every sheet is printed when it reaches the impression rollers, if the web 560 were to be permanently engaged with blanket 102 at the impression cylinder 502, then much of the substrate lying between printed images would need to be wasted.

To mitigate this problem, there are provided, straddling impression cylinder 502, two dancers 554 and 556 that are motorized and are moved up and down in opposite directions in synchronism with one another. After an image has been impressed on the web, pressure roller 140 is disengaged to allow the web 560 and the blanket to move relative to one another. Immediately after disengagement, dancer 554 is moved downwards at the same time as the dancer 556 is moved up. Though the remainder of the web continues to move forward at its normal speed, the movement of dancers 554 and 556 has the effect of moving a short length of the web 560 backwards through the gap between impression cylinder 502 and blanket 102 from which it is disengaged. This is done by taking up slack from the run of web following impression cylinder 502 and transferring it to the run preceding the impression cylinder. The motion of the dancers is then reversed to return them to their illustrated position so that the section of web at the impression cylinder is again accelerated up to the speed of the blanket. Pressure roller 140 can now be re-engaged to impress the next image on the web but without leaving large blank areas between the images printed on the web.

FIG. 8 shows a printing system having only a single impression roller, for printing on only one side of a web. To print on both sides a tandem system can be provided, with two impression rollers and a web inverter mechanism in between the impression rollers to allow turning over the web for double sided printing. Alternatively, if the width of the blanket exceeds twice the width of the web, it is possible to use the two halves of the same blanket and impression cylinder to print on the opposite sides of different sections of the web at the same time.

A Discussion of FIGS. 9-15: A Description of Reverse Augmented Reality GUI 960 Describing Operation of a Printing System Having an Intermediate Transfer Member Embodiments of the present invention relate to computer-simulation or virtual-reality-like tools and techniques for visualizing information about operation of a real-world printing system where real-world ink images are (i) first formed on a rotating intermediate transfer member 102 (e.g. a rigid drum or a blanket mounted thereto or a blanket guided over a plurality of guide rollers—for example, a flexible blanket or belt) and (ii) subsequently transferred therefrom to a substrate (e.g. sheet substrate or web substrate). The real-world printing system may include a substrate transport system 500 (e.g. for sheet or web substrate) having multiple cylinders and configured for cooperating with the intermediate transfer member in order to transfer real-world ink images resident on the real-world intermediate transfer member from the real-world intermediate transfer member to the real-world substrate.

The real-world ink image as it appears on the rotating intermediate transfer member 102 is a mirror-image of the real-world ink image after it is transferred from the transfer member to the substrate.

As will be explained below, the term 'real world' refers to physical mechanical parts of the printing system or to physical ink images as opposed to their 'virtual counterparts' which either relate to stored computer data or to a computer-graphics description of a real world item visually displayed (e.g. on a display screen).

In some embodiments, computer graphics representations of (i) the real-world rotating intermediate transfer member 102 and (ii) the substrate transport system 500 may be displayed to a user on a display screen 970. It is possible to superimpose on the aforementioned computer graphics representations (i.e. on display screen) (i) live video feeds from camera(s) aimed at locations within substrate transport system and (ii) an animation of images in motion along the rotating intermediate transfer member 102.

In this sense, the presently-disclosed interface may, in some embodiments, be considered a 'reverse augmented reality' or hybrid display interface combining a virtual-world-like description of printing system operation (i.e. including the graphics representations and the computer animation) with real-world video superimposed thereon.

As discussed below with reference to FIGS. 11-13, in some embodiments the real-world video may be acquired by one or more cameras 993 directed at relevant locations relative to the printing system. Each camera generates a different respective video feed of events in a real world location and this video feed, within the machine-oriented GUI 960 is displayed in a position and orientation that matches its real-world counterpart.

Thus, in some embodiments the presently disclosed user interface allows the user to view a live description of vital press functions including but not limited to substrate feeding, image transfer, substrate delivery, and image formation on a rotating 'blanket' or intermediate transfer element. This may be used for any purpose including but not limited to quality control and service related tasks.

Figure 9:
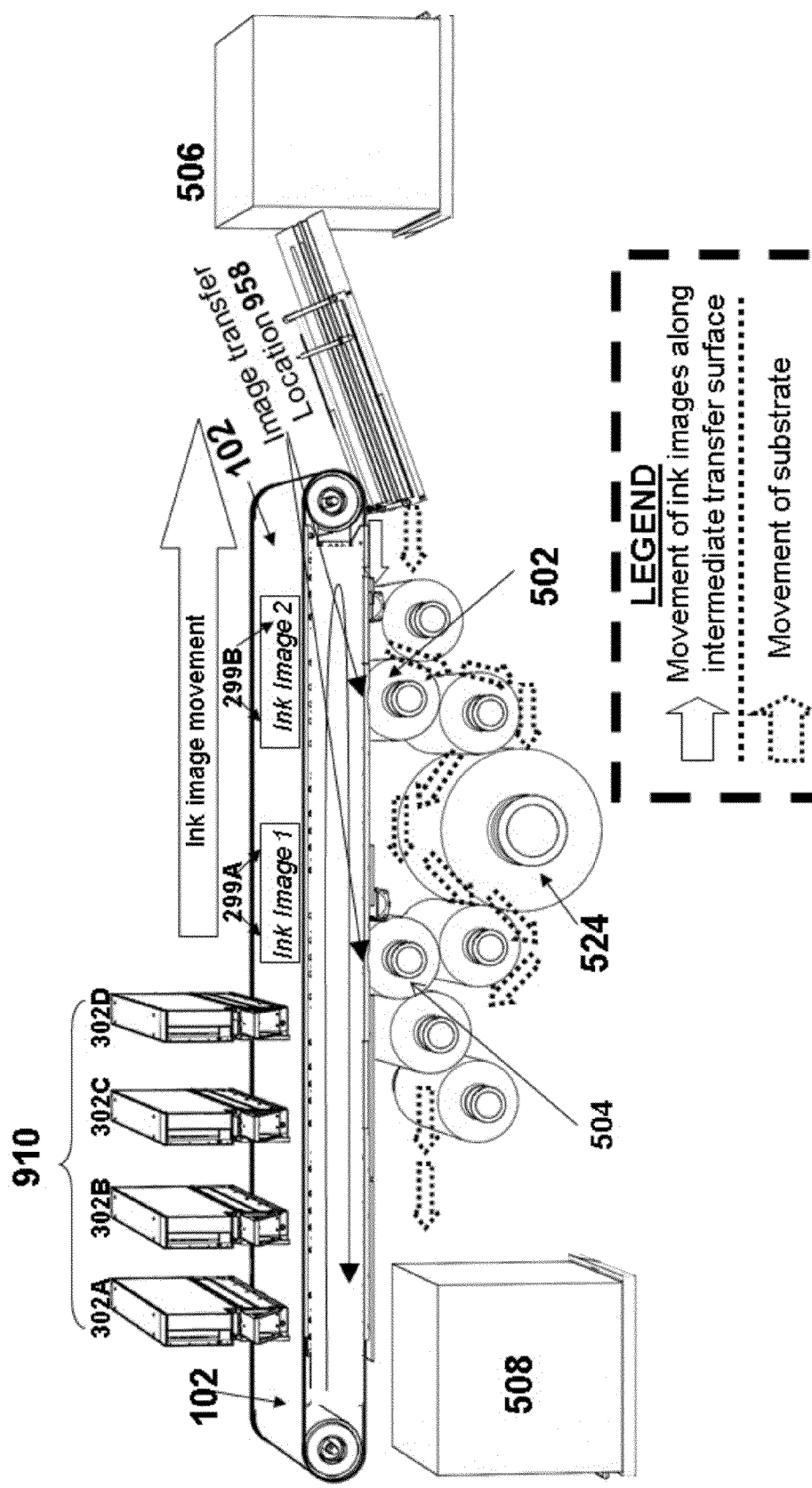
FIG. 9 illustrates a movement of ink images and a movement of substrate in an indirect printing system.

FIG. 9 is a drawing of a real-world printing system where ink images 299 formed at a real-world image-forming station move along the surface of the rotating intermediate transfer member 102 to a real-world image transfer location 958 which is determined by a location of a real-world impression cylinder 502. Also illustrated in FIG. 9 is a path of movement of a substrate defined by the broken arrows.

Figure 10:
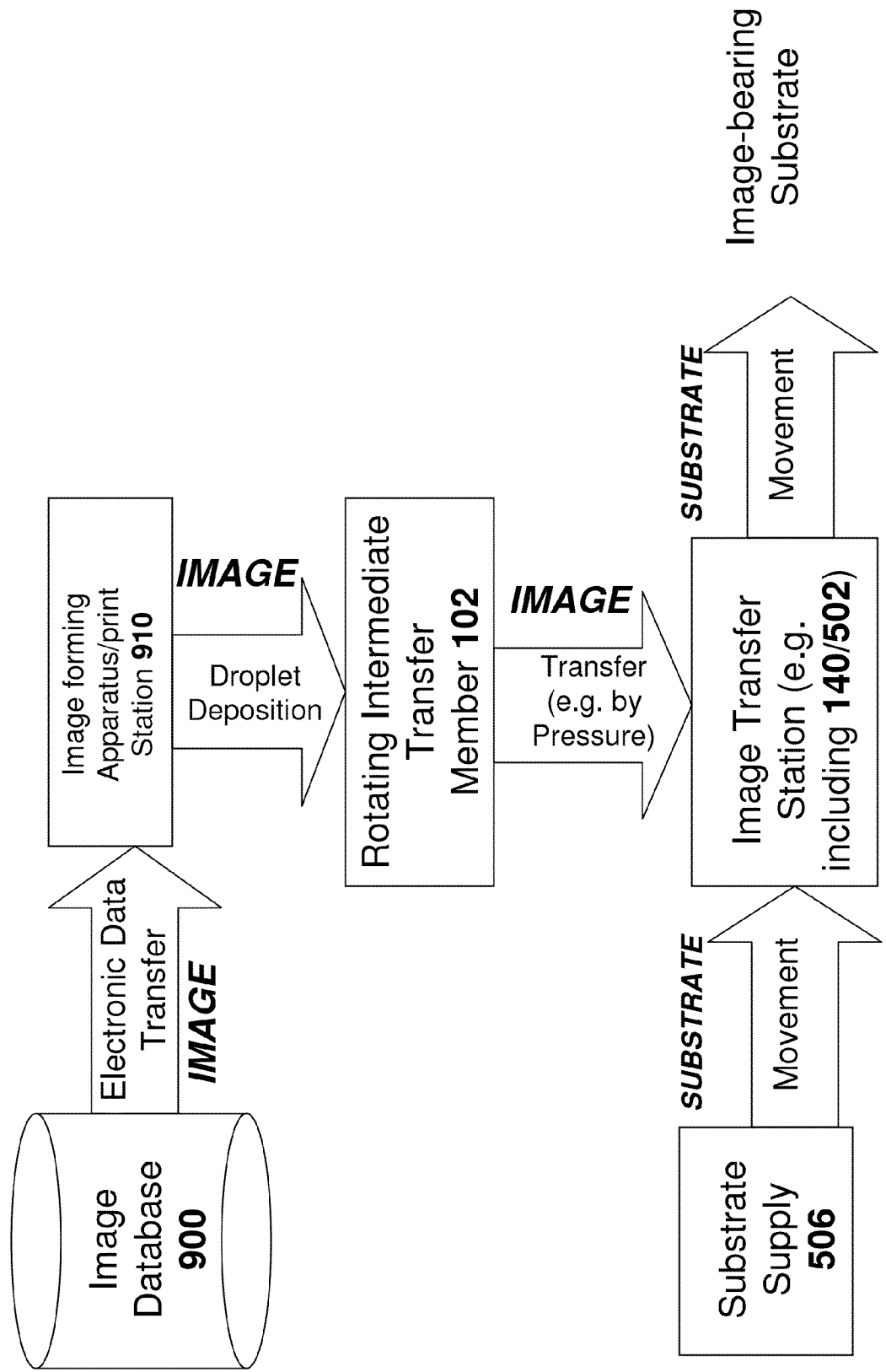
FIG. 10 is a block diagram of an indirect printing system.

FIG. 10 illustrates a flow chart of how digital images initially resident in image database 900 (e.g. implemented using any combination of volatile and/or non-volatile memory or storage—the term 'database' is defined broadly) end up on physical substrate to form a physical-image-bearing physical substrate. Thus, real-world image-forming apparatus or print station 300 (e.g. comprising real-world print bars 302) deposits ink droplets onto a moving (e.g. rotating) intermediate transfer member 102 according to contents of the image database 900 in order to form an ink image whose content matches the electronic image data resident within image database 900. This physical ink image on the physical transfer member 102 is eventually transferred to a physical substrate (e.g. web or sheet) fed from substrate supply 506 at a physical image transfer station 958. The substrate then moves away from the image transfer station according to a substrate path (e.g. see the dotted arrows of FIG. 9)—e.g. to an output stack 508.

In some embodiments, the digital image of the image database may be associated with a 'digital image queue' (e.g. displayed using time-line interface 964)—in the order in which the images are to be printed. For example, when printing a book, the images may be printed in forward or reserve order of the pages. Every time an image is printed it is removed from the print queue. Every time a request or command to print another image is generated, one or more images may be added to the print queue. Therefore the print queue is dynamic and has a 'state' at any given moment of time. Images in the database 900 that are 'currently' in the print queue are designated for future printing.

For the present disclosure, a 'substantially current image' is an image that is either (i) an image that is currently being printed and resides on the rotating intermediate transfer member 102 or on a substrate traveling within substrate transport system 500; or (ii) an image 'queued' for printing in the near future—i.e. within the next 5 minutes or 1 minute or 30 seconds or 10 seconds or 1 second. In some embodiments, the set of 'substantially current images' include images that have been recently printed (i.e. within the last 5 minutes or 1 minute or 30 seconds or 10 seconds or 1 second).

Embodiments of the present invention relate to 'hybrid' user interfaces for visualizing one or more of the aforementioned processes and/or any other aspect of printing system operation. In some embodiments, it is possible to: (i) display an illustration or computer graphic of the printing system or system(s) thereof (e.g. substrate transport system 500 or intermediate transfer member 102)—e.g. rather than a photograph thereof; (ii) to augment this 'virtual' representation with moving images of an animation of images (i.e. photographed ink images or images from database 900) along a surface of the intermediate transfer member 102.

Figure 11A:
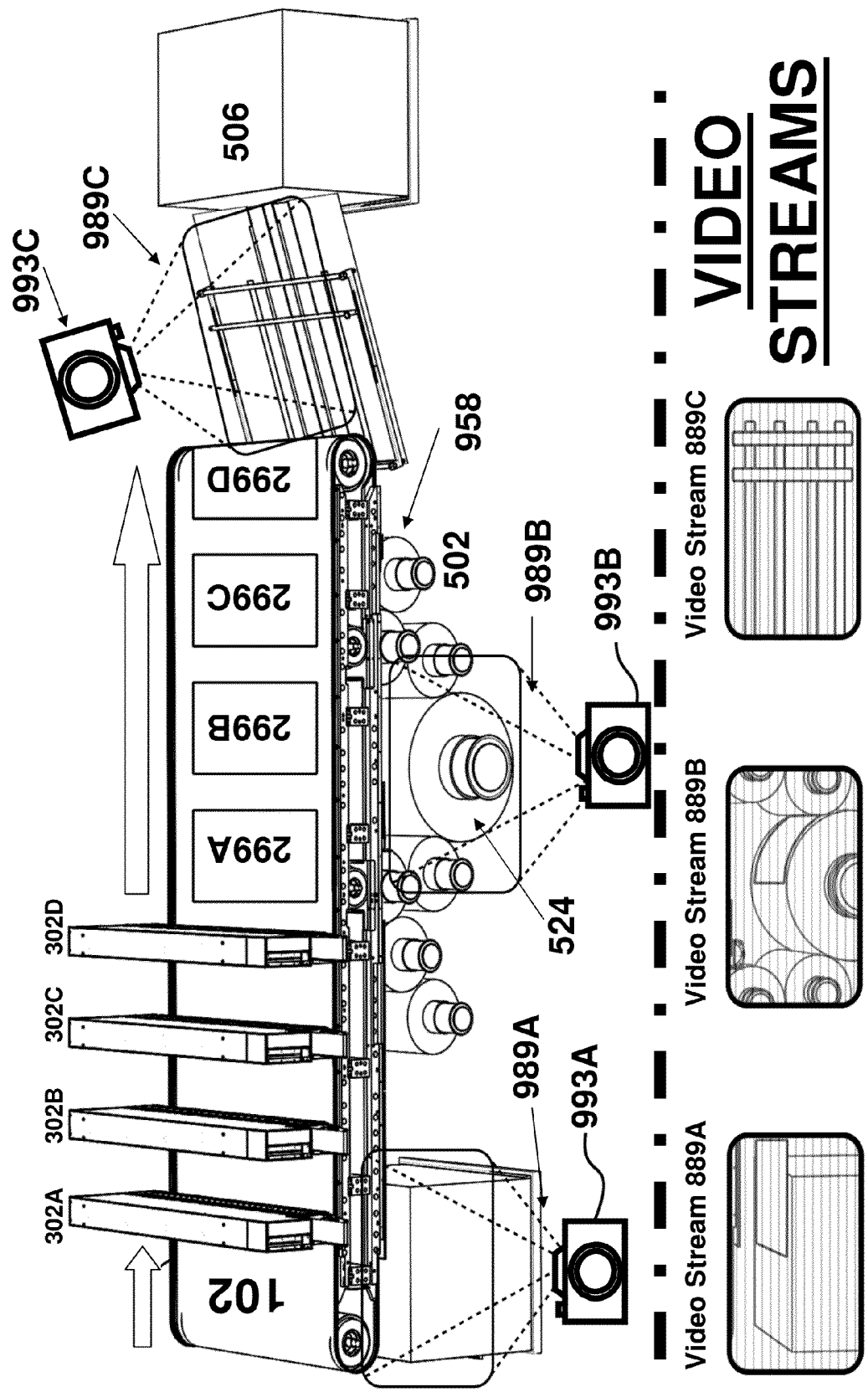
FIGS. 11A, 11B, 12A and 12B illustrate an indirect printing system including mounted cameras.
Figure 11B:
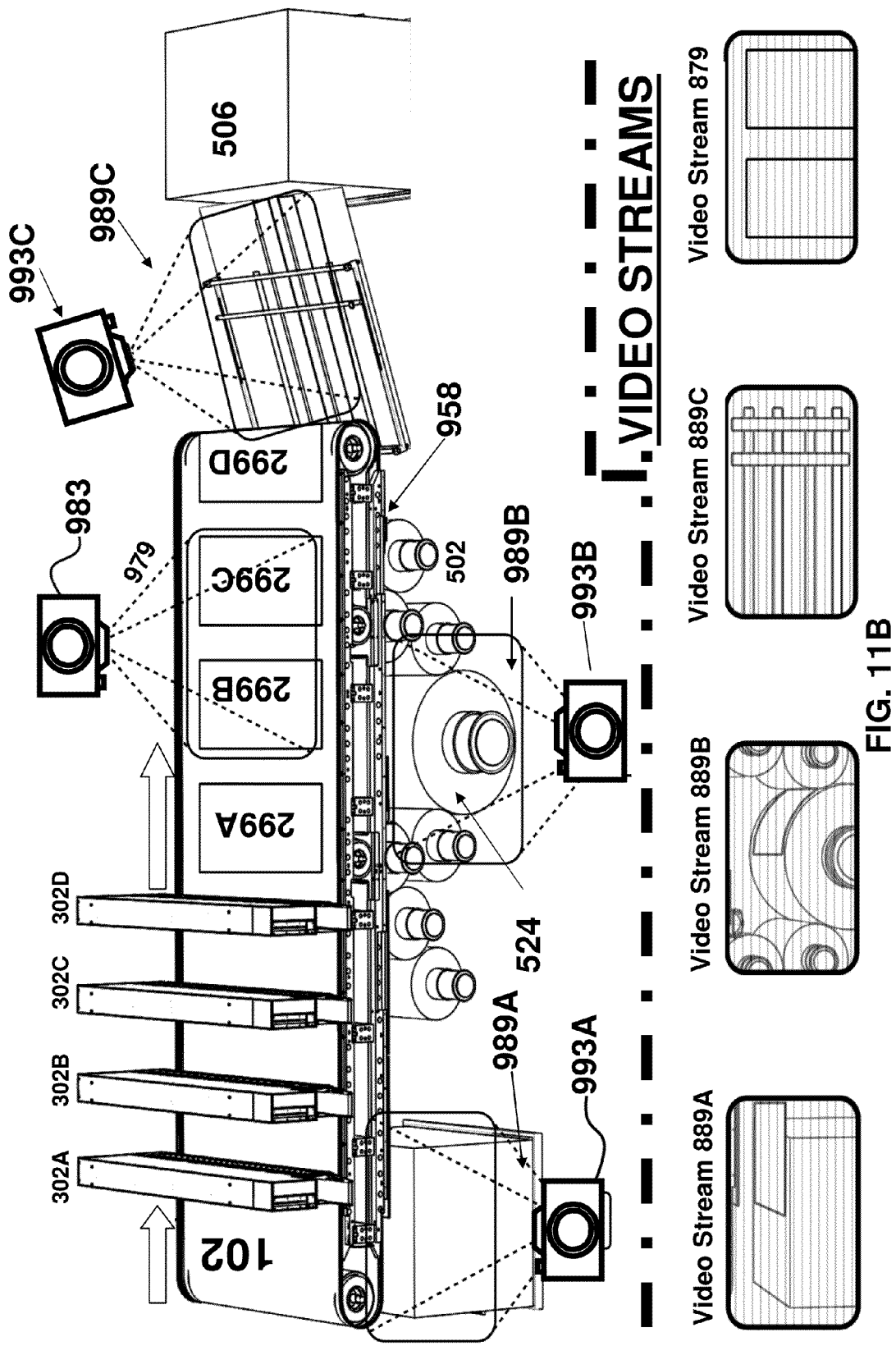

The graphic representation of the moving images on the intermediate transfer member 102 of the animation may be taken from image database 900 or may be taken from a photograph (e.g. still photograph or video feed). In the example of FIG. 11B a camera 983 aimed upon intermediate transfer member 102 in a field of view 979 may acquire a video image of a physical ink image on the physical intermediate transfer member 102. In the example of FIG. 11A, there is no such camera and a digital image from database 900 may be animated (see FIGS. 12-13).

FIGS. 11A-11B illustrate printing system machines where a plurality of video cameras 993 are aimed at locations/fields of view 989 at or near a physical substrate path (e.g. defined in FIG. 9 by the broken arrows). In the example of FIG. 11A, (i) camera 993A is aimed at field of view 989A so as to generate video stream 889A; (ii) camera 993A is aimed at field of view 989B so as to generate video stream 889B; and (iii) camera 993C is aimed at field of view 989C so as to generate video stream 889C. In FIG. 11B, an additional camera 983 is present for acquiring video images of real-world ink images 299 in motion on the surface of the intermediate transfer member 102.

Figure 12A:
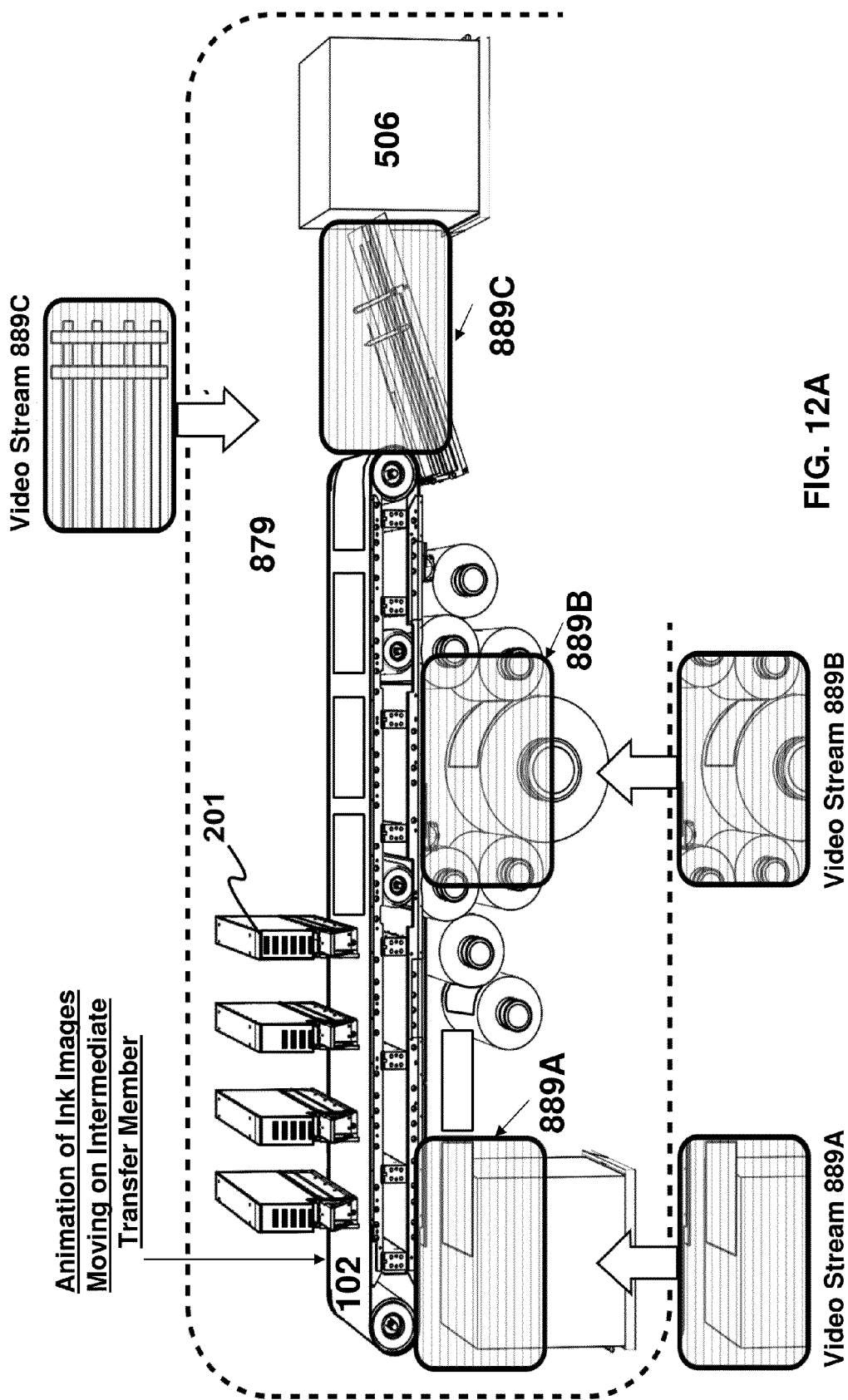
Figure 12B:
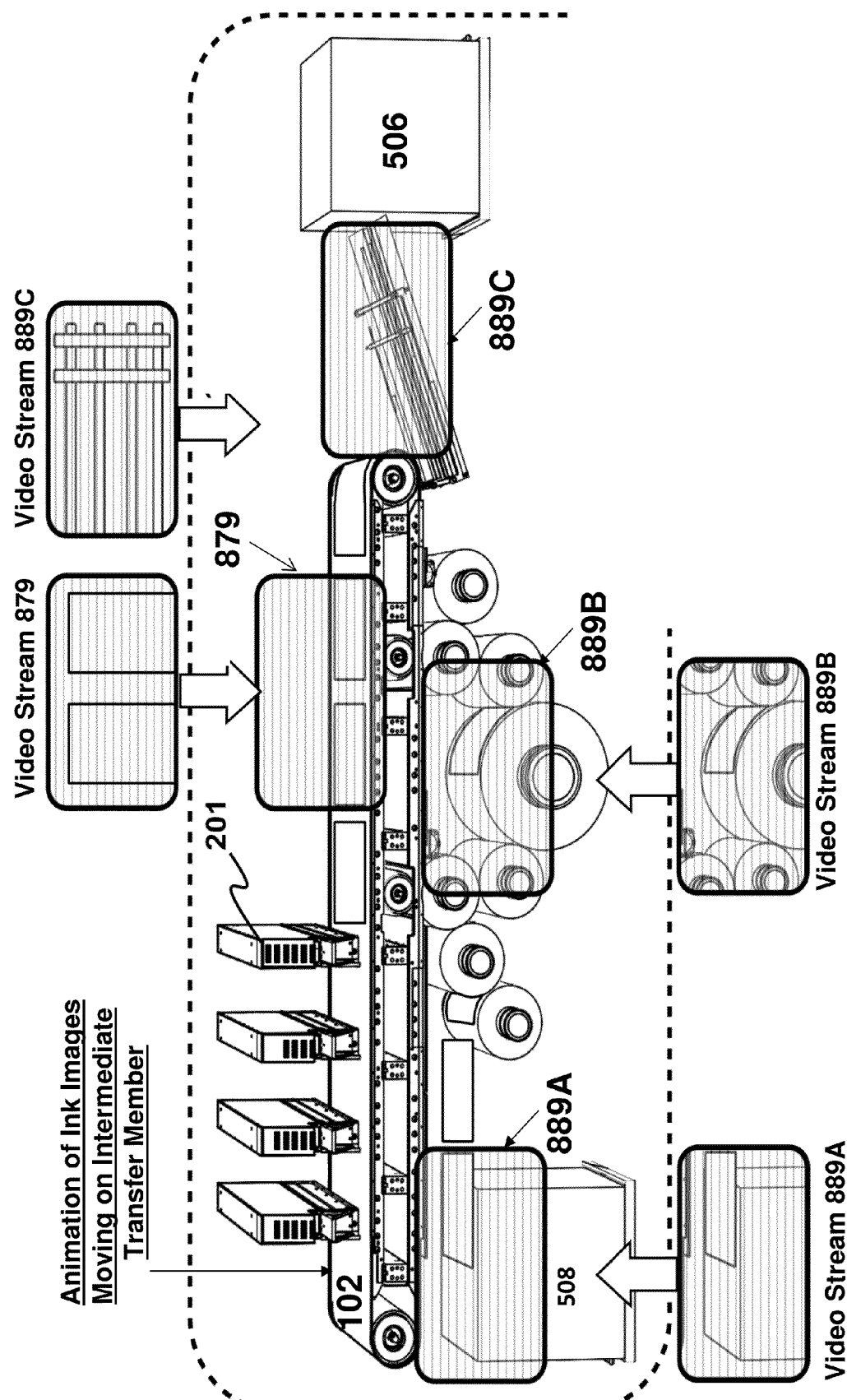

FIG. 12A represents the reverse augmented reality GUI 960 resulting from the physical arrangement of FIG. 11A. In FIG. 12A video stream 889A corresponding to the real world location 989A above physical output stack 508 is displayed in the matching location above a graphical representation of the output stack 508—i.e. the video steam 889A displayed GUI 960 is located relative to the graphical representation of the substrate handling system that corresponds to its real-world counterpart. This is also true for video streams 889B and 889C. FIG. 12B represents the reverse augmented reality GUI 960 resulting from the physical arrangement of FIG. 11B. In the example of FIG. 12B, the video stream 879 is displayed on the virtual surface of the graphical representation of intermediate transfer member 102 so as to correspond to its real-world counterpart location 979.

Figure 13A:
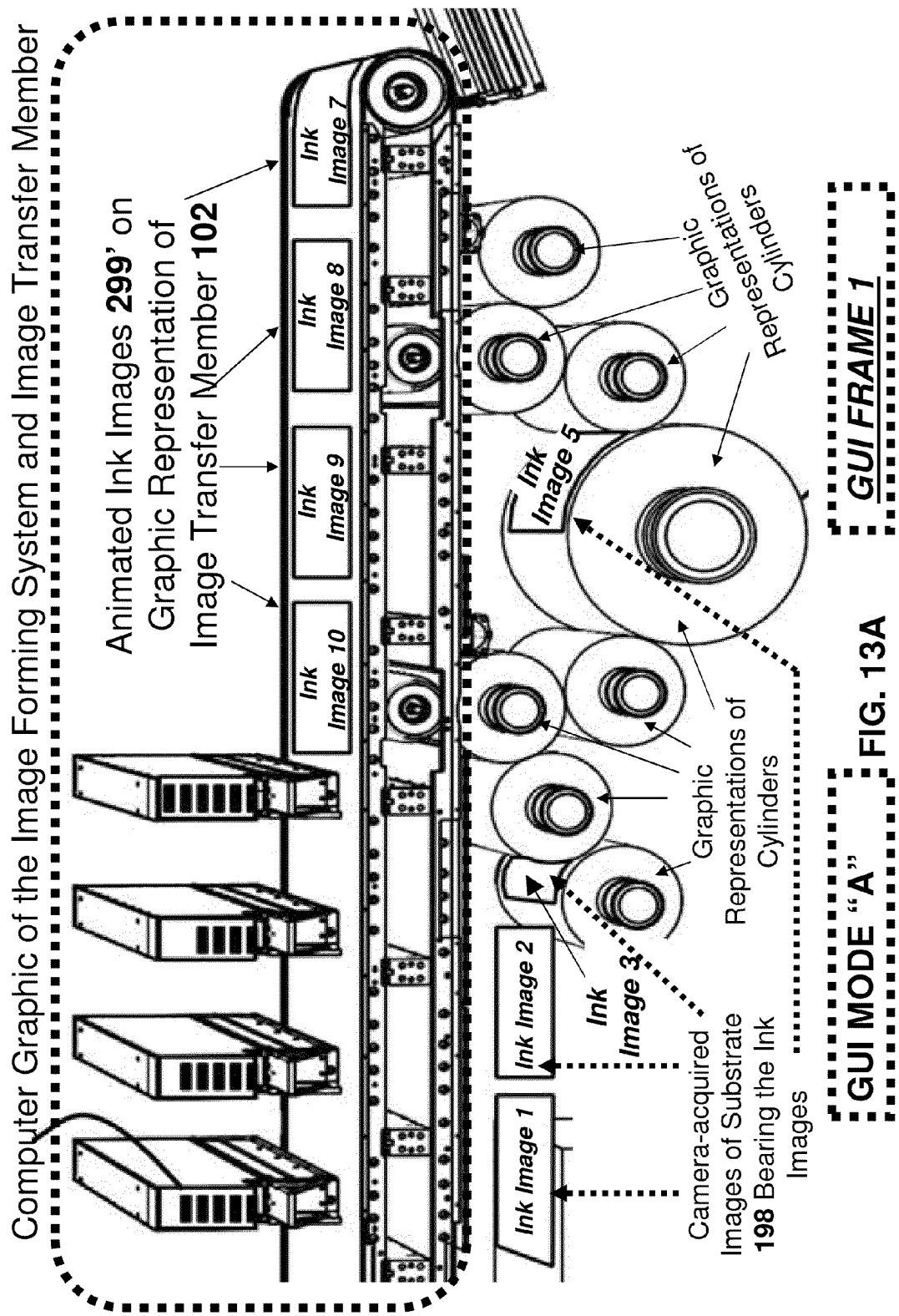
Figure 13C:
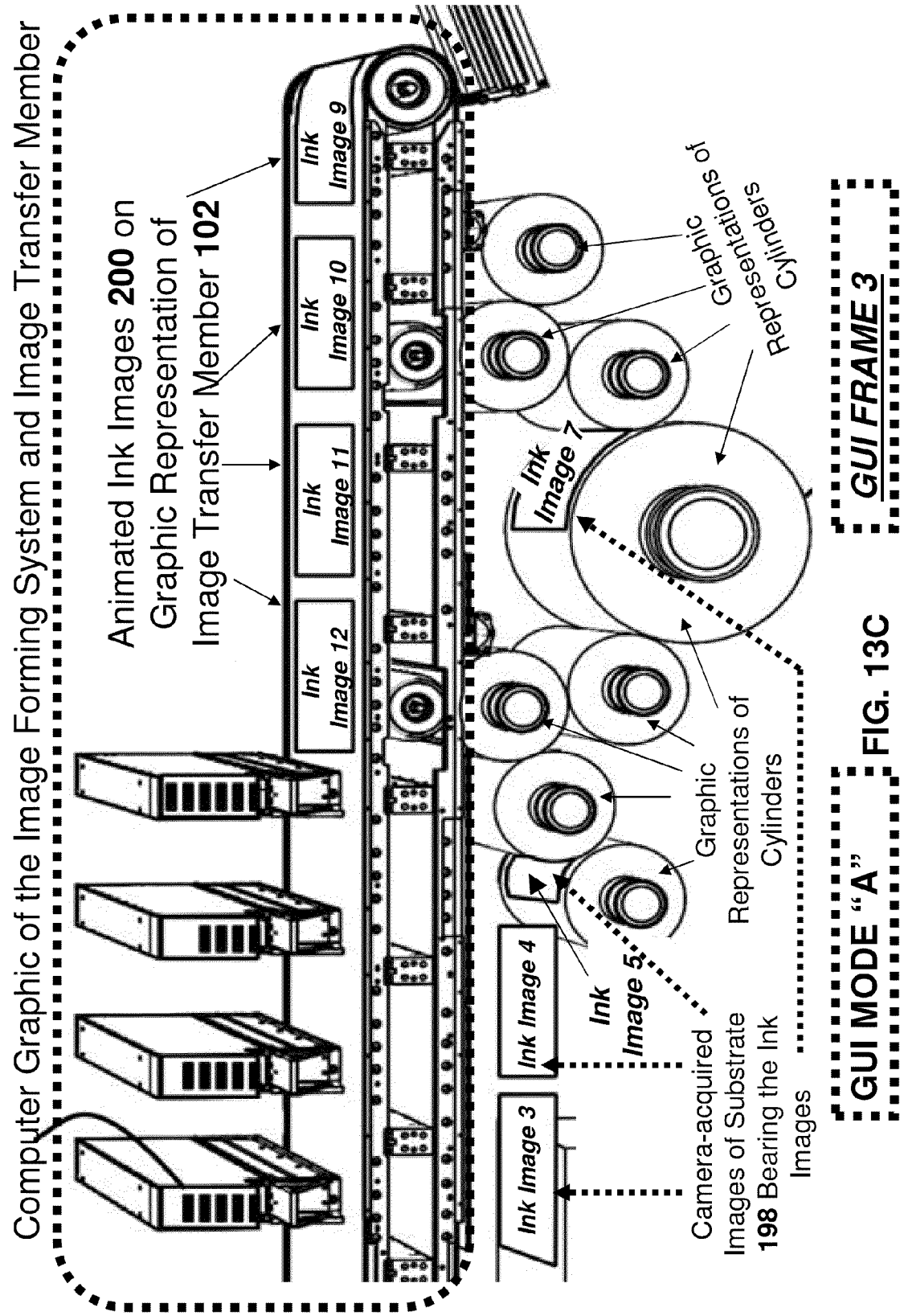
Figure 13D:
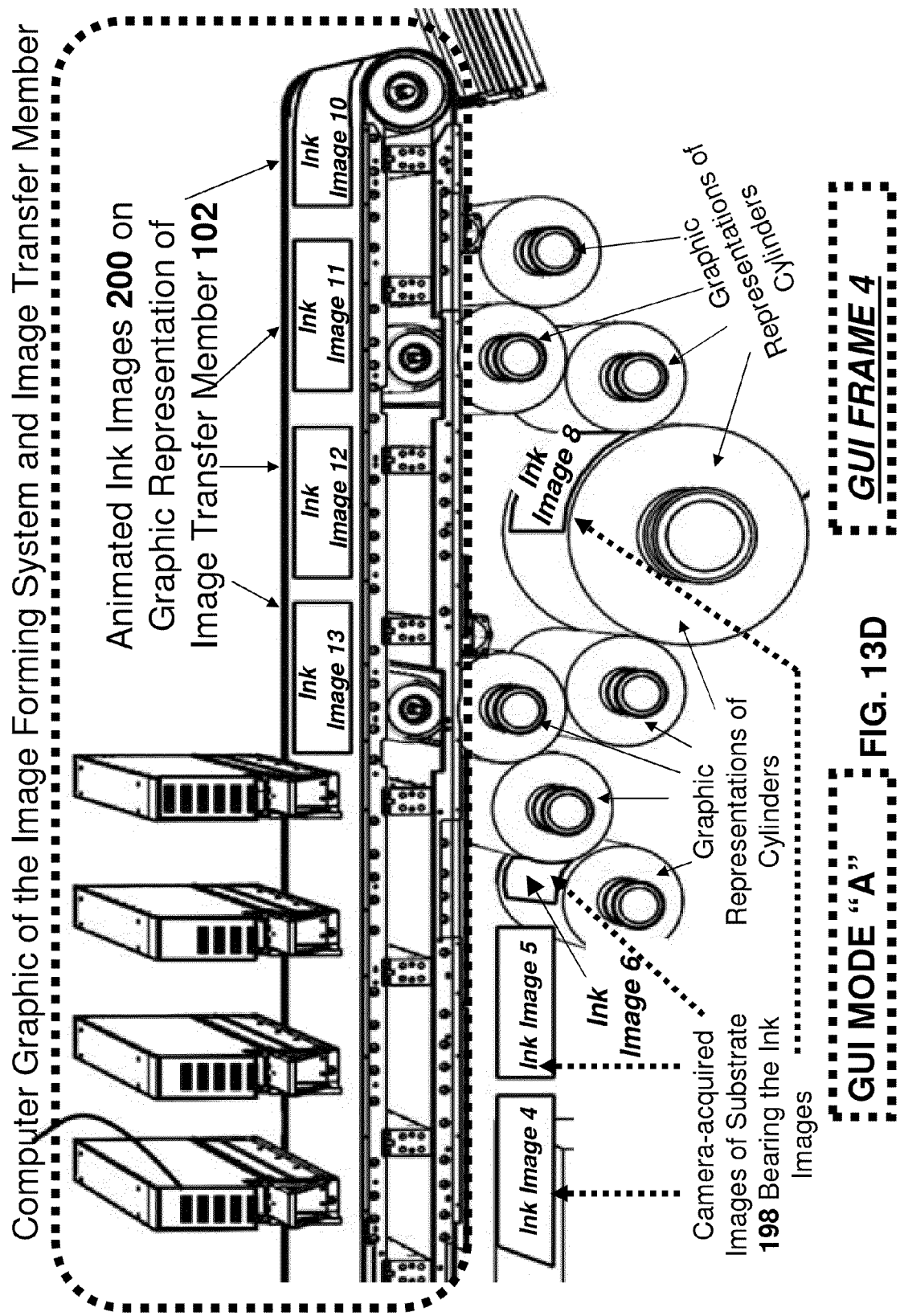

FIGS. 13A-13D are a plurality of frames illustrating the movement of virtual ink images along the graphic representation of the intermediate transfer member 102 and in the video stream windows previously illustrated as 889 in FIGS. 11-12 according to one example. In FIG. 13A, ink image 5 is a photograph of real-world substrate bearing a real-world ink image as it moves through the corresponding field of view, previously illustrated as 989B in FIGS. 11-12. Thus, in FIG. 13A ink image 5 is acquired by camera 993B and as part of video stream 889B is displayed as indicated in FIG. 13A.

The upper part of the GUI 960 of FIGS. 13A-13D includes: (i) a computer graphic of the image forming system and of virtual ink images (i.e. either taken from database or acquired by camera 983) in motion (i.e. by computer animation) away from virtual print bars 302 (i.e. a graphical representation thereof) and towards virtual image transfer location 958. The lower part of GUI 960 of FIGS. 13A-13D includes multiple video streams 889 superimposed upon a graphical representation of the substrate handling system (i.e. including various cylinders). The video streams are superimposed in a manner such that the location of the video streams 889 on display screen 970 relative to the graphical representation of the substrate handling system corresponds to its real-world counterpart.

FIGS. 13A-13D describe the time-progression of the machine-oriented GUI 960. In GUI frame 1 (FIG. 13A), ink images 7-10 are on the upper run of intermediate transfer member 102. Ink image 7 which is on the upper run of intermediate transfer member 102 at an earlier time represented by FIG. 13A eventually appears at a later time on a substrate (FIG. 13C corresponding to GUI frame '3') as the ink image being displayed in machine-oriented GUI 960 as part of video stream 889B.

One salient feature of the examples of FIGS. 11-13 is that the speed at which ink image representations of the graphical animations move along a surface of the intermediate transfer member 102 is appropriate for, and matches, the video stream frame rate 989. Thus, in some embodiments, in order to provide this 'synchronization feature,' the real-world rotation speed of the real-world transfer member is estimated and/or detected.

In some embodiments, the displayed graphical animation is provided so that a rate at which virtual ink images move along the surface of the virtual intermediate transfer member dependents upon a rate of rotation speed (e.g. measured or estimated rotation speed) of the physical intermediate transfer member. For example, when the physical intermediate transfer member is detected to rotate at a higher rate, the virtual ink images move (i.e. in the animation) along the surface of the virtual intermediate transfer member at a higher rate. When the physical intermediate transfer member is detected to rotate at a lower rate, the virtual ink images move along the surface of the virtual intermediate transfer member at a lower rate.

Not wishing to be bound by theory, it is believed that when a video feed and/or image animation is superimposed upon a background image or illustration of a printing system (i.e. to 'augment' the virtual reality representation with real-world image or video), the overall effect may be to provide an intuitive, non-burdensome representation or visualization of printing system operation. For example, the use of a computer graphic when representing a subsystem (rather than a photograph of the subsystem) may provide a representation of the subsystem (e.g. 500 or 100) that includes only relevant details (i.e. relevant for visualizing operation or servicing of the printing system subsystem) rather than overloading the user with irrelevant visual details. It is believed that this 'hybrid interface' gives the user a sense of the 'important aspects' of the current operation of the printing system while minimizing or avoiding information overload.

Thus, displaying subsystems using computer graphics in near photo realistic manner allows the user to instantly realize where certain operations within the printing system occur and may provide an 'x-ray' view of the internals of the printing system. In the event of an error, the operator will be able to instantly visually locate/identify the location within the printing system that the error occurred so as to take remedial steps.

In this sense, users may monitor operation of a printing system, or even a large number of simultaneously operating printing systems in a manner that minimizes user fatigue and maximizes the 'feel' or 'intuition' the user develops for the printing system operation. Even if the real internal components are covered by display screen 970, the GUI gives the user the feeling of being in control of the real machine, reducing fatigue and/or improving user operation of one printing system or a plurality thereof. This may be provided for any purpose—for example, to monitor image quality or an efficiency at which printing systems are operating or how a given print job (or set of images to be printed) is allocated between multiple printing systems.

In some embodiments, the user interface may focus on the 'flow' of images within the printing system. At any given time, multiple ink images residing on the rotating intermediate transfer surface may simultaneously rotate along with the surface of the transfer member 102 so that one-by-one the images are transferred to a substrate. At any given time, web substrate or substrate sheets may transport multiple ink-images within the substrate transport system 500 along a path defined by substrate transport system 500. In some embodiments, the motion of these ink images on substrate or intermediate transfer member 102 defines the primary operation of the printing system.

In some embodiments, use of graphical animation allows representation of the printing system (or subsystems thereof) where displaying a photographic image (video of) the operating printing system's subsystem is not possible—for example, due to the inability to inexpensively place a camera or due to the fact that difficulties in photographing real-world ink images on dark intermediate transfer member.

In some embodiments, the goal of animated representation of images traveling through the printing system is to create a process-accurate virtual representation of the real-world machine in operation.

In some embodiments, use of the graphical animation allows for a somewhat simplified representation of the printing system (or subsystems thereof) compared to merely displaying a photographic image (or video of) the operating printing system. In some embodiments, it is possible to augment this somewhat simplified representation of the printing system with one or more of:

(A) a video stream of a substrate (or an image taken from database 900) traveling through the substrate transport system 500. In one embodiment, motion of the traveling substrate (e.g. the substrate after the ink image is transferred thereto so that the ink image is visible thereon) may be illustrated by animation of a 'still' photographic image of the substrate (e.g. image-bearing substrate) on a display screen. Alternatively or additionally, motion of the substrate may be illustrated by displaying a field of view 989 within substrate transport system 500 from a video camera (e.g. 993) where the substrate (e.g. bearing the ink image) travels within the field of view.

In one example, the user may be able to 'drill down' or 'zoom-in' on one of multiple possible 'field-of-view' windows within substrate transport system 500 to view the substrate and/or images on the substrate in motion through a selected field-of-view window;

(B) an animation of virtual images on the rotating virtual intermediate transfer member 102—as noted above, the virtual images may move (i.e. in the animation) at a velocity determined by that the rotational velocity of the physical intermediate transfer member.

Generally speaking, a substrate does not remain flat when traveling through substrate transport system 500. Generally speaking, intermediate transfer member 102 is also not flat at all sections of the system—as such, images on the intermediate transfer member or on a substrate traveling through the substrate transport system may be illustrated with some sort of curvature (e.g. while passing upon certain cylinders). This curvature may be computed mathematically to modify an image in image database 900 to display it at a non-flat curvature or at a curvature differing from that in database 900. Alternatively, the image may be photographed on substrate or intermediate transfer member 102 at a first curvature and then displayed (e.g. as part of a computer animation) at a second curvature by subjecting the image to a mathematical 'curvature' transformation function.

(C) a 'print job status' in terms of ink requirements thereof—for example, each print bar 302 may be configured to deposit on rotating intermediate transfer member 102 ink of a different respective color. In accordance with the color requirements of a given print job, print bar or image-forming elements 302 may be shown (i) in a first configuration over intermediate transfer member 102 when the ink born thereby is a color that is part of a current print job (see the leftmost four print bars of FIG. 3); and (ii) in a second configuration not over intermediate transfer member 102 when the ink born thereby is a color that is not part of a current print job (see the rightmost four print bars of FIG. 3). In some embodiments, when the current ink color requirements change, it is possible to display a computer animation of one or more print bars from (i) an 'active-color-indicative' position over intermediate transfer member 102 (see the leftmost four print bars of FIG. 3); to (ii) an 'inactive-color-indicative' position not over intermediate transfer member 102—e.g. staggered away from the intermediate transfer member as in the rightmost four print bars of FIG. 3).

(D) a graphical animation of ink droplets being deposited on the rotating intermediate transfer member—for example, the user may 'click on' one of the print bars of a particular color in order to see the related ink droplet deposition graphical animation.

Figure 14:
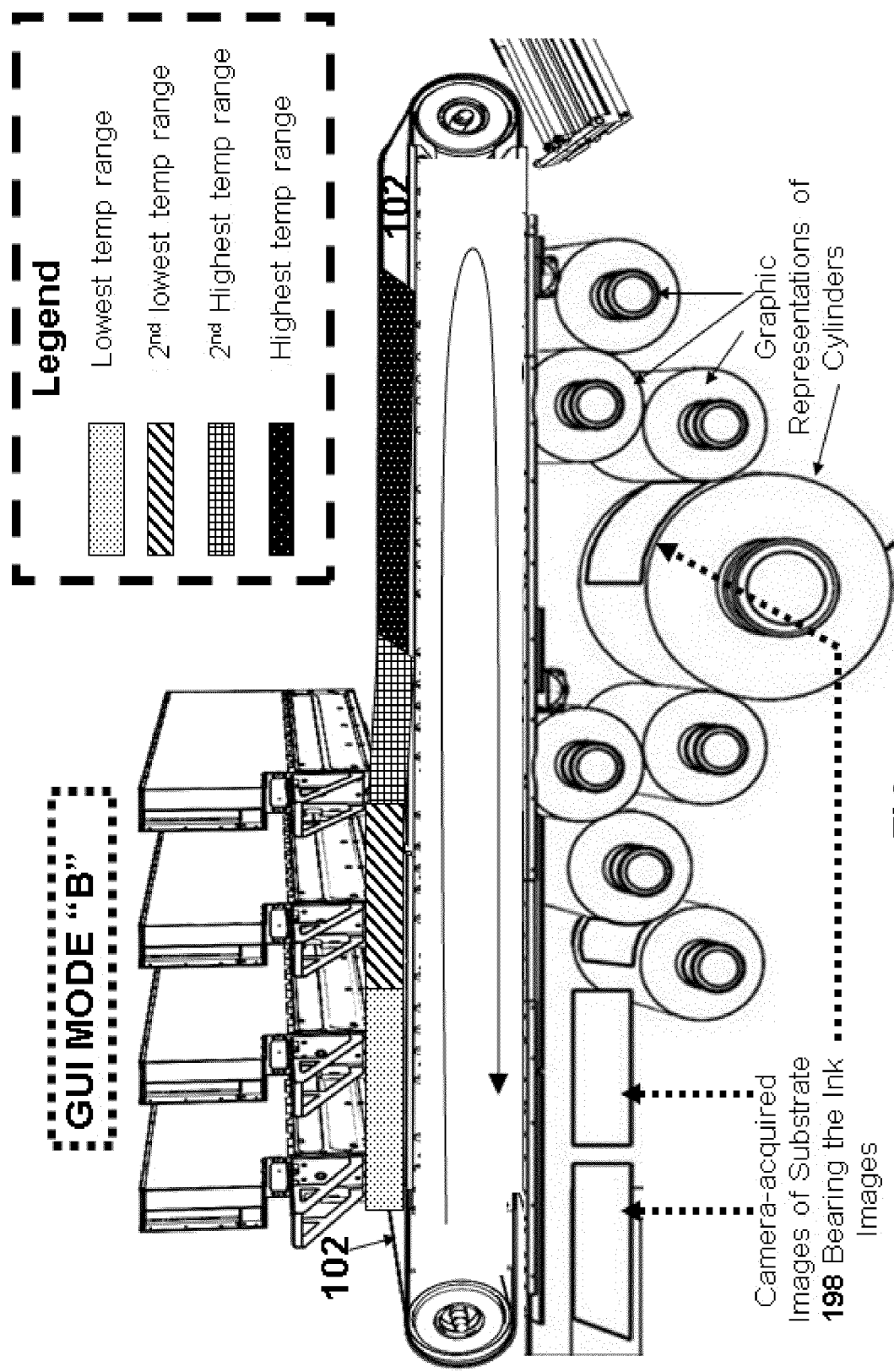

(E) data descriptive of a temperature profile on a surface of intermediate transfer member 102—the skilled artisan is directed to FIG. 14 which illustrates one exemplary set of sections of the intermediate transfer member 102 subjected to different temperature ranges. In non-limiting examples, this temperature may be monitored according to a temperature sensor (e.g. an IR-sensor) or computed in accordance with a mathematical model having, as an input, a measurement of the amount of heat provided to an intermediate transfer member 102 as well as thermal parameters of various items (e.g. the ink, the intermediate transfer member, the substrate, etc).

In some embodiments, it is possible to toggle between view modes—a first view mode corresponding to virtual images (e.g. digital images or photographs of ink images) travelling on a graphical representation of blanket 102 (see FIGS. 12-13) and a second mode corresponding to display of temperature properties of blanket 102 (see FIG. 14)

In the example of FIG. 13A, there is a slight curvature of ink image 7 on the surface of blanket 102. In some embodiments, the animation includes subjecting an image (e.g. from a photograph or database) to mathematical transformation so that a curvature thereof matches a local curvature of blanket 102.

In some embodiments, a 'vital signs feature' is provided. It is possible to sense a distance between a user/operator and the printing system When the sensed distance between the user and the printing system or a component thereof exceeds a threshold distance, 'vital signs data' about the printing machine may be prominently displayed on the display screen—for example, so that the vital signs data may occupy at least 30% or a majority of the display area of the display device (e.g. a 'large' display screen having an area of at least one square meter). The vital signs data may describe one or more operating parameters of the printing system including but not limited to ink requirements of the currently printed job, substrate requirements of the currently printed job, remaining predicted lifetime of the blanket, amount of remaining substrate available to the printing system, amount of ink available to the system, printing speed or any other operating parameter. According to this 'vital signs' example, in response to a user approach towards the printing system or a component thereof (e.g. the user walks closer to the printing system) so that a distance between the user and the printing system (or component thereof) drops below the threshold distance, the graphical animation together with the video streams (e.g. according to any embodiment described herein) may replace the 'vital signs information' on the display screen. In one particular embodiment, when the user is beyond the threshold distance, the size of the displayed vital signs information is relatively large and the size of the displayed animation/video streams is relatively small. In response to a user approach towards the printing system (or component thereof), (i) the size of the displayed vital signs (e.g. the font size) decreases and/or the vital signs cease to be displayed and (ii) the display screen commences display of the graphical animation and the video stream and/or displays them at a larger size than when the distance between the user and the printing system (or component thereof) exceeds the threshold.

Although embodiments have been explained in the context of large display screen 970, it is appreciated that the screen may be of any size or form factor, and may be part of a tablet device or an augmented reality eyewear device. Additionally, the afore-described information relating to the operation of the printing system may be displayed on more than one screen. The information being displayed on each of the different screen may be the same or different. For example, a machine-oriented GUI may be displayed on a large display screen adjacent to the printing system and a time-line based GUI may be displayed on a remote tablet device.

In one example, when a smaller display screen (e.g. tablet device) is brought near the larger display screen (e.g. in a substantially vertical position), this may serve an 'x-ray' or 'magnifying' function so that a portion of the interface displayed on the larger display screen is displayed in a 'magnified manner' on the smaller display screen to 'zoom-in.'

Figure 15A:
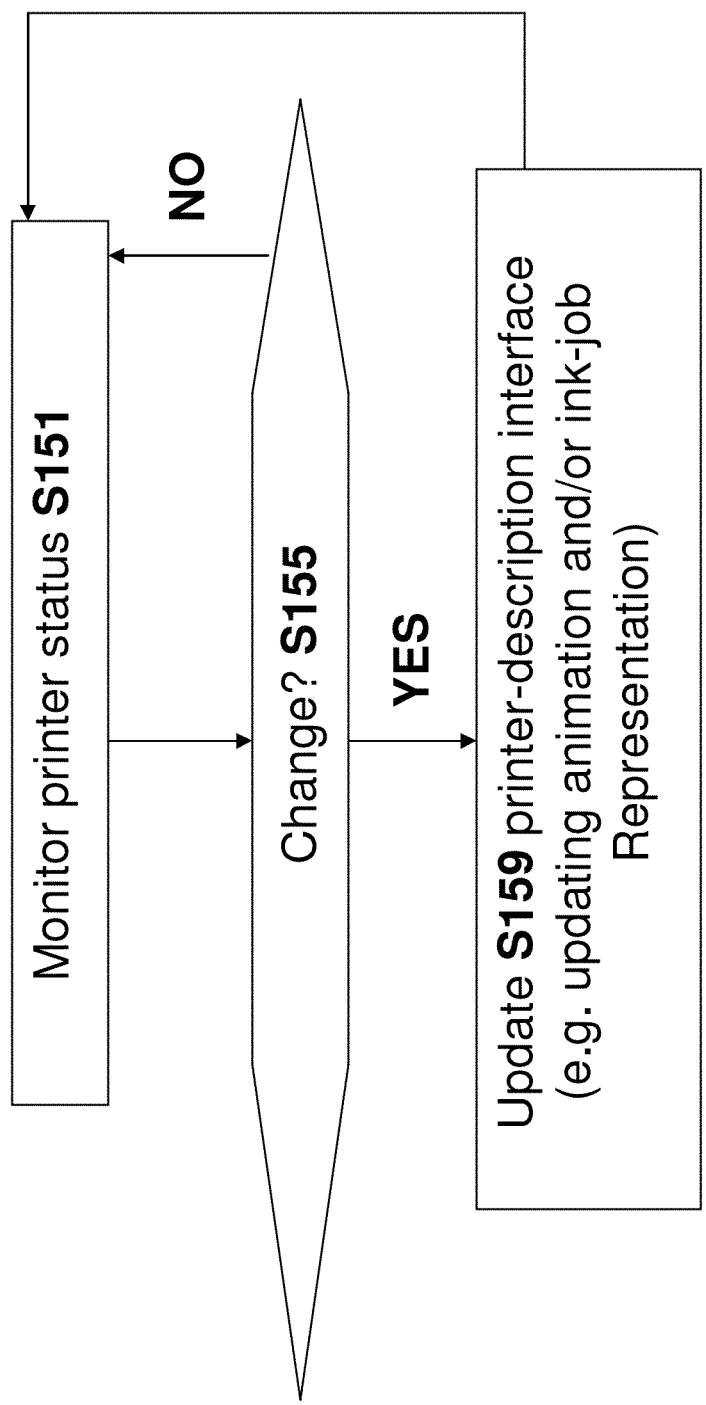
FIGS. 15A and 15B respectively illustrate a flow chart and an apparatus for monitoring operation of a printing system.

As illustrated in FIG. 15A, in some embodiments, a printing system-description interface (e.g. 960 or 964) may change in response to changes in the printing system status.

Figure 15B:
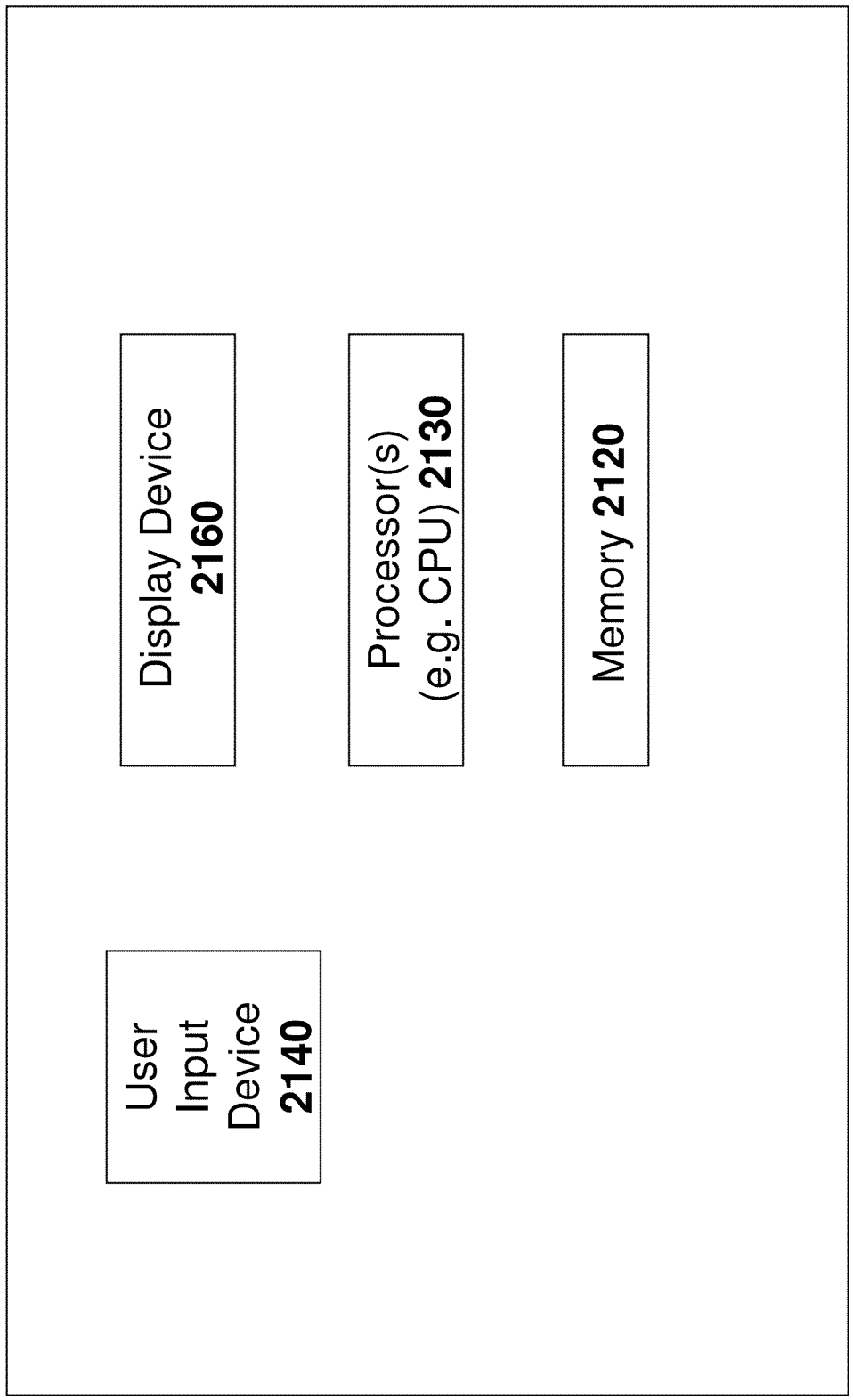

In some embodiments, as illustrated in FIG. 15B, one or more of the following components may be present and may facilitate the provisioning of any printing system-related GUI (e.g. 960 or 964): (i) a user input device 3140 (e.g. touch screen or mouse or camera aimed at the user); (ii) a printing system display device 3160 (e.g. a screen of any size or form factor); (iii) processor(s) 3130; and (iv) computer memory 3120.

It is now disclosed a method of visualizing operation of a printing system comprising: (i) a real-world image forming apparatus configured to form ink image(s) on a real-world rotating intermediate transfer member according to contents of an image database 900, (ii) a real-world substrate handling system 500 defining a substrate path and interacting with the intermediate transfer member at a real-world image transfer location where the formed ink images located on and rotating with the intermediate transfer member are transferred to a substrate, and (iii) one or more cameras being aimed at a real-world field-of-view within the substrate transport system along the substrate path to acquire video stream(s) of real-world substrate bearing ink image(s) moving through the field-of-view, the method comprising:

a. monitoring operation of the printing system to assess which images are substantially-current images that are currently resident on the rotating intermediate transfer member 102 or are queued for formation on the rotating intermediate transfer member 102 in the near future;

b. retrieving digital image representations of a plurality of the substantially-current images from the image database 900;
c. displaying simultaneously on a display screen: i. a graphical representation of the real-world rotating intermediate transfer member and; ii. a graphical representation of the substrate transport system including the real-world image transfer location;
d. simultaneous with the displaying of step (c), displaying, on the display screen, a graphical animation of the substantially-current database-retrieved image in motion on the surface of the representation of the intermediate transfer member (for example, towards the representation of the real-world image transfer location);
e. simultaneous with the displaying of the graphical animation, displaying the camera-acquired video stream(s) of the real-world substrate bearing ink image(s) moving through the field-of-view, the video stream(s) being displayed at a location on the display screen relative to the graphical representation of the substrate transport system that corresponds to its real-world counterpart.

It is now disclosed a method of visualizing operation of a printing system comprising (i) a real-world image forming apparatus configured to form ink image(s) on a real-world rotating intermediate transfer member according to contents of an image database 900, (ii) a real-world substrate transport system 500 defining a substrate path, and interacting with the intermediate transfer member at a real-world image transfer location where the formed ink images located on and rotating with the intermediate transfer member are transferred to substrate, and (iii) one or more cameras being aimed at a real-world field-of-view within the substrate transport system along the substrate path to acquire video stream(s) of real-world substrate bearing ink image(s) moving through the field-of-view, the method comprising:
a. retrieving digital image representations from the image database 900;
b. displaying simultaneously on a display screen:
 i. a graphical representation of the real-world rotating intermediate transfer member and;
 ii. a graphical representation of the substrate transport system including the real-world image transfer location;
c. simultaneous with the displaying of step (b), displaying, on the display screen, a graphical animation of the database-retrieved images in motion on the surface of the representation of the intermediate transfer member (for example, towards the representation of the real-world image transfer location); and
d. simultaneous with the displaying of the graphical animation, displaying the camera-acquired video stream(s) of the real-world substrate bearing ink image(s) moving through the field-of-view, the video stream(s) being displayed at a location on the display screen relative to the graphical representation of the substrate transport system that corresponds to its real-world counterpart.

In some embodiments, the digital images that i. are retrieved from the image database 900 in step (a) and ii. animated in step (c), are selected and retrieved from the image database 900 in accordance with an image print queue of the printing system.

In some embodiments, the digital images that i. are retrieved from the image database 900 in step (a) and ii. animated in step (c), are selected and retrieved from the image database 900 in a manner that synchronizes with the video stream ink images residing on the substrate of the video stream.

It is now disclosed a method of visualizing operation of a printing system comprising (i) a real-world image forming apparatus configured to form ink image(s) on a real-world rotating intermediate transfer member according to contents of an image database 900, (ii) a real-world substrate transport system 500 defining a substrate path and interacting with the intermediate transfer member at a real-world image transfer location where the formed ink images located on and rotating with the intermediate transfer member are transferred to substrate, and (iii) a first camera being aimed at a real-world field-of-view within the substrate transport system along the substrate path to acquire a video stream of real-world substrate bearing ink image(s) moving through the field-of-view and (iv) a second camera aimed at a surface of the real-world rotating intermediate transfer member to acquire an image of ink images thereon, the method comprising:
a. displaying simultaneously on a display screen:
 i. a graphical representation of the real-world rotating intermediate transfer member and;
 ii. a graphical representation of the substrate transport system including the real-world image transfer location;
b. simultaneous with the displaying of step (a), displaying, on the display screen, a graphical animation of the ink-image acquired by the second camera moving on the surface of the representation of the intermediate transfer member (for example, towards the representation of the real-world image transfer location); and
c. simultaneous with the displaying of the graphical animation, displaying the camera-acquired video stream(s) of the real-world substrate bearing ink image(s) moving through the field-of-view, the video stream(s) being displayed at a location on the display screen relative to the graphical representation of the substrate transport system that corresponds to its real-world counterpart.

In some embodiments, the animation of step (b) is displayed in a manner which synchronizes with the video stream ink images residing on the substrate of the video stream.

In some embodiments, at least one image displayed in the graphical animation is subjected to a curvature-modifying geometric mapping so that the curvature of the image matches a local curvature of the intermediate transfer member.

In some embodiments, a curvature of the animated image changes as it travels between locations on the intermediate transfer member having different surface curvature.

In some embodiments, a view angle (e.g. 3D angle) or elevation or zoom factor of the displayed combination of: i. the graphical representations of the intermediate transfer member and the substrate transport system; and ii. the image animation, is modifiable in accordance with user input.

In some embodiments, an aim angle of a camera aimed at the field of view in the substrate path and/or of a camera aimed at a surface of the real-world rotating intermediate transfer member to acquire an image of ink images thereon is controllable in accordance with user input.

In some embodiments, the user input is acquired via a touch screen or an electronic glove or a gesture-sensing apparatus.

In some embodiments, the graphical representation of the substrate transport system includes a graphical representation of one or more cylinder(s) thereof.

In some embodiments, the displayed cylinder(s) is shown in an animation mode and rotating around its axis.

In some embodiments, a rotation speed of the animated cylinder is determined by (e.g. proportional to) that of its real-world counterpart of the real-world substrate-handling system.

In some embodiments, an additional camera is aimed at and configured to acquire a video feed of substrate sheets traveling away from cylinders of the substrate transport system and towards an output stack, and wherein the video feed of the additional camera is displayed relative to the substrate transport system at a position that corresponds to its real-world counterpart.

In some embodiments, the method of visualizing operation of the printing system further comprises displaying an animation of image-bearing substrate traveling away from cylinders of the substrate transport system and towards an output stack.

In some embodiments, the images of the animation are mirror images of the videoed substrate-residing images that reside on the substrate of the video feed.

It is now disclosed apparatus comprising means for carrying out any method disclosed herein.

It is now disclosed computer readable medium having stored thereon computer readable program code for performing a method disclosed herein.

Figure 16A:
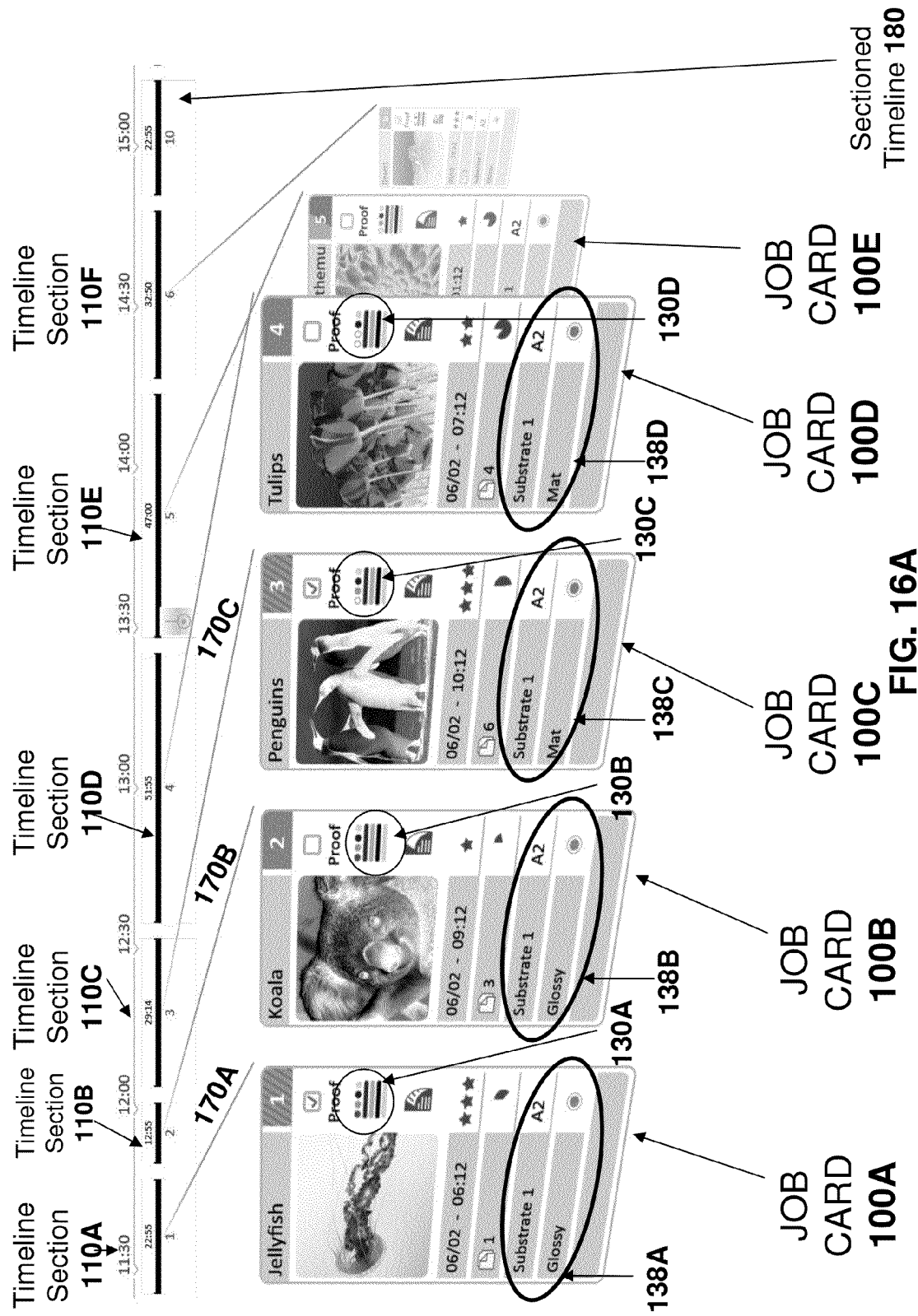
FIGS. 16A-16B illustrate a plurality of job-summary cards that are each visually associated with a different respective timeline section of a sectioned timeline.
Figure 16B:
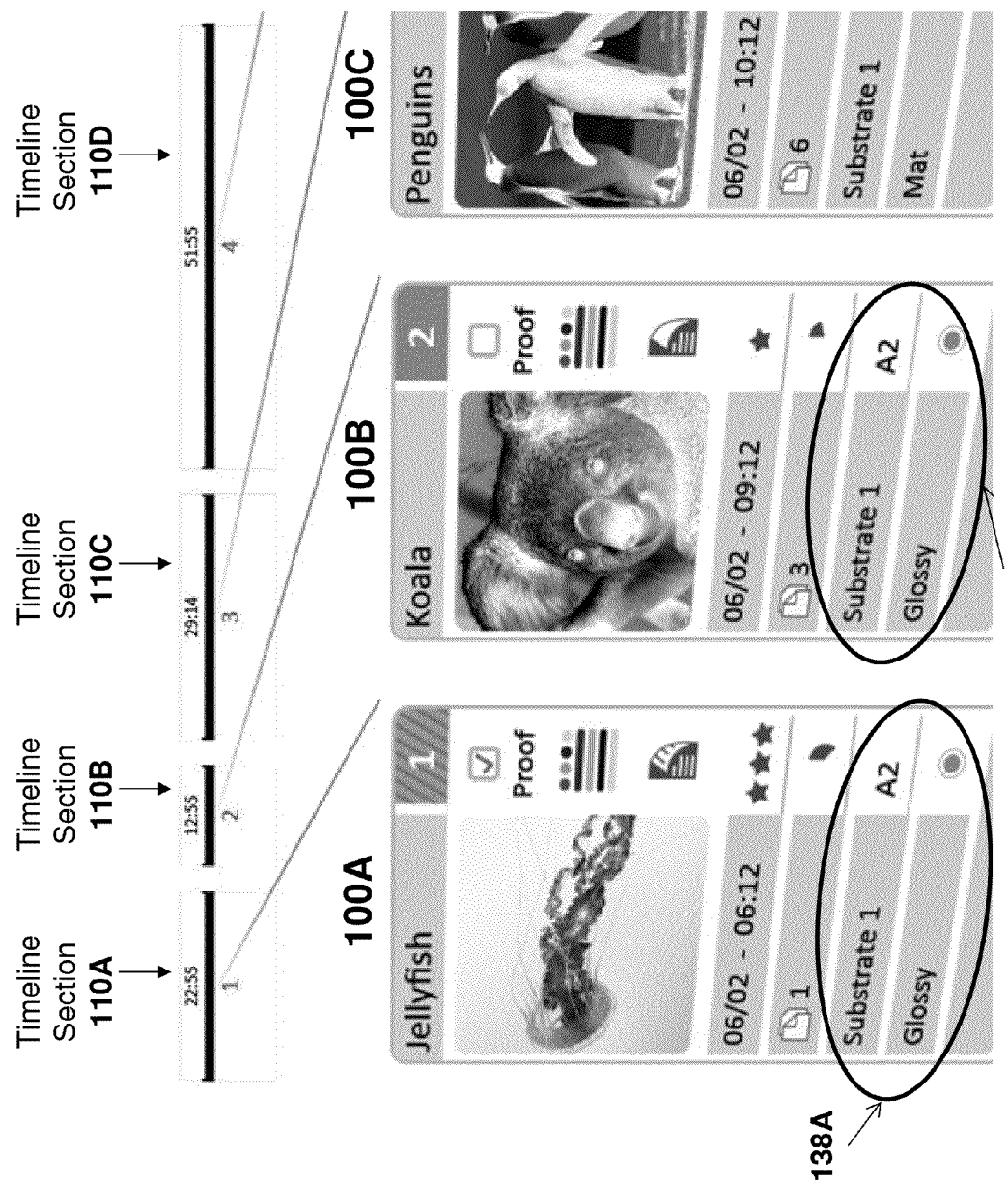

A Discussion of FIGS. 16A-16B

Some embodiments relate to a method, apparatus and computer-readable medium for presenting a user interface describing print-job data—for example, data related to a plurality of queued print jobs that are queued to a set of one or more printing system(s).

In some embodiments, it is possible to compute or receive an estimated job-completion time of each print job (e.g. based on the size of the job, color requirements, desired resolution specifications of the printing system such as speed, etc) and to display a description of this information as a sectioned timeline where a magnitude of a length of each section corresponds to a duration of the estimated job-completion of the corresponding job represented by each section.

Furthermore, information about each print job may also be presented as part of a job-description visual object (or job-information summary object) describing job-specific information.

In some embodiments, it is possible to visually associate each job-description visual objection of a print job with its appropriate section of the time line.

Reference is made to FIGS. 16A-16B which describe a plurality of job-description cards 100A-100E. Each job-card 100 includes respective printer ink-requirements data 130, substrate-requirements data 138—i.e. to provide a summary of job-specific data thereof associated with a job corresponding to job-card. An estimated job-completion time of the job associated with job card 100A is 22:25; an estimated job-completion time of the job associated with job card 100B is 12:55; etc.

In the example of the 'Jellyfish job' of card 100A the presented substrate requirements data are 'Substrate 1; A2; Gloss'; in the example of the 'Penguins job' of card 100C the presented substrate requirements data are 'Substrate 1; A2; Mat.'

Sectioned timeline 180 is divided into respective sections 110A, 110B, etc. where each timeline section 110 is visually associated (e.g. through association lines 170A, 170B, etc) with a respective summary/description 100A, 100B, etc. of its respective print job.

The length of each sectioned timeline is presented in accordance with a job-duration (e.g. predicted duration) thereof.

There is no limitation on the type of printing systems the operation of which may be visualized by the methods or apparatus disclosed herein—ink-jet printers, off-set printers, laser printers, digital presses, dot-matrix printers, etc. are all in the scope of the invention.

The user interface (e.g. including the sectioned timeline) may be presented on any display screen—e.g. a screen of a laptop computer, desktop computer, cellphone, tablet device, etc.

In some embodiments, it is possible to control the printing systems using the GUI—for example, to re-order jobs by dragging and dropping timeline sections 110 or job descriptions/cards 100. For example, instead of dragging and dropping a job card 100 to a new location along a line of job cards, it is possible to utilize the timeline 180. The candidate job card 100 for which a corresponding job is to take a new place in the print queue may be dragged to a target location on the timeline associated with a different job card other than the candidate job card. This would move the candidate job (i.e. corresponding to the candidate job card) to a different location in the print queue either before or after the job whose job card is associated with the target location.

In some embodiments, a sectioning of timeline 180 may be dynamic—for example, as the job queue of a printing system changes, the sectioning of the timeline 180 and/or job information data may be automatically updated accordingly (i.e. in response to the modification of the printer job queue). In some embodiments, the method includes monitoring a job queue of a printer(s) and responsive to changes in the job queue, re-sectioning timeline 180 (e.g. to change relative lengths of constitutive sections) and displaying the timeline according to the updated section magnitudes.

It is now disclosed a method of providing a print-job user interface comprising:

a. for each print job of a plurality of queued print-jobs representing a job-queue for a printing system that includes a target set of one or more printing devices computing or receiving an estimate job-completion time;

b. displaying to a user on a display-screen a sectioned timeline that is sectioned in accordance to the estimated job completion time, each timeline section of the timeline associated with a different respective print-job and having a respective section length according to a magnitude of the corresponding estimated job-completion time that corresponds to the respective print-job;

c. for each of the queued print-jobs, displaying a respective job-information summary describing a job-specific respective print substrate and/or a job-specific required ink color combination and/or job-specific printing device, wherein each of the job-information-summaries is respectively visually associated with its corresponding timeline section. Alternatively or additionally, in some embodiments related to printing systems comprising a plurality of printing devices, (i) a particular print job may be queued to a specific printing device selected from the plurality of devices and (ii) the job-information summary may include information identifying the specific printing device to which the job is queued.

In some embodiments, this is carried out for a plurality of print-jobs that is substrate heterogeneous—i.e. each job has a different set of substrate requirements.

In some embodiments, this is carried out for a plurality of print-jobs that is heterogeneous for required ink color combinations—i.e. each job has a different set of ink requirement.

In some embodiments, the method of providing a print-job user interface for each print job of the plurality of queued print-jobs representing a job-queue of one or more printing devices further comprises:

d. monitoring changes in the job-queue to detect a change the plurality of print-jobs; and e. in response to the detected change in the plurality of print-jobs, re-sectioning the sectioned timeline to change relative visual magnitudes of at least two sections thereof.

In some embodiments, the method of providing a print-job user interface for each print job of the plurality of queued print-jobs representing a job-queue of one or more printing devices, further comprising:

f. monitoring changes in the job-queue to detect a change the plurality of print-jobs; and g. in response to the detected change in the plurality of print-jobs, re-sectioning the sectioned timeline to change relative visual magnitudes of at least two sections thereof and updating the job-information summaries.

In some embodiments, the job-queue changes in response to one or more of the target printing devices beginning or completing one of the queued print-jobs—for example, it is possible to monitor the job queues—e.g. on an ongoing basis.

In some embodiments, the job-queue changes in respond to a user command.

In some embodiments, the user command is generated by a user GUI-engaging of a section of the sectioned timeline by an input device (e.g. mouse, joystick, camera-gesture-interface).

In some embodiments, the user command is a drag-and-drop command.

A Discussion of FIGS. 17-22

Figure 17A:
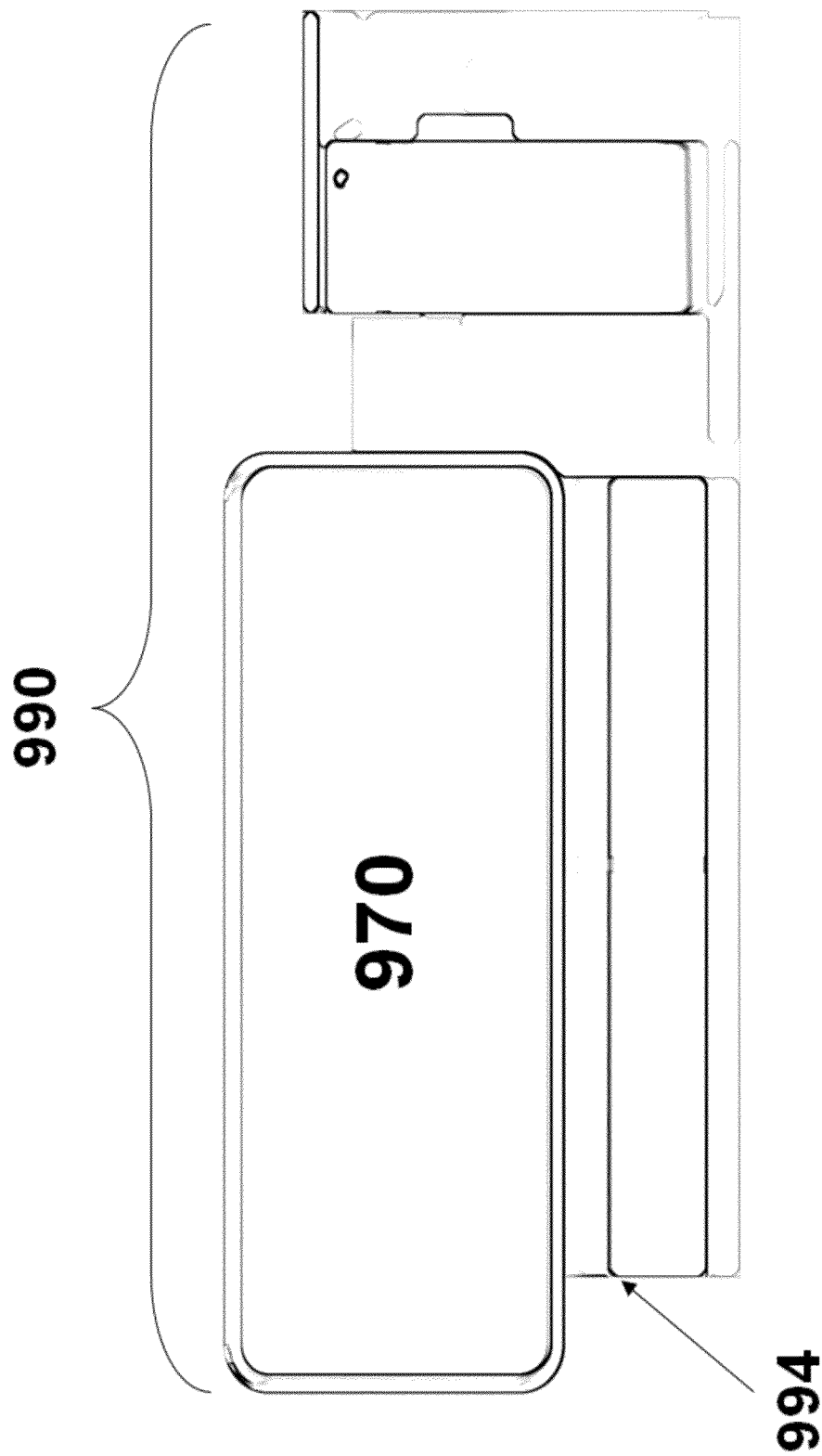
FIGS. 17A-17B illustrate a digital printing system including a mounted display screen.
Figure 17B:
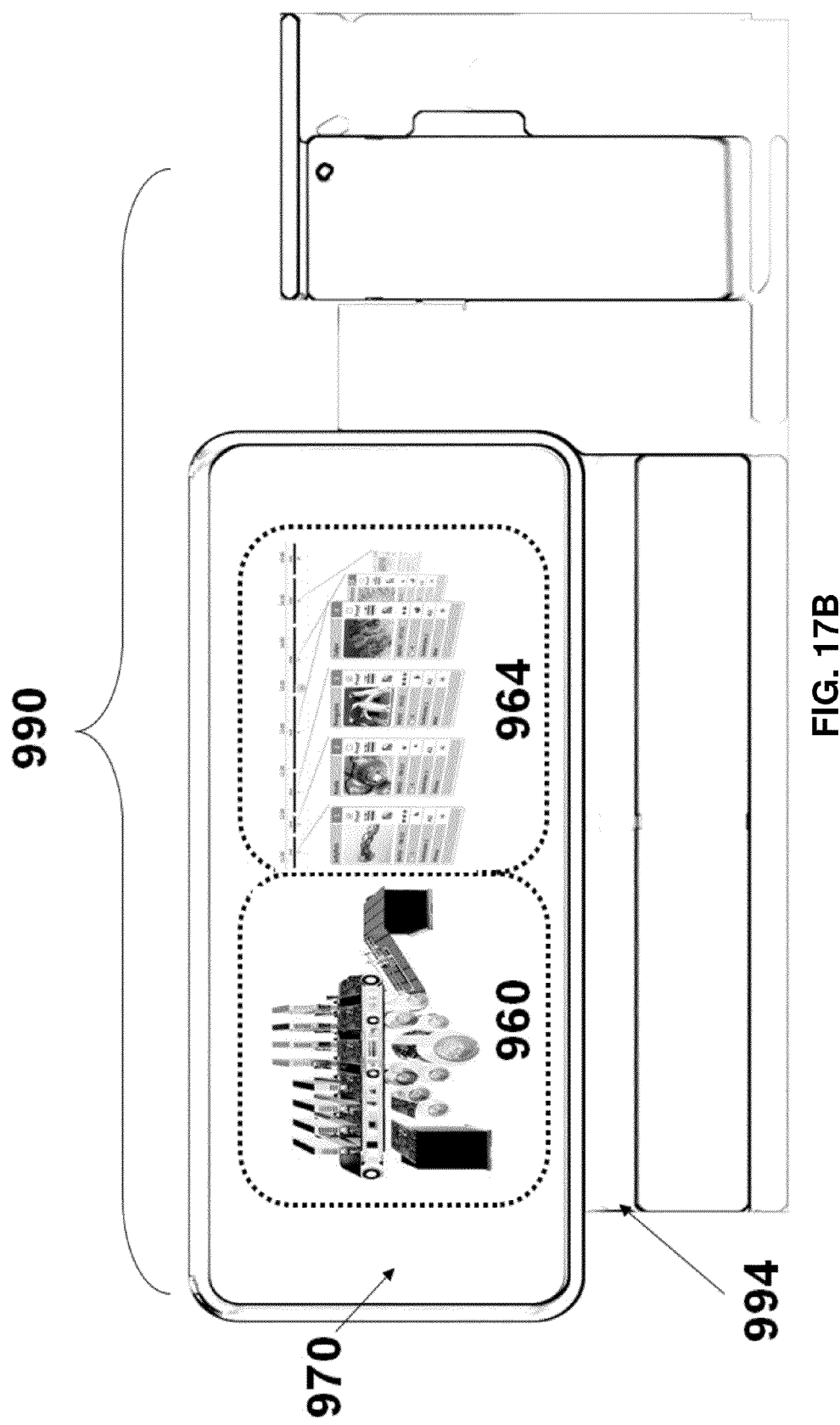

FIGS. 17A-17B illustrate a digital printing system 990 including a printing system housing 994 and a display screen 970 which collectively hide the internal components of printing system 990.

Embodiments of the present invention relate to a printing system comprising:

a. a rotatable intermediate transfer member;

b. an image forming system for forming ink images on the intermediate transfer member, c. a sheet or web substrate transport system 500 including at least one impression cylinder that selectively presses a substrate against a region of the intermediate transfer member spaced from the image forming system for ink images to be impressed thereon at an image transfer location 958; and d. an electronic display screen operative to display information about the operation of the printing system, the display screen being mounted to a housing of the printing system so as to be movable and/or rotatable relative to at least the substrate transport system, the display screen positioned and dimensioned to span at least one of:

i. a majority of the horizontal range of the substrate transport system; and ii. a majority of the horizontal range of the intermediate transfer member, wherein the printing system is arranged so that:

A. when the mounted display screen has a first position/orientation, the display screen obstructs front access to the substrate transport system or to the image transfer location 958 thereof; and B. translation and/or rotational motion of the mounted display screen 970 from the first position/orientation to a second position/orientation permits front access to the substrate transport system or to the image transfer location 958 thereof.

For the present disclosure, a position/orientation is the combination of a position and an orientation. When an object rotates, even if its position does not change its position/orientation does change. When an object translates, even if its orientation does not change its position/orientation does change.

Embodiments of the present invention relate to an indirect printing system comprising a rotatable intermediate transfer member, an image forming system for forming ink images on the intermediate transfer member, and a sheet or web substrate transport system including at least one impression cylinder for enabling the substrate to be pressed against a region of the intermediate transfer member for ink images to be impressed thereon.

In some embodiments, at least significant portions of the substrate transport system and/or the intermediate transfer member are deployed within a device housing—for example, a common housing for both the substrate transport system and the intermediate transfer member. In some embodiments, a display screen is mounted to the device housing—for example, slidably mounted. For example, the display screen may be horizontally or vertically or diagonally slidable.

Embodiments of the present invention relate to apparatus and methods whereby the same electronic display screen provides multiple functionalities: (i) displaying data related to operation of the indirect printing system and (ii) selectively blocking access to the substrate transport system and/or intermediate transfer member. Any display screen technology may be used including but not limited to liquid crystal display (LCD) and light emitting diode (LED) technology.

In some embodiments, the display screen is relatively 'large'—for example, (i) having an horizontal dimension (e.g. width) that spans at least a majority of a horizontal dimension of the intermediate transfer member and/or substrate transport system and/or (ii) having a vertical dimension (e.g. height) that is at least half that of the substrate transport system. Other metrics describing the relatively 'large' display screen are described herein. As will be discussed below, in some embodiments, the size of the display screen may be useful for selectively blocking access to the substrate transport system and/or intermediate transfer member.

When the movable mounted display screen is disposed at a first screen position, the display screen blocks access and/or 'front access' to the substrate transport system. In the first display screen position (i.e. relative to the printer housing), the printing system may operate normally so as to form ink images on the rotating intermediate transfer member which are then transferred to the substrate. At this time, it may be desirable for the display screen to block access to the substrate transport system.

Motion of the display screen from a first to a second screen position (e.g. sliding motion—for example, vertical sliding motion) may be operative to open access to the substrate transport system.

In one non-limiting example, the first screen position is a lower position—for example, when the printer is in normal operating mode. According to this example, the second screen position is an upper position. Upwards motion and/or sliding motion (e.g. upwards sliding motion) of the display screen from the lower to the upper position may be operative to open access to the substrate transport system.

As noted above, in some embodiments, the display screen 970 is relatively 'large.' In some embodiments, this means that a horizontal dimension of screen 970 is at least one-half (in some embodiments, at least three-quarters) of (i) a horizontal dimension a cylinder assembly of the substrate transport system and/or (ii) of a horizontal dimension of the intermediate transfer member.

In some embodiments, screen 970 is disposed so as to span at least a majority (in some embodiments, at least three quarters) of a horizontal range of the intermediate transfer member and/or of a horizontal range of a cylinder assembly of the substrate transport system. For example, a horizontal center of screen 970 may be proximate to (i) a horizontal center of cylinder assembly of substrate transport system and/or to (ii) a horizontal center of the intermediate transfer member.

In some embodiments, a vertical dimension of screen 970 is at least one-half (in some embodiments, at least three-quarters) of (i) a vertical dimension of the cylinder assembly of the substrate transport system and/or of (ii) a vertical dimension of the intermediate transfer member; and/or of (iii) a vertical dimension of the combination of the cylinder assembly of the substrate transport system together with the image transfer system (see FIG. 2C).

Figure 18A:
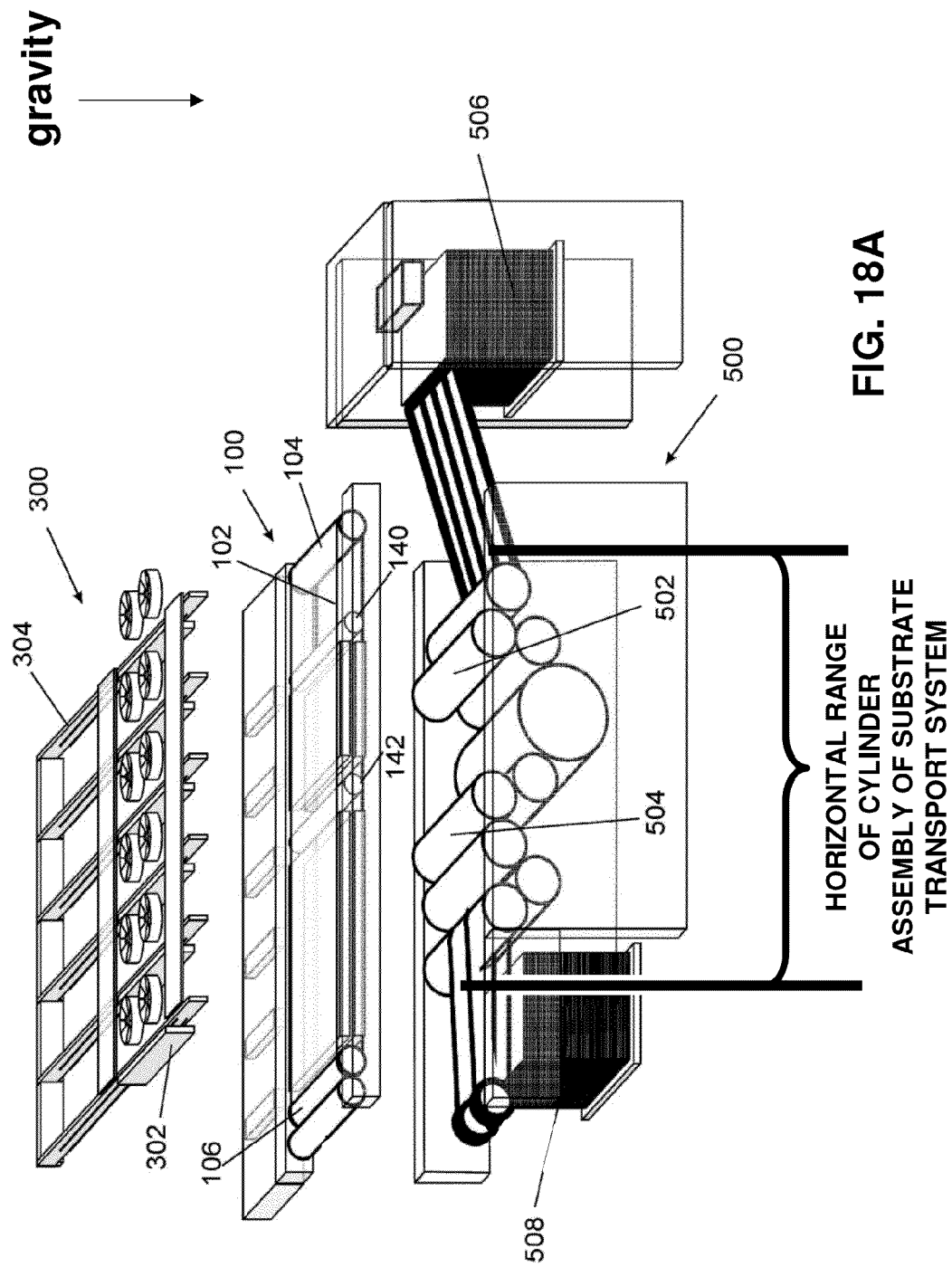
FIGS. 18A, 18B, 18C, 18D, 18E, 19A and 19B illustrate horizontal and vertical ranges of substrate transport systems and of intermediate transport members in different embodiments.
Figure 19A:
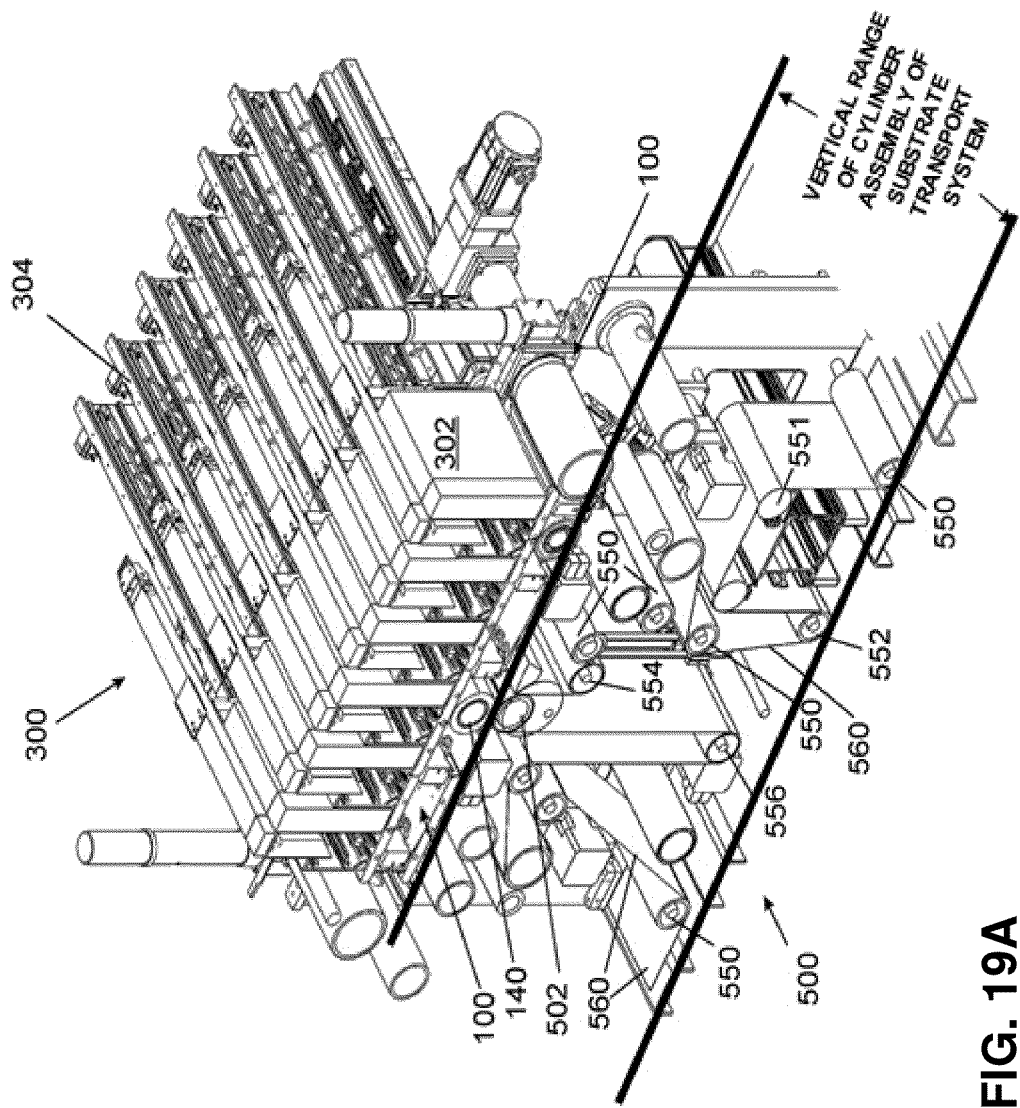
Figure 19B:
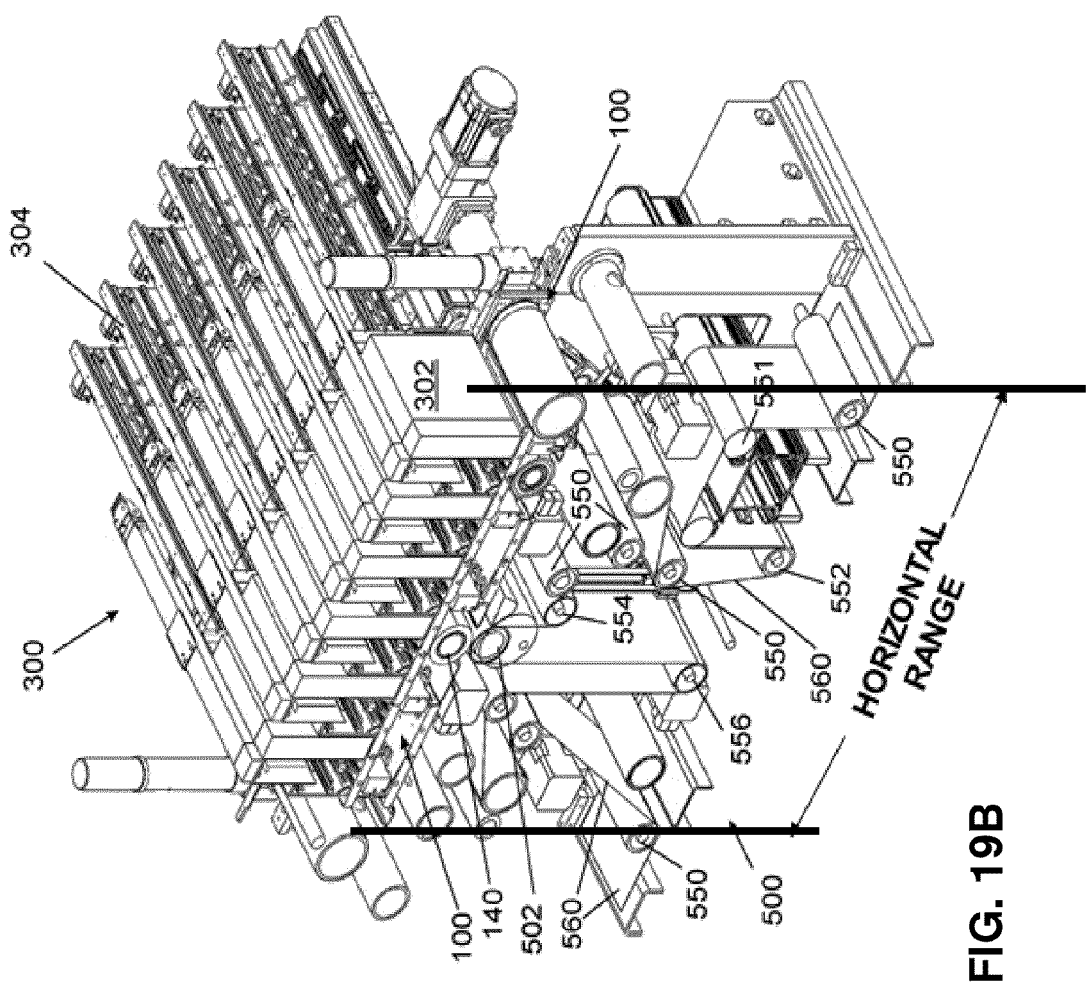

FIGS. 18A and 19B illustrate a horizontal range of the cylinder assembly of the substrate transport system in different embodiments. The length dimension of the horizontal range of the cylinder assembly (or intermediate transfer member) is the 'horizontal dimension' or width thereof.

Figure 18B:
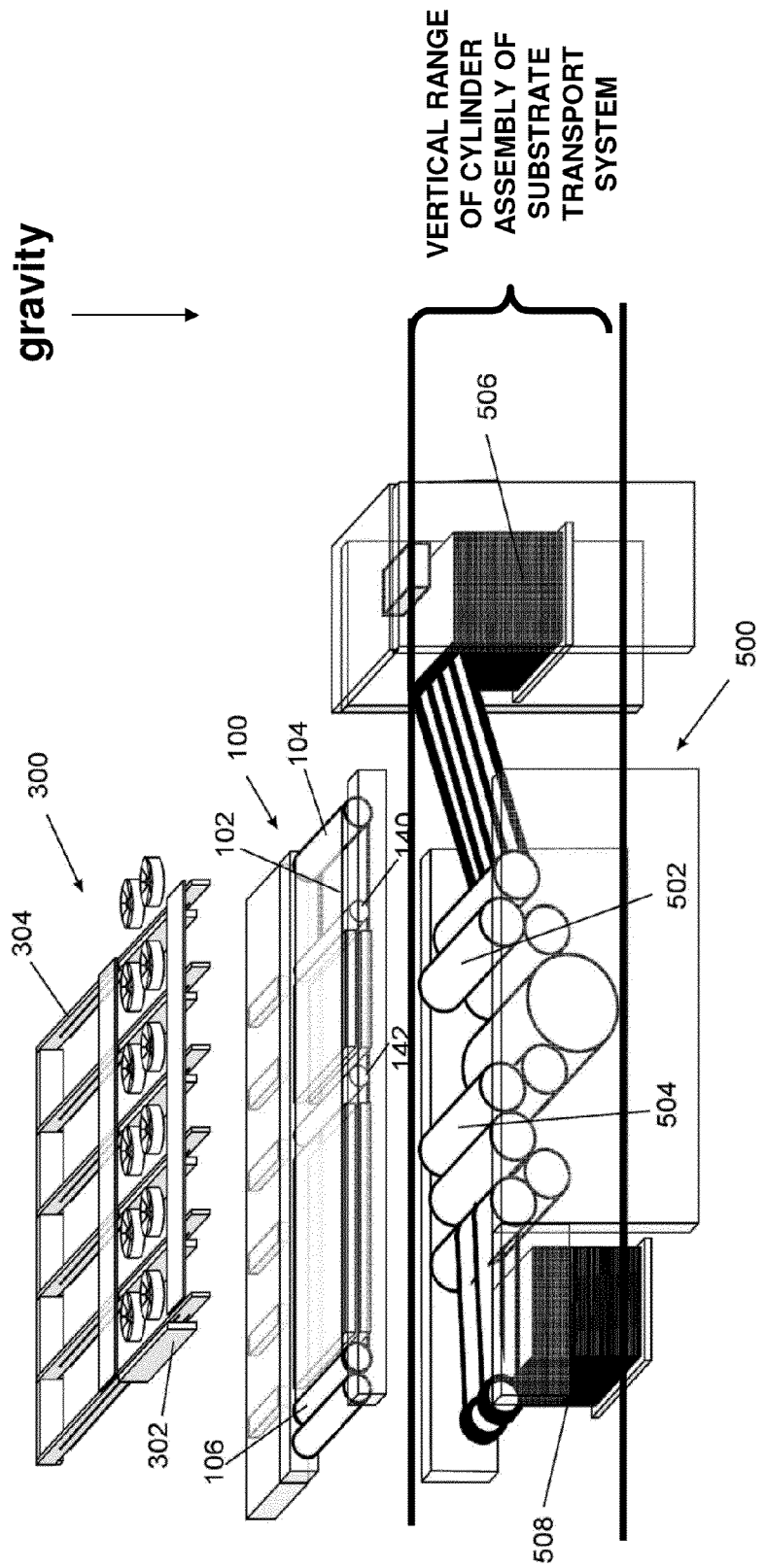
Figure 18C:
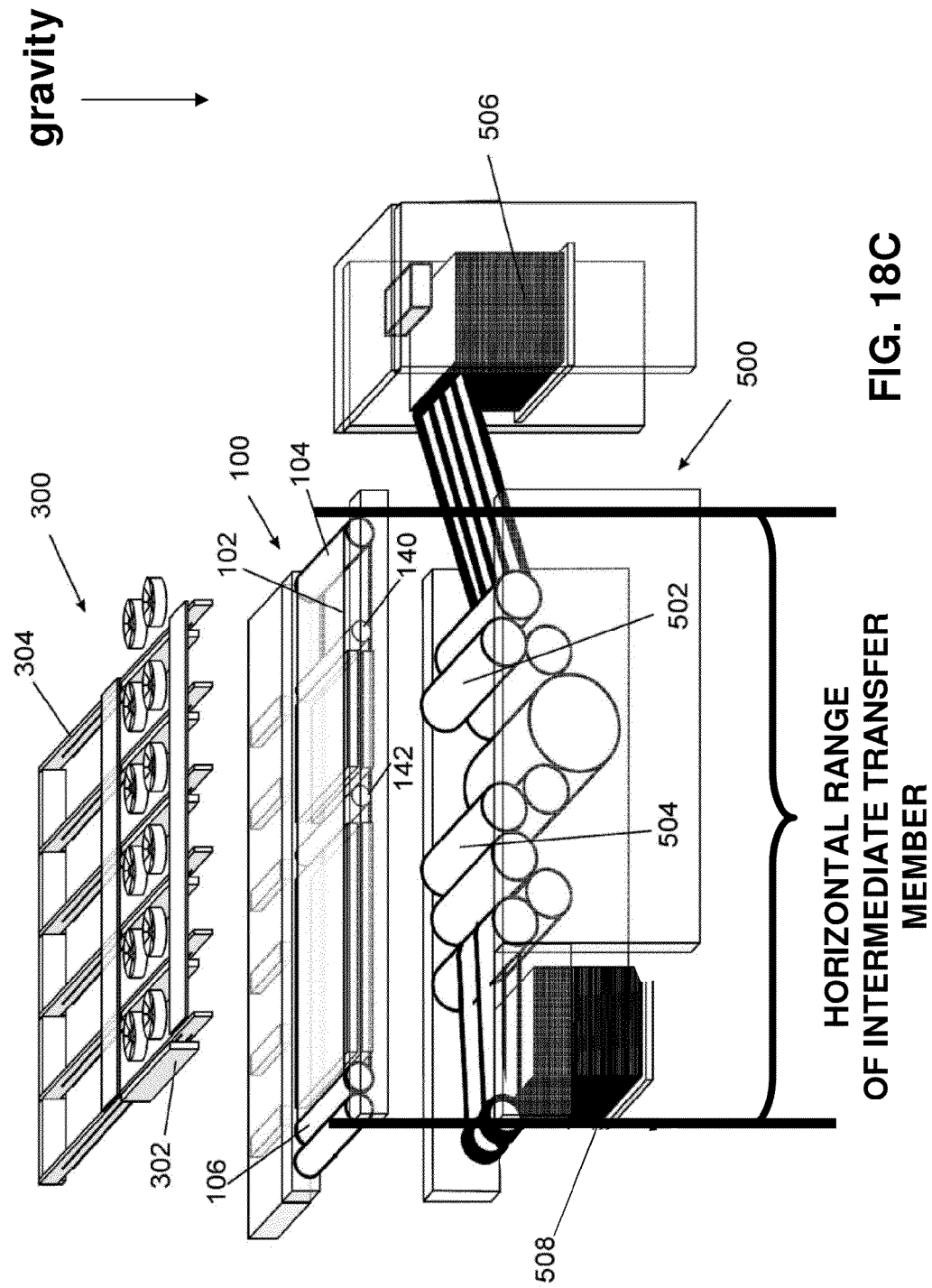
Figure 18D:
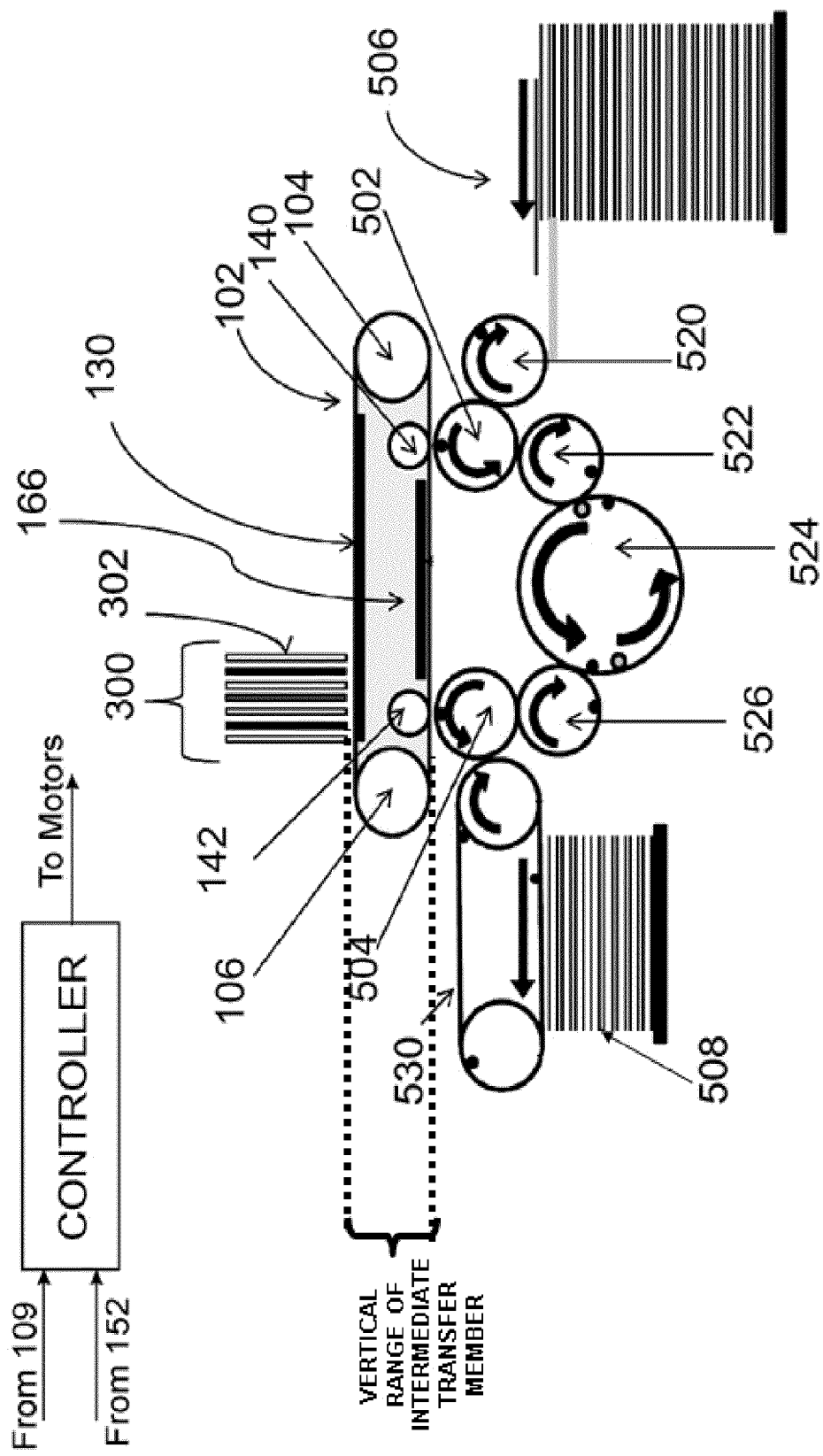
Figure 18E:
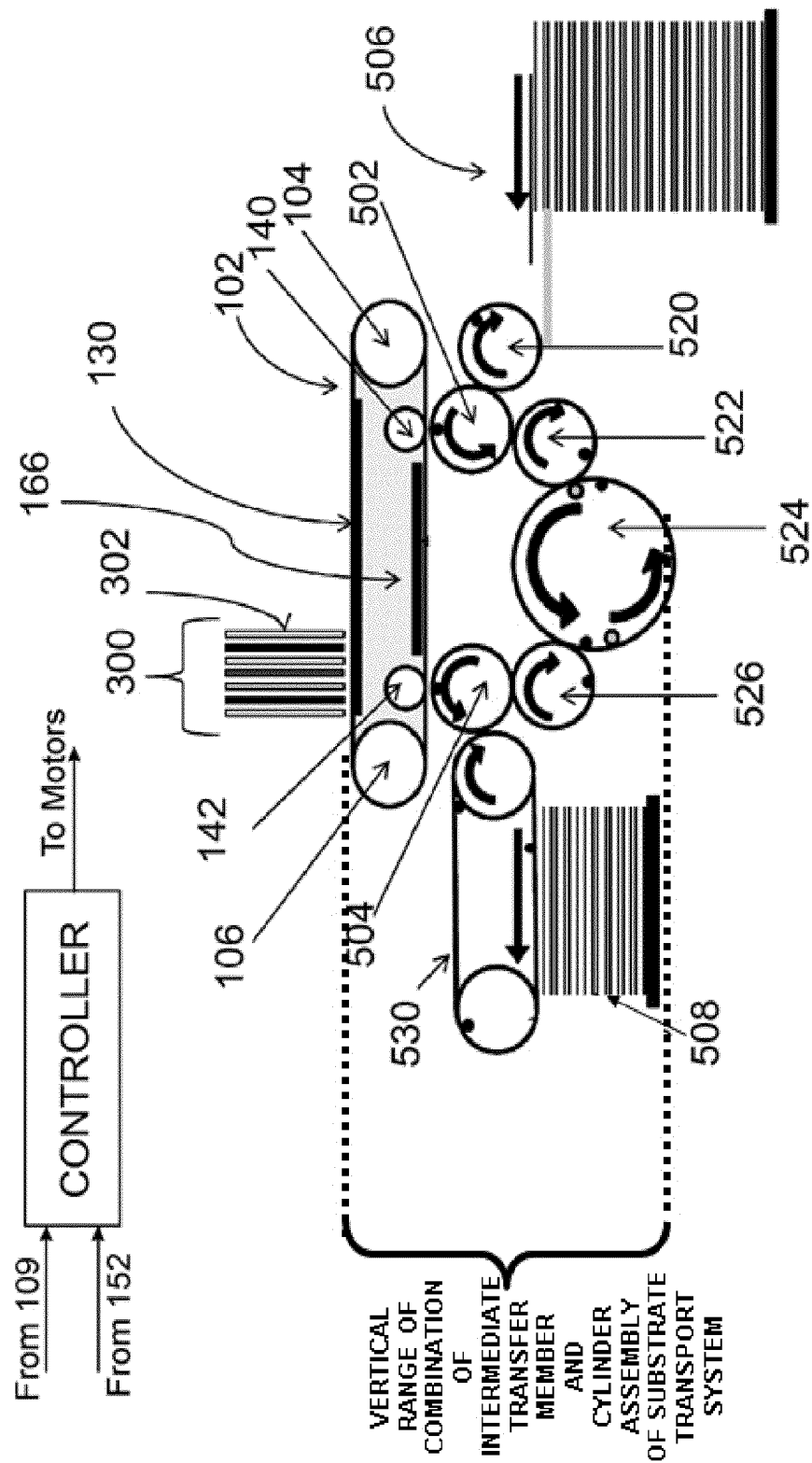

FIG. 18D illustrates a vertical range of the image transport member in one embodiment. FIG. 18E illustrates a vertical range of the combination of the cylinder assembly and the image transport member in one embodiment. FIG. 18B illustrates a vertical range of the cylinder assembly of the substrate transport assembly in one embodiment.

In the preceding paragraphs, the size the display screen was described relative to the substrate transport system and/or the intermediate transfer member. Alternatively or additionally, a horizontal dimension of electronic display screen 970 is at least 2 meters and/or a vertical dimension of the electronic display screen is at least one meter.

In some embodiments, a width of display screen 970 exceeds a height thereof. In some embodiments, a ratio between a width of display screen 970 and a height thereof is at least 1.5 or at least 2 or at least 2.5 and/or at most 4 or at most 3.5 or at most 3. This may be useful for providing a display screen dimensioned to block access to substrate transport system.

In the examples of FIGS. 20 and 22, display screen 970 is at a 'first position' that blocks front access to substrate transport system 500 beneath (not visible in the Figures). In the example of FIGS. 20 and 22, the combination of (i) display screen 970 and (ii) base 910 portion of the printer housing (i.e. the portion that houses the substrate transport system) blocks access to the substrate transport system.

In contrast, in FIGS. 21A-21B, screen 970 is elevated relative to the screen's position in FIG. 20 or 22. In particular, a bottom of screen 970 is above a 'blocking elevation' for blocking access to the substrate transport system.

As shown in FIG. 21A, this allows a user (e.g. someone servicing the printing system) to 'access' (i.e. front access) substrate transport system 500 (not shown on Figure) since the screen no longer blocks access. As shown in FIG. 21B, it is possible to access the printer via any location selected from a plurality of locations 912. In the example of FIG. 21B, the locations 912 are separated by at least 50 cm or at least 1 meter (i.e. a distance between 912A and 912B or between 912C and 912B is at least 50 cm or at least 1 meter) and/or by a distance equal to at least one-quarter or at least one-half of a circumference of intermediate transfer member 102 (e.g. where the 'circumference of the intermediate transfer member' may be a circumference of a drum or length of a flexible blanket). In the example of FIG. 21B, all locations 912 are at the same elevation or height.

Figure 25:
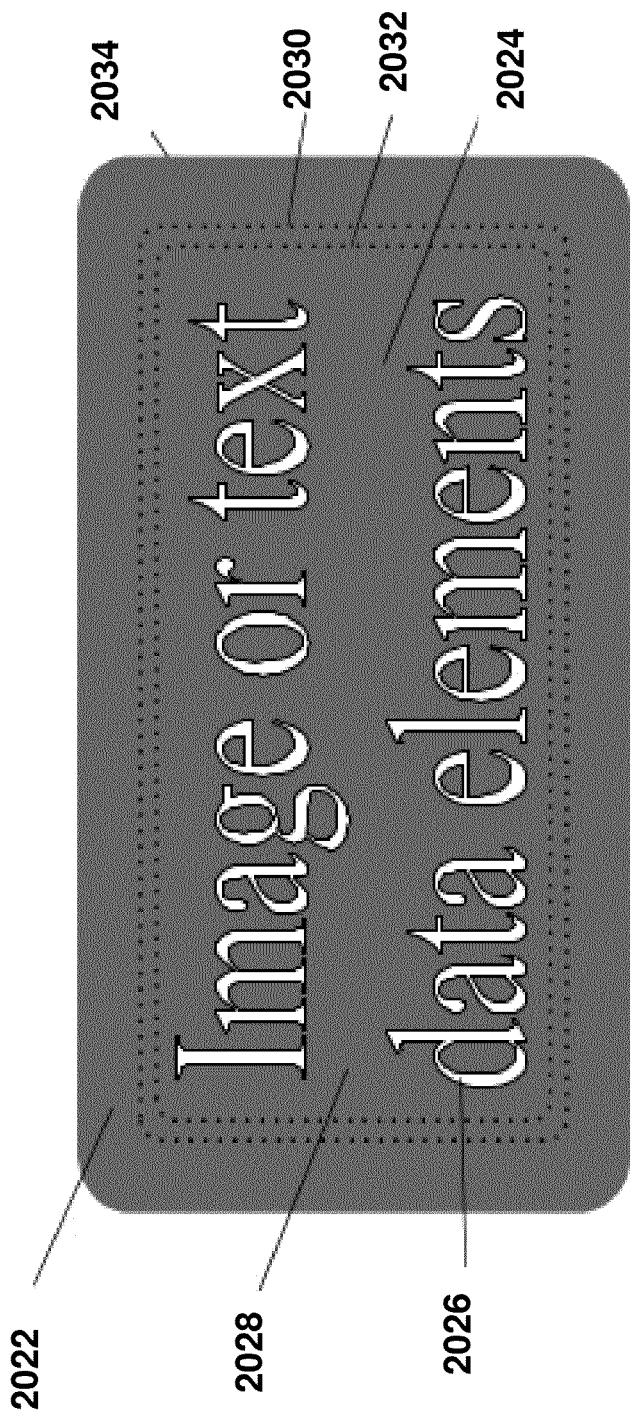

A Discussion of FIGS. 23-25

In one embodiment, the afore-described display 970 of the printing system may be provided/constructed as illustrated in the cross-section view of FIG. 23. The display system shown in FIG. 23 comprises a display screen 2012 and a control unit 2014. The display screen 2012 may be an LED, LCD, plasma, OLED or projection (both rear and front) display screen, as conventionally used in television sets, and the control unit 2014 may comprise conventional driver circuitry used to send signals to a TV or computer screen. As both these are standard components, they need not be described in detail in the present context.

A large size display screen 2012 needs a bulky and unsightly frame 2016 to support it and if no other steps were to be taken to embellish it, its appearance from the front of the display screen would be as shown in FIG. 24A. Embodiments of the present invention seeks to provide a more attractive appearance and to this end places in front of the display screen a front panel 2018, that is preferably made of glass but may be of another transparent material.

The rear face of the front panel 2018 is bonded to a bracket 2020 which is in turn secured to the support frame 2016 of the display screen 2012. Both the width and the height of the front panel 2018 exceed the corresponding dimensions of the display screen 2012 and the bracket 2020 is attached to the overhanging border of the front panel in order not to obstruct the viewing of the display screen 2012.

To hide the support frame 2016 and the bracket 2020 from view, the front panel 2018 has an opaque border region 2022 that obscures from view the support frame 2016 and the mounting bracket 2020. The remaining central region 2024 of the front panel 2018 remains transparent to allow the image displayed on the screen 2012 to be viewed. The region 2022 that extends around the outer border of the panel 2018 is rendered opaque either by adhering or painting a mask 2036 onto the rear face of the front panel 2018 or by tinting the material of the panel 2018 only around its borders.

The appearance of the display system during normal operation is shown in FIG. 25. The dotted lines 2030 and 2032 are not visually discernible and are used merely represent the outline of different regions of the display. The entire area within the inner dotted line 2032 is the face of the display screen 2012 viewed through the transparent central region 2024 of the front panel. Within this area, there will be displayed information elements in the form of images or text 2026 against a background image 2028, shown as being of a uniform color, though this is not essential.

The entire area 2022 between the outer dotted line 2030 and the edge 2034 is the opaque region around that borders the front panel 2018. In the region between the two dotted lines 2030 and 2032, the opacity of the border 2022 fades gradually and an increasing proportion of the background 2028 can be seen. By arranging for the appearance of the opaque region 2022 to match that of the background image 2028, the illusion is achieved of the image extending to the very edge of the front panel 2018, with no obvious structure appearing to be supporting the front panel 2018.

The display system shown in FIG. 23 has an outer casing 2040 to enclose the display screen 2012, the support frame 2016, the control unit 2014 and the bracket 2020. The rim of the outer casing 2040 may, as shown, surrounding around the rear surface of the front panel 2018 so as not to be visible at all when the display system is viewed from the front of the panel 2018, but alternatively it may be designed to form a thin bezel surrounding the front panel 2018.

The display system is intended to be part of the human interface of a digital printer and is used to convey instructions to the printer. For this purpose, it is possible to construct the front panel 2012 as a touch screen by providing transparent electrodes on one of its surfaces or any other means known in the art. The display system is also used by the control system of the printer to display status information or to display a visual simulation or live video of the internal operation of the printer, for the purpose of fault diagnosis.

As the images displayed on the screen are always generated within the apparatus, the control system of the apparatus may readily be programmed to ensure that the image background always matches the appearance of the opaque region 2022 bordering the front panel 2018. Exact matching of the background color 2028 to the border region 2022 may if necessary be performed during a calibration procedure of the control system.

In further embodiments not illustrated in the figures, the printed sheets may be subjected to one or more finishing steps either before being delivered to the output stack (inline finishing) or subsequent to such output delivery (offline finishing) or in combination when two or more finishing steps are performed. Such finishing steps include, but are not limited to laminating, gluing, sheeting, folding, glittering, foiling, protective and decorative coating, cutting, trimming, punching, embossing, debossing, perforating, creasing, stitching and binding of the printed sheets and two or more may be combined. As the finishing steps may be performed using suitable conventional equipment, or at least similar principles, their integration in the process and of the respective finishing stations in the systems of the invention will be clear to the person skilled in the art without the need for more detailed description. In such embodiments, the display screen of the present disclosure may optionally further monitor the operation of such stations.

Independently of the optional presence of inline finishing stations, in some embodiments the housing of the printing system may encompass a monitoring station.

The display system, apparatus and method of monitoring operation of a printing system as disclosed herein are suitable for all printing systems. In some embodiments, each of the aforesaid aspects of the invention is particularly suitable for printing systems comprising an intermediate transfer member. Non-limiting examples of such printing systems were described by the present Applicant in co-pending patent applications published as WO 2013/132418, WO 2013/132419 and WO 2013/132420. The contents of all of the above mentioned applications of the Applicant are incorporated by reference as if fully set forth herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, 'comprise' 'include' and 'have', and conjugates thereof, are used to indicate that the object or objects of the verb are not necessarily a complete listing of members, components, elements or parts of the subject or subjects of the verb. As used herein, the singular form 'a', 'an' and 'the' include plural references unless the context clearly dictates otherwise. For example, the term 'an image transfer station' or 'at least one image transfer station' may include a plurality of transfer stations.

What is claimed is:

1. A method of monitoring the operation state of a printing system comprising (i) a real-world image forming apparatus configured to form ink image(s) on a real-world surface of a real-world rotating intermediate transfer member according to contents of an image database, (ii) a real-world substrate transport system defining a real-world substrate path and interacting with the intermediate transfer member at a real-world image transfer location where the formed ink images located on and rotating with the intermediate transfer member are transferred to a substrate, the method comprising:
   a. retrieving digital image representations from the image database;
   b. displaying simultaneously on a display device:
      i. a graphical representation of the real-world rotating intermediate transfer member having a graphically-represented surface;
      ii. a graphical representation of the substrate transport system including a graphical representation of the real-world image transfer location; and
      iii. a graphical animation of the database-retrieved images in motion on the graphically-represented surface of the representation of the intermediate transfer member;
   c. operating a camera to acquire a video stream of a real-world location on the real-world substrate path as the real-world substrate, bearing ink image(s), moves along the substrate path through the real-world location on the real-world substrate path; and
   d. simultaneous with the displaying of the graphical representations of the intermediate transfer member and of the substrate transport system, displaying on the display screen the camera-acquired video stream of the real-world location through which the real-world substrate bearing ink image(s) moves, wherein the video stream is superimposed over the graphical representation of the substrate transport system in a location that corresponds, within the graphical representation of the substrate transport system, to the real-world location on the real-world substrate path.

2. The method of claim 1 wherein (i) the method further comprises monitoring operation of the printing system to assess which images are substantially-current images that are currently resident on the rotating intermediate transfer member or are queued for formation on the rotating intermediate transfer member in the near future; and (ii) the digital image representations that are retrieved from the database and animated on the surface of the representation of the intermediate transfer member are the substantially-current images.

3. The method of claim 1 wherein (i) the method further comprises monitoring an image print queue of the printing system and (ii) the digital image representations that are retrieved from the database and animated on the surface of the representation of the intermediate transfer member are those in the image print queue of the printing system.

4. The method of claim 1 wherein one or more mechanical or magnetic or optical or thermal sensors monitor one or more operating parameter(s) of the printing system and wherein the animation is carried out in accordance with the results of the monitoring of the operating parameter(s).

5. The method of claim 4 wherein the animation is contingent upon detected rotational motion of the intermediate transfer member.

6. The method of claim 1 wherein the superimposed video stream is re-oriented and/or re-scaled so as to match an orientation and/or scale of the graphical representation of the substrate transport system.

7. The method of claim 1 wherein a plurality of cameras acquire a respective plurality of video streams of the real-world substrate bearing ink image(s) in motion along the substrate path, each camera acquiring images of the real-world substrate when located at a different respective location along the substrate path, each video stream being displayed in a respective location and orientation that correspond to their respective real-world counterparts.

8. The method of claim 1 wherein the animation of the in-motion images is synchronizing with the video stream ink images residing on the real-world substrate of the video stream.

9. The method of claim 1 wherein the displaying of the animation is performed so that at least one image displayed in the graphical animation is subjected to a curvature-modifying geometric mapping so that the curvature of the image matches a local curvature of the graphical representation of the intermediate transfer member.

10. The method of claim 9 wherein the displaying of the animation is performed so that a curvature of the animated image changes as it travels between locations on the graphical representation of the intermediate transfer member having different surface curvatures.

11. The method of claim 1 wherein the graphical representation of the substrate transport system includes a graphical representation of one or more cylinder(s) thereof, the displayed cylinder(s) being animated to illustrate rotation thereof.

12. The method of claim 1 wherein the animated images that are displayed in motion match the real-world images on the real-world intermediate transfer member and are mirror-images of the real-world ink images on the real-world substrate.

13. A printing system operative with a display device, the printing system comprising:
   a. a real-world image forming apparatus configured to form ink image(s) on real-world surface of a real-world rotating intermediate transfer member according to contents of an image database;
   b. a real-world substrate transport system defining a real-world substrate path and interacting with the intermediate transfer member at a real-world image transfer location where the formed ink images located on and rotating with the intermediate transfer member are transferred to a real-world substrate;
   c. a camera being aimed at a real-world location on the substrate path to acquire a video stream of the real-world substrate as the real-world substrate, bearing ink image(s), moves through the real-world location on the real-world substrate path; and
   d. electronic circuitry operative to (i) retrieve digital image representations from the image database; and (ii) cause the display device to simultaneously display:
      A. a graphical representation of the real-world rotating intermediate transfer member and;
      B. a graphical representation of the substrate transport system including a graphic representation of the real-world image transfer location;
      C. a graphical animation of the database-retrieved images in motion on the graphically-represented surface of the representation of the intermediate transfer member; and
      D. the camera-acquired video stream of the real-world substrate bearing ink image(s) moving along the substrate path through the real-world location thereon, the video stream being superimposed over the graphical representation of the substrate transport system in a location that corresponds, within the graphical representation of the substrate transport system, to the real-world location on the real-world substrate path.

14. The system of claim 13 wherein the animated digital images are selected and retrieved from the image database in accordance with an image print queue of the printing system and/or in a manner that synchronizes with the video stream ink images residing on the real-world substrate of the video stream.

15. A method of monitoring operation of a printing system that includes a target set of one or more printing device(s) to which a plurality of print-jobs are queued for execution, the method comprising:
   a. for each print job of the plurality of queued print-jobs, computing or receiving a respective estimated job-completion time, each job-completion time describing a respective predicted job duration for executing the corresponding print job by the printing system;
   b. displaying to a user on a display device, a sectioned timeline that is sectioned in accordance with the estimated job completion times for the print-jobs such that: i. each section of the timeline is associated with a different respective print-job of the plurality of print jobs; and ii. a section length of each timeline section corresponds to a magnitude of the job-completion time of its associated print-job; and
   c. for each of the timeline sections of the sectioned timeline, displaying, for the associated print-job of the timeline section, respective job summary data describing respective print substrate and/or ink combination requirements for the associated print-job, the respective job summary data being visually associated with its corresponding timeline section.

16. The method of claim 15 wherein the job summary data is visually presented as job cards.

17. The method of claim 15 wherein for first and second print jobs having different respective print substrate and/or ink combination requirements and/or being queued to different printing devices of the target set, the visually-associated job-summary data for the first print job differs from that for the second print job.

18. The method of claim 15 further comprising:
   a) monitoring operation of the printing system and/or changes in the job-queue of the printing system; and
   b) in response to the results of the monitoring, re-sectioning the sectioned timeline to change relative visual magnitudes of time section(s) to reflect the change in the job-queue.

19. The method of claim 15 further comprising in response to a user GUI dragging of one or more of the job-summaries, modifying the job-queue to modify operation of at least one of the printing devices of the printing system.

20. The method of claim 19 wherein the job-queue modification includes at least one of: (i) changing a job-queue order to promote or demote the print job corresponding to the GUI-dragged job summary; and (ii) deleting the print job corresponding to the GUI-dragged job summary.

* * * * *